(12) United States Patent
Haga et al.

(10) Patent No.: US 9,822,672 B2
(45) Date of Patent: Nov. 21, 2017

(54) INTERNAL COMBUSTION ENGINE

(71) Applicant: TOYOTA JIDOSHA KABUSHIKI KAISHA, Toyota-shi, Aichi-ken (JP)

(72) Inventors: Hiroyuki Haga, Numazu (JP); Yuji Miyoshi, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/910,731

(22) PCT Filed: Aug. 6, 2014

(86) PCT No.: PCT/IB2014/001474
§ 371 (c)(1),
(2) Date: Feb. 8, 2016

(87) PCT Pub. No.: WO2015/019162
PCT Pub. Date: Feb. 12, 2015

(65) Prior Publication Data
US 2016/0194984 A1    Jul. 7, 2016

(30) Foreign Application Priority Data

Aug. 9, 2013   (JP) ................................ 2013-166672

(51) Int. Cl.
*F01L 1/34*     (2006.01)
*F01L 1/20*     (2006.01)
(Continued)

(52) U.S. Cl.
CPC .................. *F01L 1/20* (2013.01); *F01L 1/267* (2013.01); *F01L 31/16* (2013.01); *F02D 35/023* (2013.01);
(Continued)

(58) Field of Classification Search
CPC ......... F01L 1/20; F01L 31/16; F01L 2800/11; F01L 1/267; F02D 41/221; F02D 35/023; F02D 2041/001; Y02T 10/40
(Continued)

(56) References Cited

U.S. PATENT DOCUMENTS 5,024,191 A    6/1991   Nagahiro et al.
5,111,781 A *   5/1992   Kaku ..................... F01L 1/20
                                                     123/90.15
(Continued)

FOREIGN PATENT DOCUMENTS

CN      102171434 A    8/2011
JP       1-110817       4/1989
(Continued)

*Primary Examiner* — Zelalem Eshete
(74) *Attorney, Agent, or Firm* — Finnegan, Henderson, Farabow, Garrett & Dunner, LLP

(57) ABSTRACT

An internal combustion engine includes an exhaust valve, a plurality of cams Ca, Cb, and Cc used to drive the exhaust valve, a cam-switching variable valve mechanism that selects a use cam used to drive the exhaust valve out of the plurality of cams Ca, Cb, and Cc, and an electronic control unit that determines whether switching abnormality of the use cam in the variable valve mechanism is present on the basis of a locus M in a predetermined period K which is a period in which the exhaust valve is opened. The locus M is a locus of an in-cylinder pressure changing rate $dPc/d\theta$ and is specifically a locus indicating a variation of the in-cylinder pressure changing rate $dPc/d\theta$ depending on a crank angle $\theta$.

16 Claims, 42 Drawing Sheets

(51) Int. Cl.
  *F01L 1/26*  (2006.01)
  *F02D 41/22*  (2006.01)
  *F02D 35/02*  (2006.01)
  *F01L 31/16*  (2006.01)
  *F02D 41/00*  (2006.01)

(52) U.S. Cl.
  CPC ......... *F02D 41/221* (2013.01); *F01L 2800/11* (2013.01); *F02D 2041/001* (2013.01); *Y02T 10/40* (2013.01)

(58) Field of Classification Search
  USPC ............................... 123/90.15, 90.16, 90.17
  See application file for complete search history.

(56) References Cited

U.S. PATENT DOCUMENTS

| | | | |
|---|---|---|---|
| 5,195,470 A | 3/1993 | Ikeura | |
| 2010/0262355 A1 | 10/2010 | Bauer et al. | |
| 2011/0303190 A1* | 12/2011 | Yasuda | F02D 35/023 123/435 |

FOREIGN PATENT DOCUMENTS

| | | |
|---|---|---|
| JP | 2-221615 | 9/1990 |
| JP | 04-191426 A | 7/1992 |
| JP | 7-233742 | 9/1995 |
| JP | 8-21295 | 1/1996 |
| JP | 2005-9457 | 1/2005 |

* cited by examiner

F I G . 8
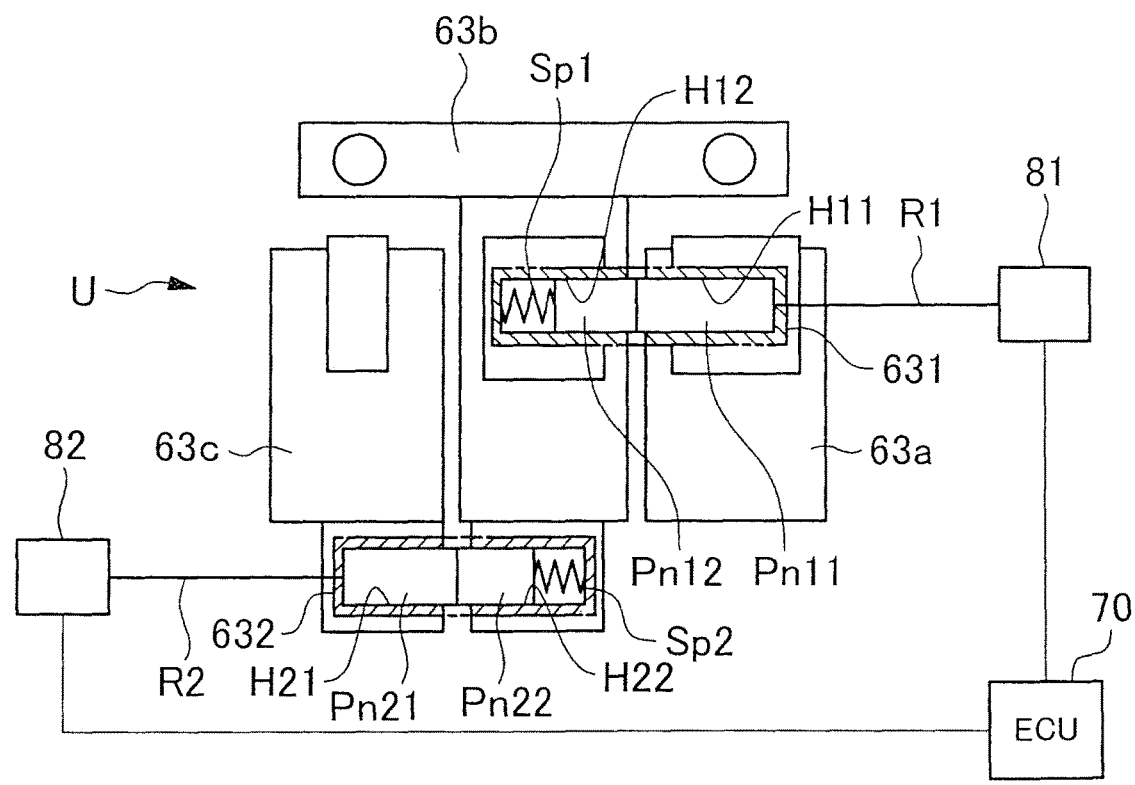

F I G . 10
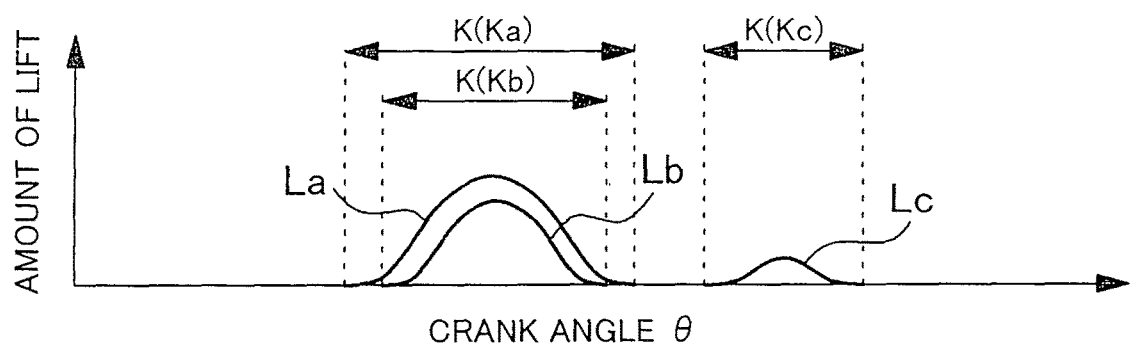

F I G . 12D
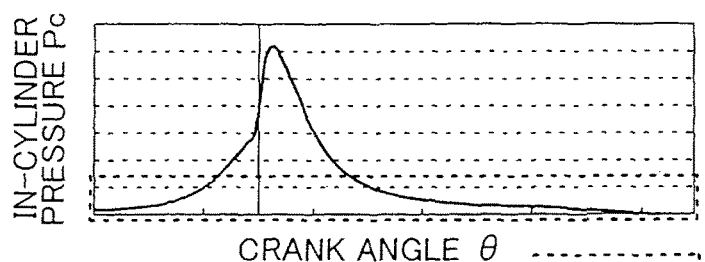
F I G . 12E
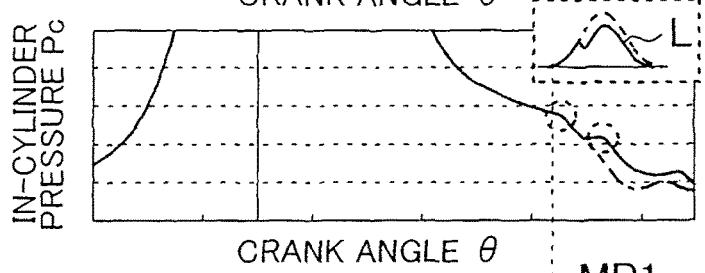
F I G . 12F
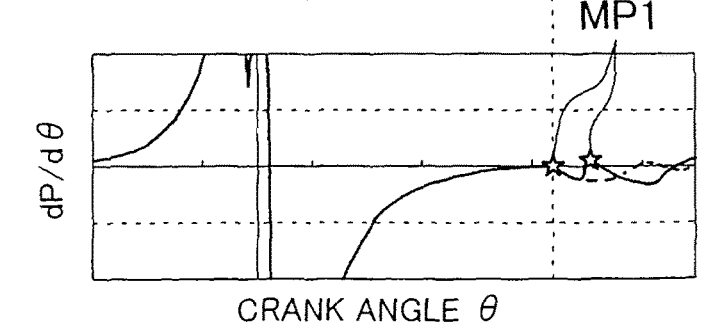

F I G . 14D 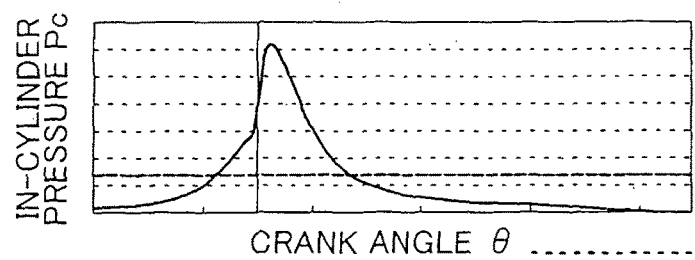
F I G . 14E 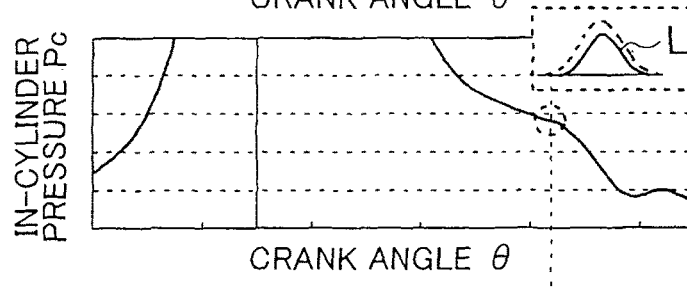
F I G . 14F 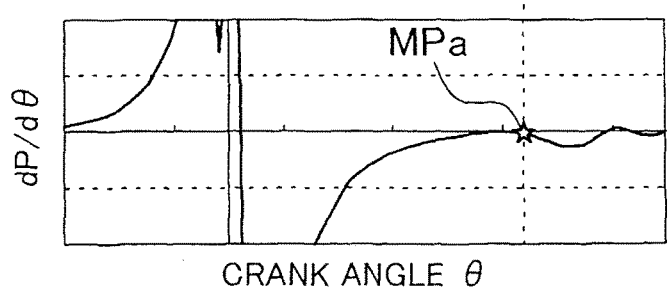

F I G . 20D 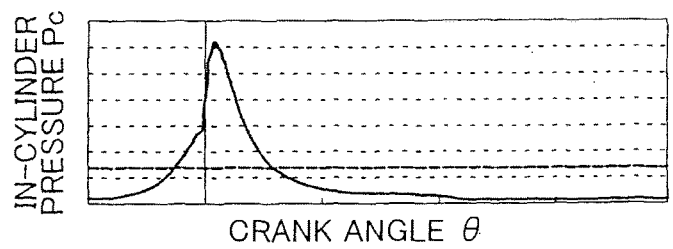
F I G . 20E 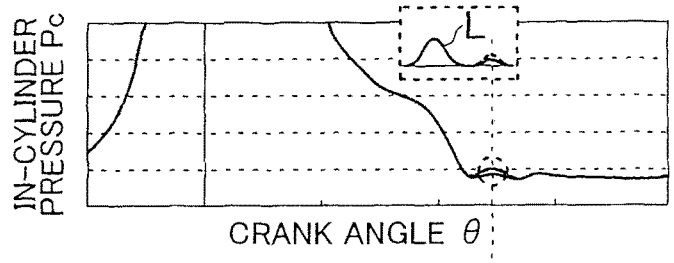
F I G . 20F 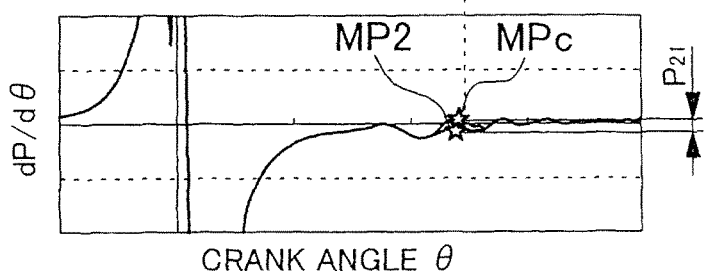

INTERNAL COMBUSTION ENGINE

CROSS-REFERENCE TO RELATED APPLICATIONS

This application is a national phase application of International Application No. PCT/IB2014/001474, filed Aug. 6, 2014, and claims the priority of Japanese Application No. 2013-166672, filed Aug. 9, 2013, the content of both of which is incorporated herein by reference.

BACKGROUND OF THE INVENTION

1. Field of the Invention

The present invention relates to an internal combustion engine.

2. Description of Related Art

An internal combustion engine is known which includes a cam-switching variable valve mechanism that selects a use cam to be used to drive an exhaust valve out of plural cams. In such an internal combustion engine, a diagnosis device that diagnoses whether cam switching is normally performed is disclosed in Japanese Patent Application Publication No. 7-233742 (JP 7-233742 A). Japanese Patent Application Publication No. 1-110817 (JP 1-110817 A) discloses a valve control device of a multi-cylinder engine that controls cam switching means of another cylinder so as to arrange a use cam of the different cylinder as a use cam of a defective cylinder not using a predetermined cam.

SUMMARY OF THE INVENTION

In the internal combustion engine including a cam-switching variable valve mechanism, when switching of a use cam is not normally performed, there is multiple reasons. Accordingly, in such an internal combustion engine, by only determining whether switching of the use cam is normally performed, it may not be possible to appropriately cope with situations where switching of a use cam is not normally performed.

The present invention provides an internal combustion engine that can determine whether switching abnormality of a use cam is present and that can cope with situations where the switching of a use cam is not normally performed.

An aspect of the present invention relates to an internal combustion engine. The internal combustion engine includes a variable valve mechanism including plural cams used to drive an exhaust valve and an electronic control unit (ECU). The ECU is configured to (a) select a use cam, which is a cam used to drive the exhaust valve, out of the plural cams, and (b) determine whether switching abnormality of the use cam is present on the basis of a locus of an in-cylinder pressure changing rate in a predetermined period, and the predetermined period is a period in which the exhaust valve is opened.

In the aspect, the variable valve mechanism may be configured to switch the cams such that a plurality of modes are performed. The ECU may be configured to set the predetermined period to at least one period of a period in which the exhaust valve is opened by switching of the use cam and a period in which the exhaust valve is not opened by the switching of the use cam, when the switching of the use cam is normally performed depending on the modes.

In the aspect, the ECU may be configured to determine whether the switching abnormality is present on the basis of a predetermined item of the locus. The predetermined item may include at least one of (a) presence of an inflection point obtained by operating of the exhaust valve, (b) absence of the inflection point, (c) value of the inflection point, and (d) generating timing of the inflection point.

In the aspect, the predetermined period may be a period after the switching to the use cam has started.

In the aspect, the ECU may be configured to determine that the variable valve mechanism is abnormal when the ECU determines that the switching abnormality is present in at least one of the plural modes. The ECU may determine that the variable valve mechanism is normal when the ECU determines that the switching abnormality is not present in all of the plural modes.

In the aspect, the variable valve mechanism may individually fluctuate depending on cam profiles of the plurality of cams. The variable valve mechanism may include a plurality of fluctuation portions configured to relay dynamic power transmitted from a cam shaft to the exhaust valve, the cam shaft is provided with the plurality of cams, and a plurality of coupling mechanisms configured to connect and disconnect two fluctuation portions out of the plural fluctuation portions. The ECU may be configured to select the cam used to drive the exhaust valve out of at least three cams as the plural cams.

In the aspect, the plural cams may include a first cam, a second cam, and a third cam. The plurality of fluctuation portions may include a first fluctuation portion configured to fluctuate using the first cam, a second fluctuation portion configured to fluctuate using the second cam, and a third fluctuation portion configured to fluctuate using the third cam. The plural coupling mechanisms may include a first coupling mechanism and a second coupling mechanism. The first coupling mechanism may include a first lock member that connects and disconnects the first fluctuation portion and the second fluctuation portion. The second coupling mechanism may include a second lock member that connects and disconnects the second fluctuation portion and the third fluctuation portion. The second fluctuation portion may be provided with a valve driving portion configured to transmit dynamic power to the exhaust valve. A valve opening period of the exhaust valve using the first cam may include a valve opening period of the exhaust valve using the second cam. The cam profile of the first cam and the cam profile of the second cam may be set so that an amount of lift of the exhaust valve using the first cam is greater than an amount of lift of the exhaust valve using the second cam. The cam profile of the third cam may be set so as to drive the exhaust valve at timing different from one of the cam profile of the first cam and the cam profile of the second cam. The total number of modes may be six.

In the aspect, the ECU may be configured to determine whether abnormality of coupling or decoupling performed by at least one of the first lock member and the second lock member is present.

In the aspect, the ECU may be configured to determine an abnormality form of the switching abnormality of the use cam on the basis of the mode and the locus in the predetermined period.

In the aspect, the ECU may be configured to determine an abnormality form of the switching abnormality of the use cam in the variable valve mechanism on the basis of the mode and the locus in the predetermined period. The modes may include a first mode, and the first mode may be a mode in which a switching form of the use cam is switching from the second cam to the first cam. The ECU may be configured to determine the abnormality form on the basis of the mode and a first inflection point when the mode is the first mode. The first inflection point may be an inflection point obtained with the operation of the exhaust valve using at least one of the first cam and second cam in the locus.

In the aspect, the modes may include a second mode, and the second mode may be a mode in which the switching form of the use cam is switching from the second cam to the first and third cams. The ECU may be configured to determine the abnormality form on the basis of the mode and a second inflection point when the mode is the second mode, and the second inflection point may be an inflection point obtained with the operation of the exhaust valve using the third cam in the locus.

In the aspect, the modes may include a third mode, and the third mode may be a mode in which the switching form of the use cam is switching from the second and third cams to the first cam. When the mode is the third mode, the ECU may be configured to (a) determine the abnormality form on the basis of the mode and the first inflection point, and (b) determine the abnormality form on the basis of the mode and the second inflection point.

In the aspect, a first predetermined inflection point may be an inflection point obtained with the operation of the exhaust valve using the first cam when the exhaust valve is driven along the cam profile of the first cam in the locus. A deviation may be a magnitude of a phase difference between the first inflection point and the first predetermined inflection point. The ECU may determine that the abnormality form is a response delay of switching timing of the use cam generated between the first coupling mechanism and the second coupling mechanism when the mode is the third mode, the first inflection point and the second inflection point are present in the locus, and the first inflection point is an inflection point of which a deviation is less than a predetermined value.

In the aspect, the exhaust valve, the plural cams, the plural fluctuation portions, and the plural coupling mechanisms may be provided to each of plural cylinders. The ECU may be configured to determine that the abnormality form is a response delay of a switching timing of the use cam caused between the plural cylinders when the mode is the first mode and the value or phase of the first inflection point is different more than a predetermined degree between one cylinder and another cylinder of the plural cylinders. The ECU may be configured to determine that the abnormality form is a response delay of a switching timing of the use cam caused between the plural cylinders when the mode is the second mode and the presence or absence of the second inflection point is different between one cylinder and another cylinder of the plural cylinders. The electronic control unit may be configured to determine that the abnormality form is a response delay of a switching timing of the use cam caused between the plurality of cylinders, when the mode is the third mode and one of following conditions is satisfied. One of the conditions are that one of the value and the phase of the first inflection point is different more than a predetermined degree between one cylinder and another cylinder of the plurality of cylinders. The other of conditions is that the presence or absence of the second inflection point is different between one cylinder and another cylinder of the plurality of cylinders.

In the aspect, the ECU may be configured to repeatedly determine whether the switching abnormality is present when determining whether the switching abnormality is present. The ECU may be configured to determine that the switching abnormality is present when the ECU repeatedly determines for a predetermined time that the switching abnormality is present. The ECU may be configured to determine that the switching abnormality is not present when the ECU determines that the switching abnormality is not present before repeatedly determining that the switching abnormality is present for the predetermined time.

In the aspect, the ECU may be configured to control a fail-safe control on the basis of the determined abnormality form. The fail-safe control may include at least one of limiting of a maximum vehicle speed, limiting of a maximum rotation speed, and limiting of an amount of fuel injected.

In the aspect, the modes may differ depending on a switching form of the use cam, and the switching form may be a form of switching from one use pattern to the other use pattern between two use patterns of plural use patterns of the use cam.

In the aspect, the ECU may be configured to give a warning when the ECU determines that the switching abnormality is present.

According to the aspect, it is possible to determine whether switching abnormality of a use cam is present and to appropriately cope with situations where the switching of a use cam is not normally performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a diagram illustrating plural coupling mechanisms;

FIG. 10 is a diagram illustrating a predetermined period;

FIGS. 12A to 12F are diagrams illustrating first mechanical failure in a first mode;

FIGS. 14A to 14F are diagrams illustrating third mechanical failure in the first mode;

FIGS. 20A to 20F are diagrams illustrating second mechanical failure in the second mode;

DETAILED DESCRIPTION OF EMBODIMENTS

Figure 1:
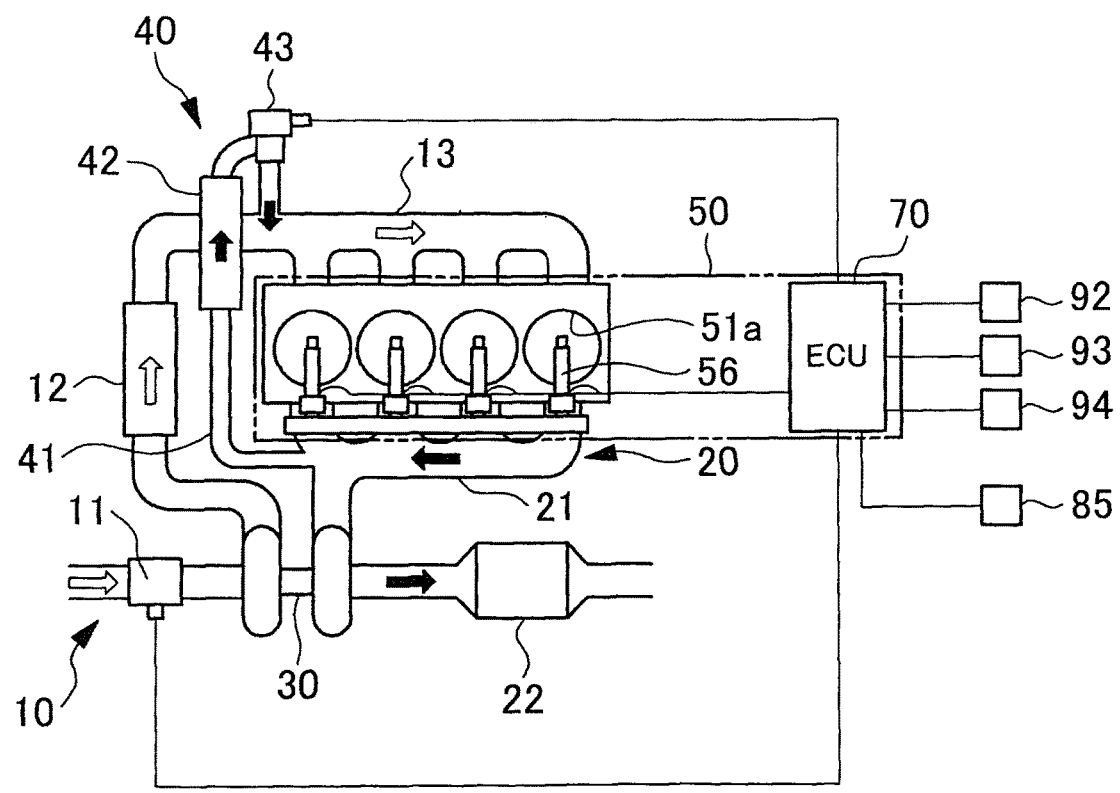
FIG. 1 is a diagram illustrating an overall configuration of an internal combustion engine and peripheries thereof.
Figure 2:
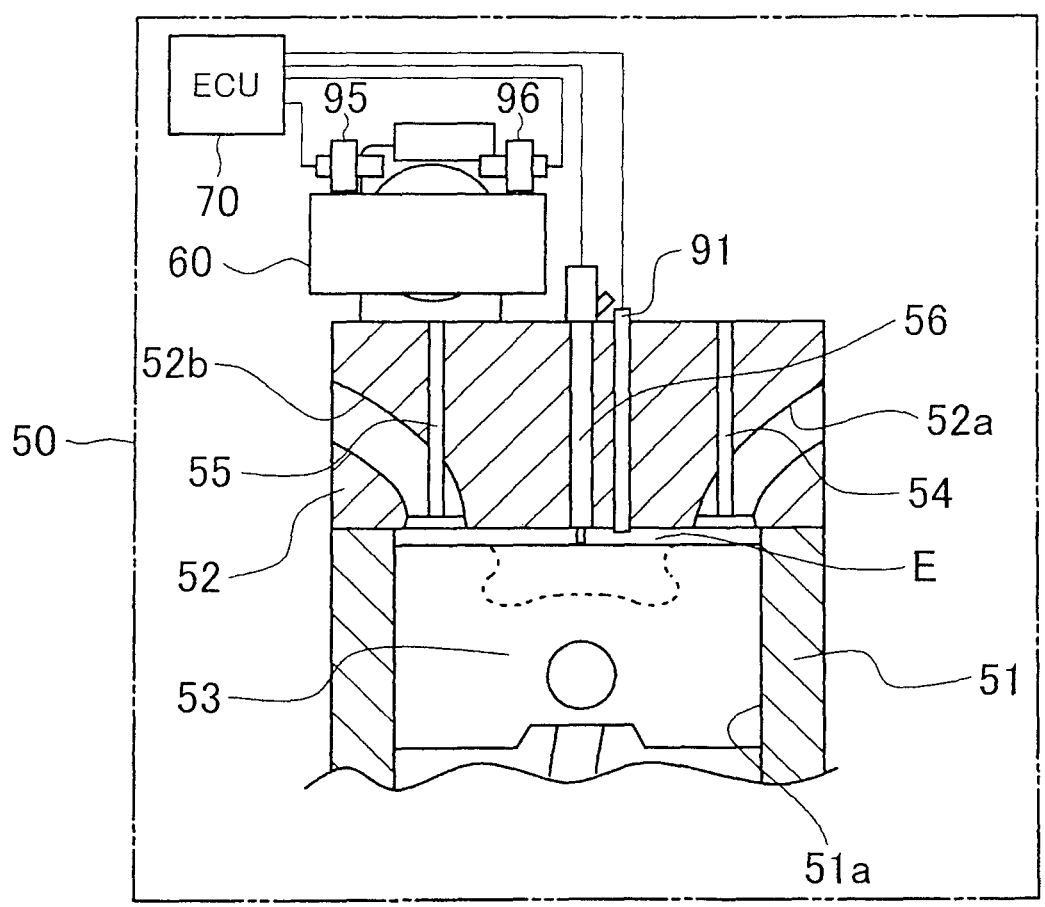
FIG. 2 is a diagram schematically illustrating a configuration of the internal combustion engine.
Figure 3A:
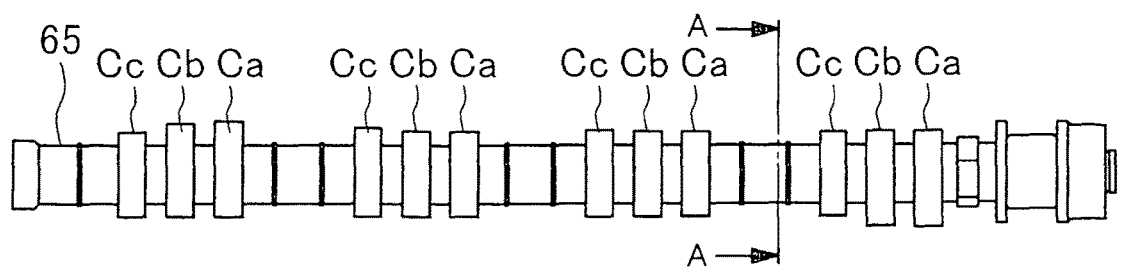
FIG. 3 is a diagram illustrating a cam shaft.
Figure 3B:
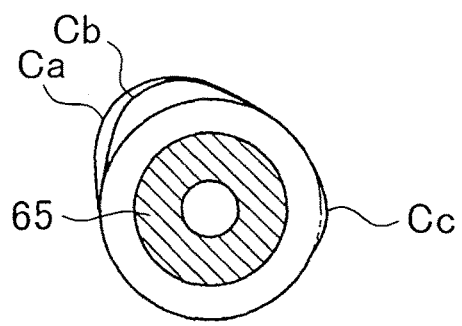
Figure 4:
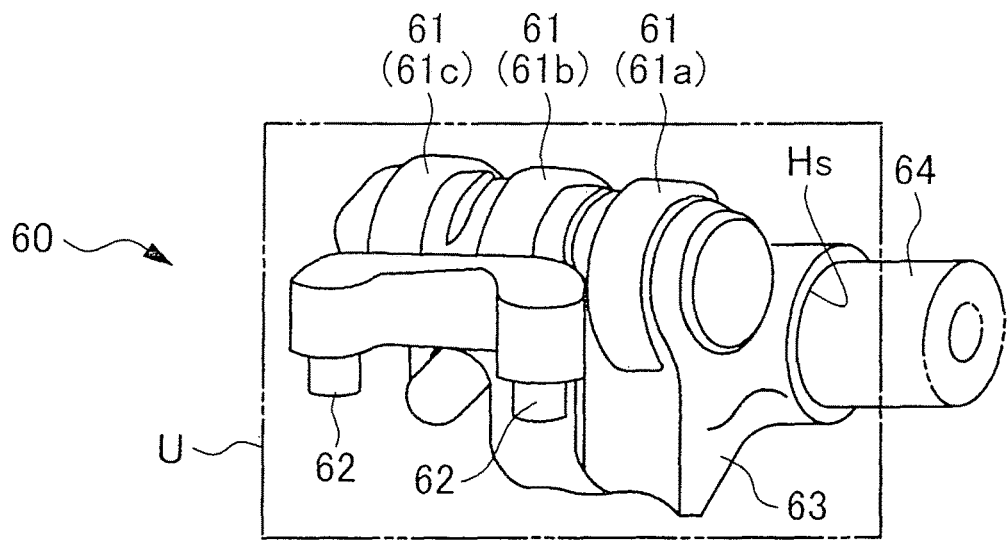
FIG. 4 is a first outside view of a variable valve mechanism.
Figure 5:
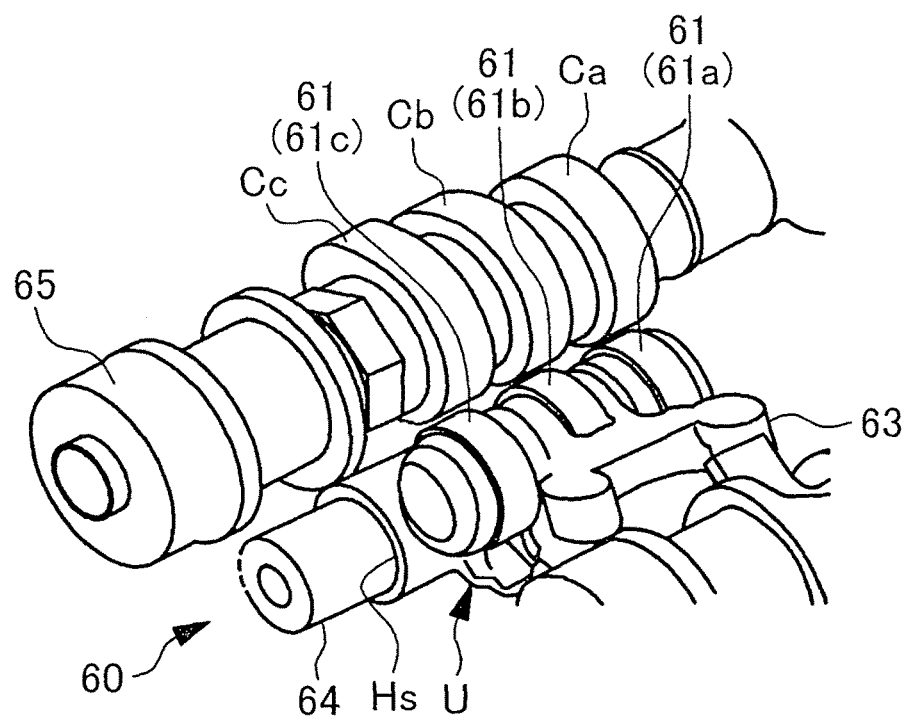
FIG. 5 is a second outside view of the variable valve mechanism.
Figure 6:
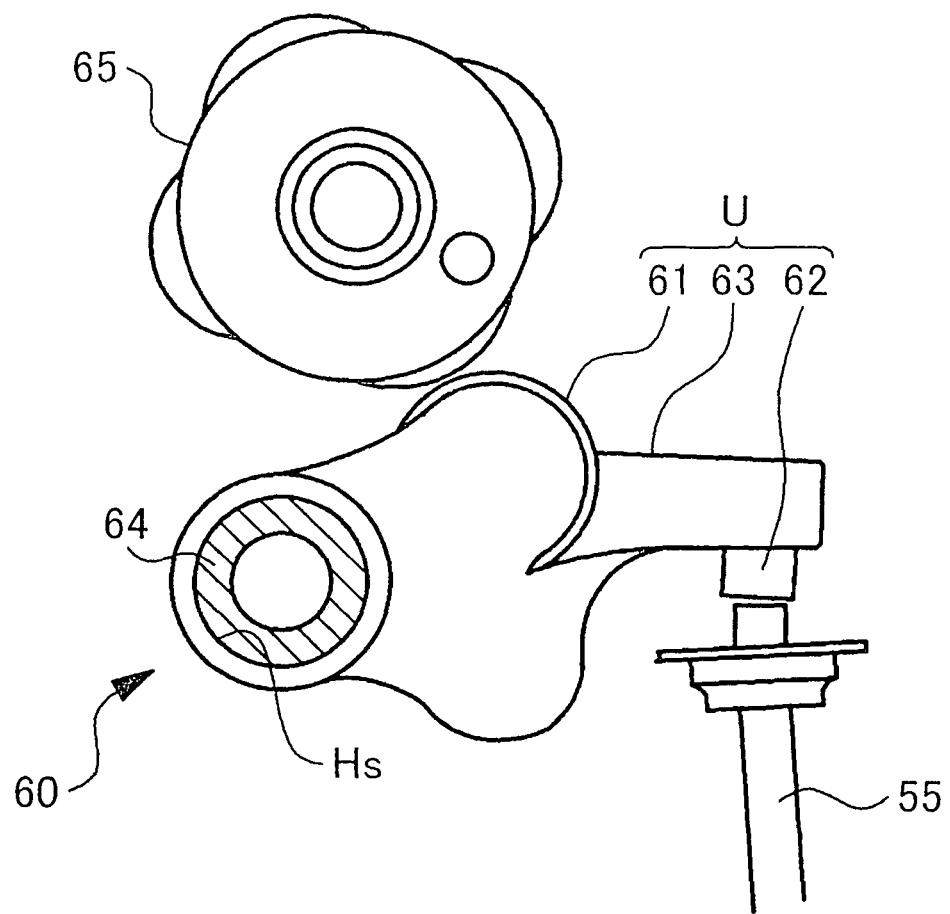
FIG. 6 is a side view of the variable valve mechanism.

FIG. 1 is a diagram illustrating an overall configuration of an internal combustion engine 50 and peripheries thereof. FIG. 2 is a diagram schematically illustrating a configuration of the internal combustion engine 50. FIGS. 3A and 3B are diagrams illustrating a cam shaft 65. FIG. 4 is a first outside view of a variable valve mechanism 60. FIG. 5 is a second outside view of the variable valve mechanism 60. FIG. 6 is a side view of the variable valve mechanism 60. FIG. 3A is a diagram illustrating the entire configuration of the cam shaft 65 and FIG. 3B is a cross-sectional view of cams Ca, Cb, and Cc taken along line A-A of FIG. 3A. FIGS. 5 and 6 illustrate the variable valve mechanism 60 along with the cam shaft 65.

The internal combustion engine 50 is provided with an intake system 10, an exhaust system 20, and an exhaust recirculation system 40. The intake system 10 includes an air flowmeter 11, an intercooler 12, and an intake manifold 13. The air flowmeter 11 measures an amount of intake air. The intercooler 12 cools the intake air. The intake manifold 13 distributes the intake air to cylinders 51a of the internal combustion engine 50. The exhaust system 20 includes an exhaust manifold 21 and a catalyst 22. The exhaust manifold 21 merges exhaust air from the cylinders 51a into one exhaust passage on the downstream side. The catalyst 22 purifies the exhaust air. The intake system 10 and the exhaust system 20 are provided with a supercharger 30. The supercharger 30 supercharges the internal combustion engine 50 with the intake air.

The exhaust recirculation system 40 includes an EGR pipe 41, an EGR cooler 42, and an EGR valve 43. The EGR pipe 41 causes the intake system 10 and the exhaust system 20 to communicate with each other. Specifically, the EGR pipe 41 causes a merging portion on the upstream side of the intake manifold 13 and a merging portion on the downstream side of the exhaust manifold 21 to communicate with each other. The EGR cooler 42 cools the recirculated exhaust air. The EGR valve 43 adjusts an amount of exhaust air recirculated. The internal combustion engine 50 is a compression-ignited internal combustion engine and includes plural cylinders (four herein) cylinders 51a. The internal combustion engine 50 along with the intake system 10, the exhaust system 20, and the exhaust recirculation system 40 is mounted on a vehicle not illustrated.

The internal combustion engine 50 includes an electronic control unit (ECU) 70. The internal combustion engine 50 includes a cylinder block 51, a cylinder head 52, a piston 53, an intake valve 54, an exhaust valve 55, a fuel injection valve 56, a variable valve mechanism 60, and a cam shaft 65. The internal combustion engine 50 is provided with an in-cylinder pressure sensor 91. The piston 53, the intake valve 54, the exhaust valve 55, the fuel injection valve 56, and the in-cylinder pressure sensor 91 are provided to each cylinder 51a.

The cylinder 51a is formed in the cylinder block 51. The piston 53 is housed in the cylinder 51a. The cylinder head 52 is fixed to the top surface of the cylinder block 51. A combustion chamber E is formed as a space surrounded with the cylinder block 51, the cylinder head 52, and the piston 53. The piston 53 is adjacent to the combustion chamber E.

An intake port 52a guiding intake air to the combustion chamber E and an exhaust port 52b exhausting gas from the combustion chamber E are formed in the cylinder head 52. The cylinder head 52 is provided with the intake valve 54 switching the intake port 52a and the exhaust valve 55 switching the exhaust port 52b. The number of intake valves 54 and the number of exhaust valves 55 provided to each cylinder 51a are two or more (two herein). The fuel injection valve 56 is disposed in the cylinder head 52 and injects fuel to the combustion chamber E. The in-cylinder pressure sensor 91 is disposed in the cylinder head 52 and senses an in-cylinder pressure Pc which is the pressure of the combustion chamber E.

The variable valve mechanism 60 is disposed in the cylinder head 52. The variable valve mechanism 60 is a cam-switching variable valve mechanism and selects a use cam to be used to drive the exhaust valve 55 out of a cam Ca as a first cam, a cam Cb as a second cam, and a cam Cc as a third cam. The cams Ca, Cb, and Cc are disposed in the cam shaft 65 and constitute plural (three herein) cams used to drive the exhaust valve 55. The number of cams may be set to at least three.

The cams Ca, Cb, and Cc have different cam profiles different from each other. The cam profiles of the cams Ca, Cb are set so as to drive the exhaust valve 55 with at least one (an exhaust stroke herein) of an exhaust stroke and an intake stroke. The cam profiles of the cams Ca, Cb are set so that a valve opening period of the exhaust valve 55 using the cam Cb is included in a valve opening period of the exhaust valve 55 using the cam Ca and an amount of lift of the exhaust valve 55 using the cam Ca is greater than an amount of lift of the exhaust valve 55 using the cam Cb.

The cam profile of the cam Cc is set so as to drive the exhaust valve 55 at a timing different from one of the cam profile of the cam Ca and the cam profile of the cam Cb. The cam profile of the cam Cc is specifically set to open the exhaust valve 55 in a valve opening period of the intake valve 54. The cam Cc is used along with the cam Cb. The cam Cc may be used along with the cam Ca.

The cams Ca, Cb, and Cc are specifically disposed to correspond to each of the plural cylinders 51a. Accordingly, the cams Ca, Cb, and Cc are specifically used to drive the exhaust valve 55 for each of the cylinders 51a. Specifically, the variable valve mechanism 60 selects a use cam used to drive the exhaust valve 55 out of the cams Ca, Cb, and Cc for each of the plural cylinders 51a.

The variable valve mechanism 60 includes a cam contact portion 61, a valve driving portion 62, a rocker arm portion 63, and a rocker arm shaft 64. The cam contact portion 61, the valve driving portion 62, and the rocker arm portion 63 are disposed for each cylinder 51a and constitute a unit U.

The cam contact portions 61 are cam followers and the number of cam contact portions disposed herein is two or more (three herein) to correspond to the cams Ca, Cb, and Cc. The cam contact portion 61a is a cam contact portion coming in contact with the cam Ca out of the plural cam contact portions 61. The cam contact portion 61b is a cam contact portion coming in contact with the cam Cb and the cam contact portion 61c is a cam contact portion coming in contact with the cam Cc. The plural cam contact portions 61 are disposed in the rocker arm portion 63.

The valve driving portion 62 is disposed in the rocker arm portion 63. The valve driving portions 62 are disposed to correspond to the number (two herein) of exhaust valves 55 disposed for each cylinder 51a, and transmit dynamic power to the exhaust valves 55. The valve driving portion 62 may be a part of the rocker arm portion 63.

The rocker arm portion 63 is a power relay portion and relays dynamic power transmitted from the cam shaft 65 to the exhaust valve 55 along with the cam contact portions 61 and the valve driving portions 62. The rocker arm portion 63 has a shaft hole Hs. The rocker arm shaft 64 is inserted (disposed) into the shaft hole Hs. The rocker arm shaft 64 supports the rocker arm portion 63 so as to fluctuate. The rocker arm shaft 64 is common to the units U provided to the respective cylinders 51a. The rocker arm shaft 64 is disposed in the extending direction of the cam shaft 65.

Figure 7:
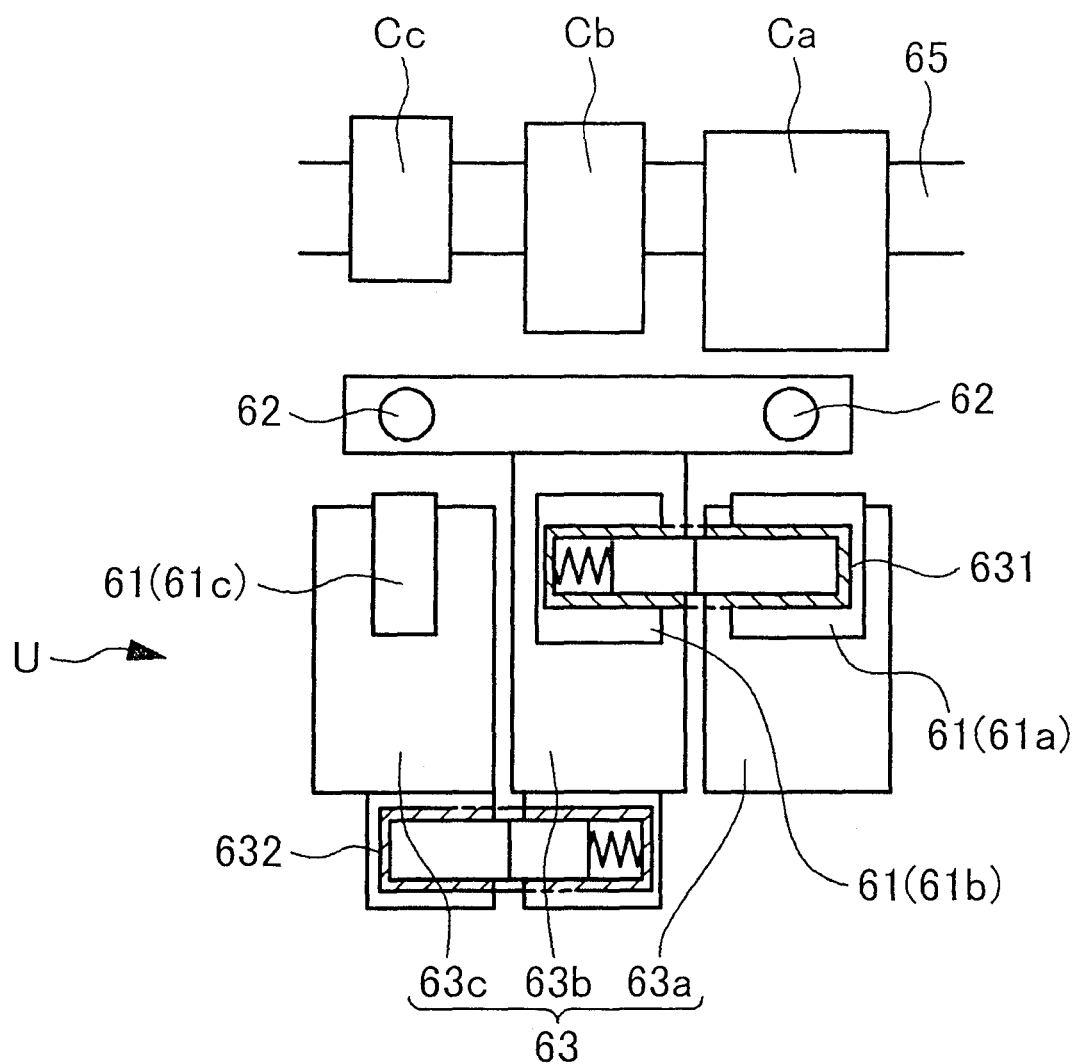
FIG. 7 is a diagram schematically illustrating a configuration of a unit.

FIG. 7 is a diagram schematically illustrating a configuration of the unit U. FIG. 7 illustrates the unit U along with the cam shaft 65. The rocker arm portion 63 specifically includes fluctuation portions 63a, 63b, and 63c as plural fluctuation portions. The fluctuation portions 63a, 63b, and 63c individually fluctuate depending on the cam profiles of the cams Ca, Cb, and Cc, and relay dynamic power to be transmitted from the cam shaft 65 to the exhaust valve 55.

The fluctuation portion 63a as a first fluctuation portion is provided with a cam contact portion 61a. Accordingly, the fluctuation portion 63a fluctuates with the cam Ca. The fluctuation portion 63b as a second fluctuation portion is provided with a cam contact portion 61b, and the fluctuation portion 63c as a third fluctuation portion is provided with a cam contact portion 61c. Accordingly, the fluctuation portion 63b fluctuates with the cam Cb and the fluctuation portion 63c fluctuates with the cam Cc.

The valve driving portions 62 are disposed in the fluctuation portion 63b. Accordingly, the fluctuation portion 63b out of the fluctuation portions 63a, 63b, and 63c in the rocker arm portion 63 drives the exhaust valve 55. The fluctuation portions 63a, 63b, and 63c are supported by the rocker arm shaft 64 so as to individually fluctuate. In this configuration, the shaft hole Hs is specifically disposed to penetrate the fluctuation portions 63a, 63b, and 63c.

The rocker arm portion 63 includes coupling mechanisms 631, 632 as plural coupling mechanisms. The coupling mechanisms 631, 632 perform coupling and decoupling between two fluctuation portions (specifically, two fluctuation portions adjacent to each other) out of the fluctuation portions 63a, 63b, and 63c. Specifically, the coupling mechanism 631 as a first coupling mechanism performs coupling and decoupling between the fluctuation portion 63a and the fluctuation portion 63b, and the coupling mechanism 632 as a second coupling mechanism performs coupling and decoupling between the fluctuation portion 63b and the fluctuation portion 63c.

The fluctuation portion 63a is provided with an impelling member (for example, a return spring) that impels the cam contact portion 61a to the cam Ca in a range in which the cam Ca can drive the exhaust valve 55. Accordingly, the cam contact portion 61a comes in contact with the cam Ca in a state where the coupling to the fluctuation portion 63a is released. The same is true of the fluctuation portion 63c. The impelling forces of the impelling members are set to a range in which a predetermined cam out of the cams Ca, Cb, and Cc can drive the exhaust valve 55 even when at least one of the coupling between the fluctuation portions 63a, 63b and the coupling between the fluctuation portions 63b, 63c is performed.

FIG. 8 is a diagram illustrating the coupling mechanisms 631, 632. The coupling mechanism 631 is connected to an oil control valve (OCV) 81 and the coupling mechanism 632 is connected to an OCV 82. The OCV 81 transmits an oil pressure to the coupling mechanism 631 when it is in an ON state, and opens the oil pressure from the coupling mechanism 631 when it is in an OFF state. The OCV 82 transmits an oil pressure to the coupling mechanism 632 when it is in an ON state, and opens the oil pressure from the coupling mechanism 632 when it is in an OFF state.

A flow channel R1 connects the OCV 81 and the coupling mechanism 631. A flow channel R2 connects the OCV 82 and the coupling mechanism 632. The flow channels R1, R2 are independently disposed. Each of the flow channels R1, R2 may be, for example, a flow channel connected to the corresponding coupling mechanism out of the coupling mechanisms 631, 632 via a member extending along the cam shaft 65. At least one of the flow channels R1, R2 may be, for example, a flow channel connected to the corresponding coupling mechanism out of the coupling mechanisms 631, 632 via the rocker arm shaft 64.

Specifically, the coupling mechanism 631 includes holding portions H11, H12, pins Pn11, Pn12, and a spring Sp1. Specifically, the coupling mechanism 632 includes holding portions H21, H22, pins Pn21, Pn22, and a spring Sp2. The coupling mechanisms 631, 632 have the same structure. Accordingly, the coupling mechanisms 631, 632 will be described below with the coupling mechanism 631 as an example.

The holding portion H11 is disposed in the fluctuation portion 63a and the holding portion H12 is disposed in the fluctuation portion 63b. The holding portions H11, H12 are arranged along the extending direction of the cam shaft 65 when the exhaust valve 55 is not lifted. The holding portions H11, H12 have a bottomed cylindrical shape and have the same inner diameter. Here, the term "the same" includes a difference within a manufacturing error. The same is true of the following description. The OCV 81 is specifically connected to the inside of the holding portion H11 from the bottom of the holding portion H11 via the flow channel R1.

The pin Pn11 is held by at least the holding portion H11 of the holding portions H11, H12. The pin Pn12 is held by the holding portion H12 of the holding portions H11, H12. The pins Pn11, Pn12 have a cylindrical shape and have the same outer diameter. The outer diameter of the pins Pn11, Pn12 is set to be smaller by a sliding clearance than the inner diameter of the holding portions H11, H12. The spring Sp1 is disposed between the bottom of the holding portion H12 and the pin Pn12. The spring Sp1 impels the pin Pn12. The length of the spring Sp1 is set to a length with which the pin Pn12 does not reach the holding portion H11.

The coupling mechanism 631 performs coupling between the fluctuation portions 63a, 63b when the OCV 81 is in the ON state. Specifically, in this case, in the state where the exhaust valve 55 is not lifted, the oil pressure transmitted via the OCV 81 causes the pins Pn11, Pn12 to move together against the impelling force of the spring Sp1. As a result, the pin Pn11 is held by the holding portion H11 and the holding portion H12, whereby the fluctuation portions 63a, 63b are coupled to each other.

The coupling mechanism 631 performs decoupling between the fluctuation portions 63a, 63b when the OCV 81 is in the OFF state. Specifically, in this case, in the state where the exhaust valve 55 is not lifted, the spring Sp1 causes the pins Pn11, Pn12 to move together against the oil pressure opened via the OCV 81. As a result, the pin Pn11 is held by the holding portion H11, whereby the fluctuation portions 63a, 63b are decoupled from each other.

In this way, in the coupling mechanism 631, specifically, the pin Pn11 performs coupling and decoupling between the fluctuation portions 63a, 63b. In the coupling mechanism 632, the pin Pn21 performs coupling and decoupling between the fluctuation portions 63b, 63c. The pin Pn11 is a first pin and is an example of the first lock member. The pin Pn21 is a second pin and is an example of the second lock member.

Figure 9A:
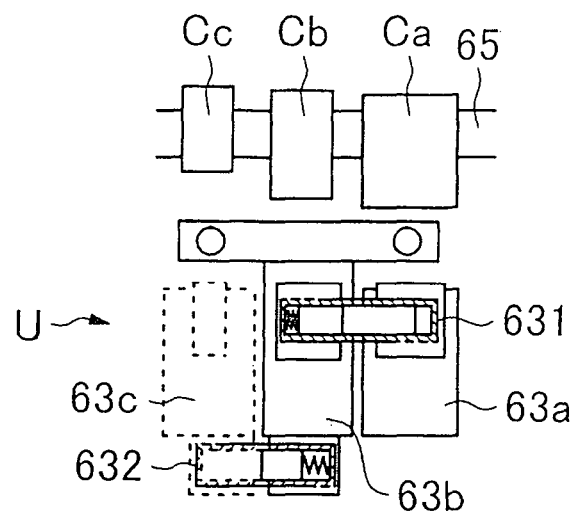
FIGS. 9A to 9C are diagrams illustrating use patterns of use cams.
Figure 9B:
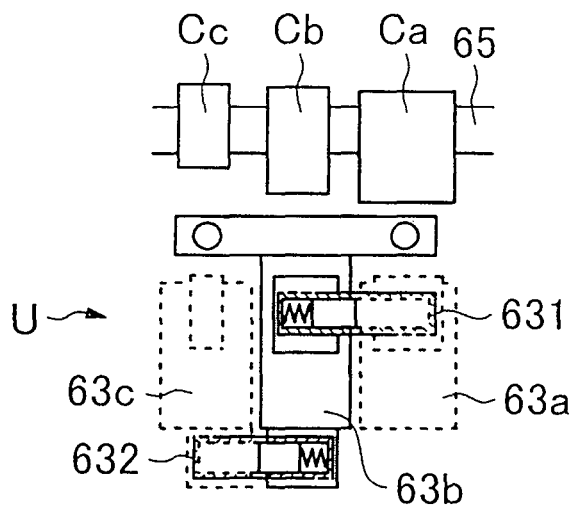
Figure 9C:
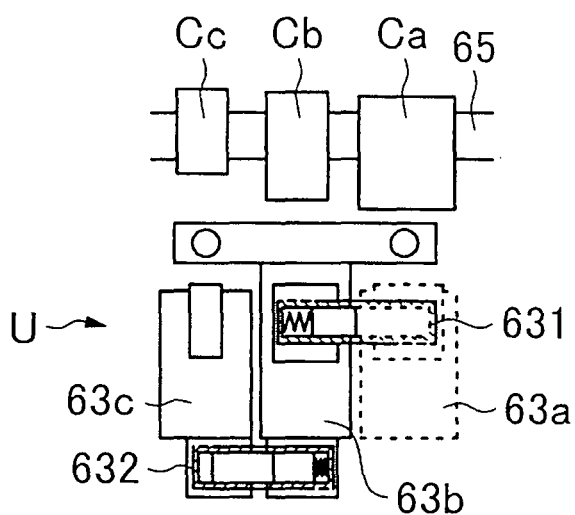

FIGS. 9A to 9C are diagrams illustrating use patterns of the use cams. FIG. 9A illustrates a pattern Pt1 as a first pattern, FIG. 9B illustrates a pattern Pt2 as a second pattern, and FIG. 9C illustrates a pattern Pt3 as a third pattern. The fluctuation portion 63a or the fluctuation portion 63c denoted by dotted lines is in a decoupled state. The coupling mechanisms 631, 632 switch the use pattern of the use cam to three or more patterns (three patterns from the pattern Pt1 to the pattern Pt3).

The pattern Pt1 sets the use cam to the cam Ca. In this case, the coupling mechanism 631 couples the fluctuation portions 63a, 63b and the second coupling mechanism 632 decouples the fluctuation portions 63b, 63c. In this case, in terms of a coupling mode, the exhaust valve 55 can be driven with the cams Ca, Cb. On the other hand, the cam profiles of the cams Ca, Cb are set so that the amount of lift of the exhaust valve 55 with the cam Ca is greater than that with the cam Cb in each phase as described above. Accordingly, in this case, the exhaust valve 55 is driven with the cam Ca.

The pattern Pt2 sets the use cam to the cam Cb. In this case, the coupling mechanism 631 decouples the fluctuation portions 63a, 63b from each other and the coupling mechanism 632 decouples the fluctuation portions 63b, 63c from each other. In this case, dynamic power is not transmitted from the first fluctuation portion 63a to the second fluctuation portion 63b. Similarly, dynamic power is not transmitted from the third fluctuation portion 63c to the second fluctuation portion 63b. Accordingly, in this case, the exhaust valve 55 is driven with the cam Cb.

The pattern Pt3 sets the use cam to the cams Cb, Cc. In this case, the coupling mechanism 631 decouples the fluctuation portions 63a, 63b from each other and the coupling mechanism 632 couples the fluctuation portions 63b, 63c to each other. As a result, the exhaust valve 55 is driven with the cams Cb, Cc. The unit U may employ a use pattern in which the use cam is set to cams Ca, Cc. In this case, the entire unit U is involved in the driving of the exhaust valve 55 and thus the weight acting on the exhaust valve 55 increases. As a result, a valve bounce may occur in the exhaust valve 55. Accordingly, the switching of the use cam to such a use pattern is excluded herein.

The variable valve mechanism 60 is configured to switch the cams such that a plurality of modes are performed. The cam switching mode differs depending on the switching form of the use cam. The switching form of the use cam is a form of switching from one use pattern to the other use pattern between two use patterns out of plural use patterns of the use cam.

The cam switching modes specifically include first to third modes to be described below. In the first mode, the switching form of the use cam is switching from a pattern Pt2 to a pattern Pt1 (that is, switching from the cam Cb to the cam Ca). In the second mode, the switching form of the use cam is switching from the pattern Pt2 to a pattern Pt3 (that is, switching from the cam Cb to the cams Ca, Cc). In the third mode, the switching form of the use cam is switching from the pattern Pt3 to the pattern Pt1 (that is, switching from the cams Cb, Cc to the cam Ca). The plural modes as the cam switching modes in the variable valve mechanism 60 specifically include total six modes of the first to third modes and three modes in which the switching form of the use cam is reverse in the first to third modes.

The ECU 70 illustrated in FIG. 1 or the like is an electronic control unit, and the ECU 70 is electrically connected to the EGR valve 43, the fuel injection valve 56, the OCVs 81, 82, and the warning lamp 85 as control targets. The ECU is also electrically connected to the air flowmeter 11, the in-cylinder pressure sensor 91, a crank angle sensor 92 that detects a crank angle θ, an accelerator opening sensor 93 that gives an acceleration request to the internal combustion engine 50, a vehicle speed sensor 94 that detects a speed of a vehicle having the internal combustion engine 50 mounted thereon, and oil pressure sensors 95, 96 that detect oil pressures transmitted to the OCVs 81, 82 as sensor and switch types. The warning lamp 85 is a warning unit and may be disposed, for example, in the interior of the vehicle having the internal combustion engine 50 mounted thereon.

In the ECU 70, the CPU performs processes using a temporary memory area of a RAM on the basis of a program stored in a ROM if necessary, whereby, for example, a determination unit and first to fourth control units to be described below are embodied. This configuration may be embodied, for example, by plural electronic control units.

The determination unit determines whether switching abnormality of a use cam in the variable valve mechanism 60 is present on the basis of a locus M in a predetermined period K. The predetermined period K is a period in which the exhaust valve 55 is opened. The locus M is an in-cylinder pressure changing rate $dPc/d\theta$ and is a locus indicating a variation of the in-cylinder pressure changing rate $dPc/d\theta$ with respect to the crank angle θ. The in-cylinder pressure changing rate $dPc/d\theta$ is a pressure changing rate of the combustion chamber E. In the internal combustion engine 50 having plural cylinders 51a, the in-cylinder pressure changing rate $dPc/d\theta$ of at least one of the plural cylinders 51a is specifically employed as the in-cylinder pressure changing rate $dPc/d\theta$.

FIG. 10 is a diagram illustrating the predetermined period K. A lift curve La indicates a lift curve L of the exhaust valve 55 obtained when the exhaust valve 55 is driven in accordance with the cam profile of the cam Ca. A lift curve Lb indicates a lift curve L obtained when the exhaust valve 55 is driven in accordance with the cam profile of the cam Cb. A lift curve Lc indicates a lift curve L obtained when the exhaust valve 55 is driven in accordance with the cam profile of the cam Cc.

The predetermined period K specifically includes valve opening periods Ka, Kb, and Kc of the exhaust valve 55 when the exhaust valve 55 is driven with the cams Ca, Cb, and Cc. In this configuration, the determination unit determines whether the switching abnormality is present on the basis of the cam switching mode. In this case, when the switching of the use cam is normally performed, the predetermined period K can be further specified as at least one period (for example, the valve opening period Ka or the valve opening periods Kb and Kc) of a period in which the exhaust valve 55 is opened with the switching of the use cam and a period in which the exhaust valve 55 is not opened with the switching of the use cam.

The predetermined period K specified in this way on the basis of the cam switching mode can be specified in advance depending on the cam switching mode. The variable valve mechanism 60 can switch the use cam in a period other than the specified predetermined period K. The predetermined period K can be further specified as a period after the switching of the use cam has started.

When determining whether the switching abnormality is present on the basis of the locus M, the determination unit determines whether the switching abnormality is present on the basis of a predetermined item of the locus M. The predetermined item includes at least one of presence, absence, value, and generating timing of an inflection point obtained by the operation of the exhaust valve 55. The inflection point will be described in detail later.

When it is determined that switching abnormality is present in at least one of the plural modes, the determination unit determines that the variable valve mechanism 60 is abnormal. When it is determined that the switching abnormality is not present in all of the plural modes, the determination unit determines that the variable valve mechanism 60 is normal. When determining whether the switching abnormality is present, the determination unit specifically determines whether abnormality is present in coupling or decoupling that is performed by at least one of the pins Pn11, Pn21.

The determination unit further determines the cam switching state of the variable valve mechanism 60 on the basis of the cam switching mode and the locus M in the predetermined period K. When determining the cam switching state, the determination unit specifically determines an abnormality form of the switching abnormality of the use cam in the variable valve mechanism 60. The abnormality form specifically includes mechanical failure and responsiveness failure. The mechanical failure specifically includes bounce, oblique insertion, fixation, and incomplete separation of the pin Pn11 or the pin Pn21. The responsiveness failure specifically includes a response delay of the switching timing of the use cam caused between the coupling mechanisms 631, 632 in the unit U and a response delay of the switching timing of the use cam caused between the cylinders 51*a*.

When determining presence or absence of the switching abnormality and the abnormality form, the determination unit specifically determines the abnormality form along with the presence or absence of the switching abnormality. Specifically, the determination unit simultaneously determines the presence or absence of the switching abnormality and the abnormality form by determining whether the switching abnormality is present on the basis of plural determination methods different depending on the abnormality forms.

When determining whether the switching abnormality is present, the determination unit specifically repeatedly determines whether the switching abnormality is present. When it is repeatedly determined for a predetermined time that the switching abnormality is present, the determination unit duly determines that the switching abnormality is present.

On the other hand, when it is determined that the switching abnormality is not present before repeatedly determining that the switching abnormality is present for a predetermined time, the determination unit duly determines that the switching abnormality is not present. When it is determined that the switching abnormality is present before the predetermined time elapses, the determination unit provisionally determines that the switching abnormality is present.

The first control unit gives a warning when the determination unit determines that the switching abnormality is present. The first control unit specifically gives a warning by turning on the warning lamp 85. The second control unit performs a fail-safe control depending on the abnormality form determined by the determination unit. The fail-safe control includes at least one of limiting of a maximum vehicle speed in the vehicle having the internal combustion engine 50 mounted thereon, limiting of a maximum rotation speed of the internal combustion engine 50, and limiting of an amount of fuel injected.

The third control unit limits an EGR ratio depending on the abnormality form determined by the determination unit. The EGR ratio is a ratio of the amount of exhaust air recirculated by recirculation of exhaust air to the total amount of gas suctioned into the cylinders. The fourth control unit performs re-switching of the use cam when the determination unit provisionally determines that the switching abnormality is present and determines that the abnormality form of the switching abnormality is the bounce of the pin Pn11 or the pin Pn21.

At the time of performing the fail-safe control, the second control unit performs the fail-safe control when the determination unit duly determines that the switching abnormality is present. The fail-safe control performed by the second control unit may be the same in some of the abnormality forms determined by the determination unit. The second control unit can perform fail-safe controls having different degrees such as a degree of limiting of the maximum vehicle speed, a degree of limiting of the maximum rotation speed, and a degree of limiting of the amount of fuel injected in the abnormality forms on which the same type of fail-safe control is performed out of the abnormality forms determined by the determination unit. This is true of limiting of the EGR ratio that is performed by the third control unit.

The ECU 70 by which the determination unit is embodied is an example of an abnormality determining device. In addition, the ECU 70 by which the first control unit is embodied is an example of a warning device, the ECU 70 by which the second control unit is embodied is an example of a control device, the ECU 70 by which the third control unit is embodied is an example of an EGR ratio limiting device, and the ECU 70 by which the fourth control unit is embodied is an example of a re-switching device. That is, the internal combustion engine 50 is configured to include these devices by including the ECU 70. These devices may be embodied by the same electronic control unit or at least a part of the devices may be embodied by different electronic control units. The warning device may be understood to have a configuration including the warning lamp 85 as a warning unit.

Figure 11A:
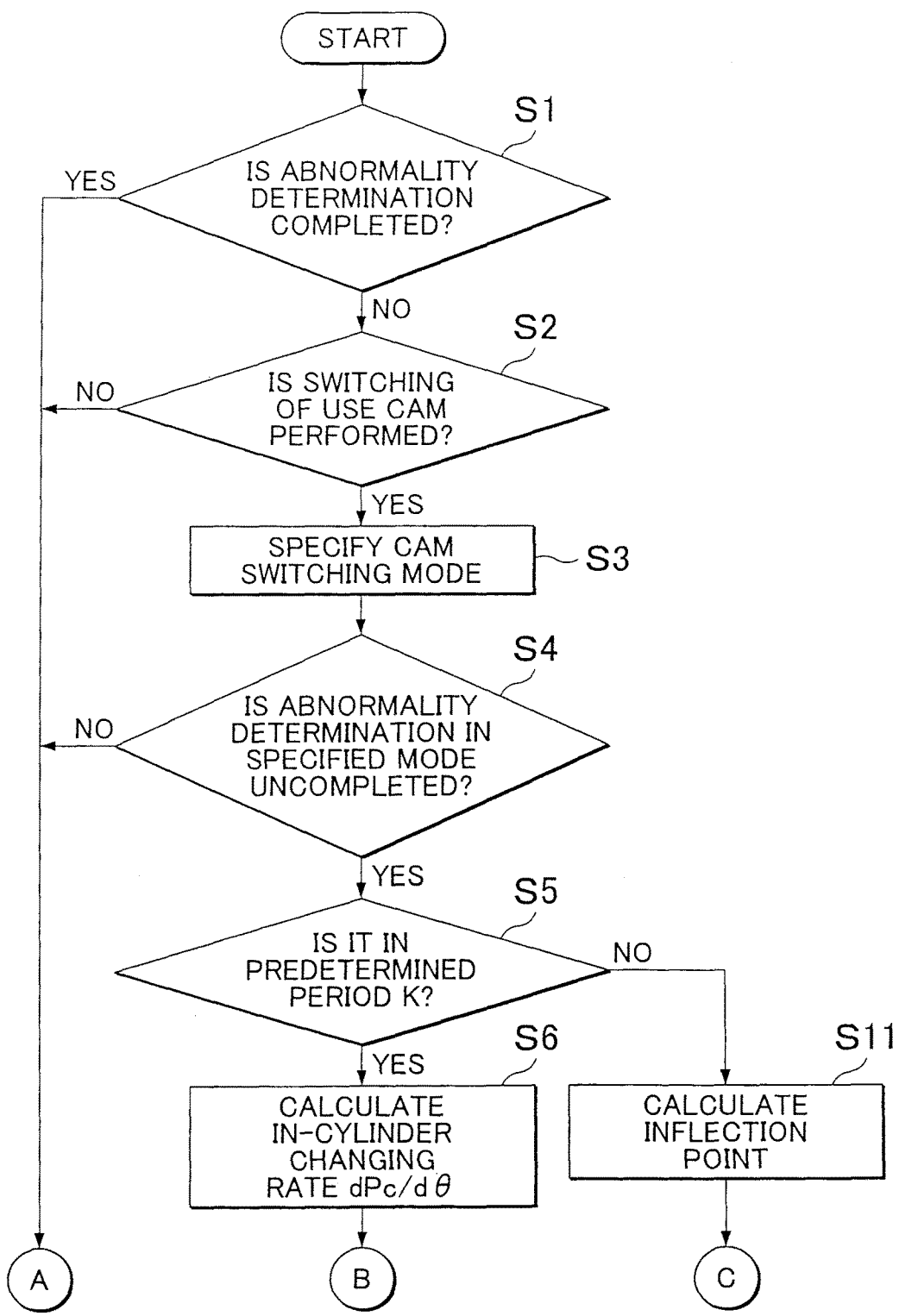
FIG. 11A and FIG. 11B are a flowchart illustrating an example of an entire control.
Figure 11B:
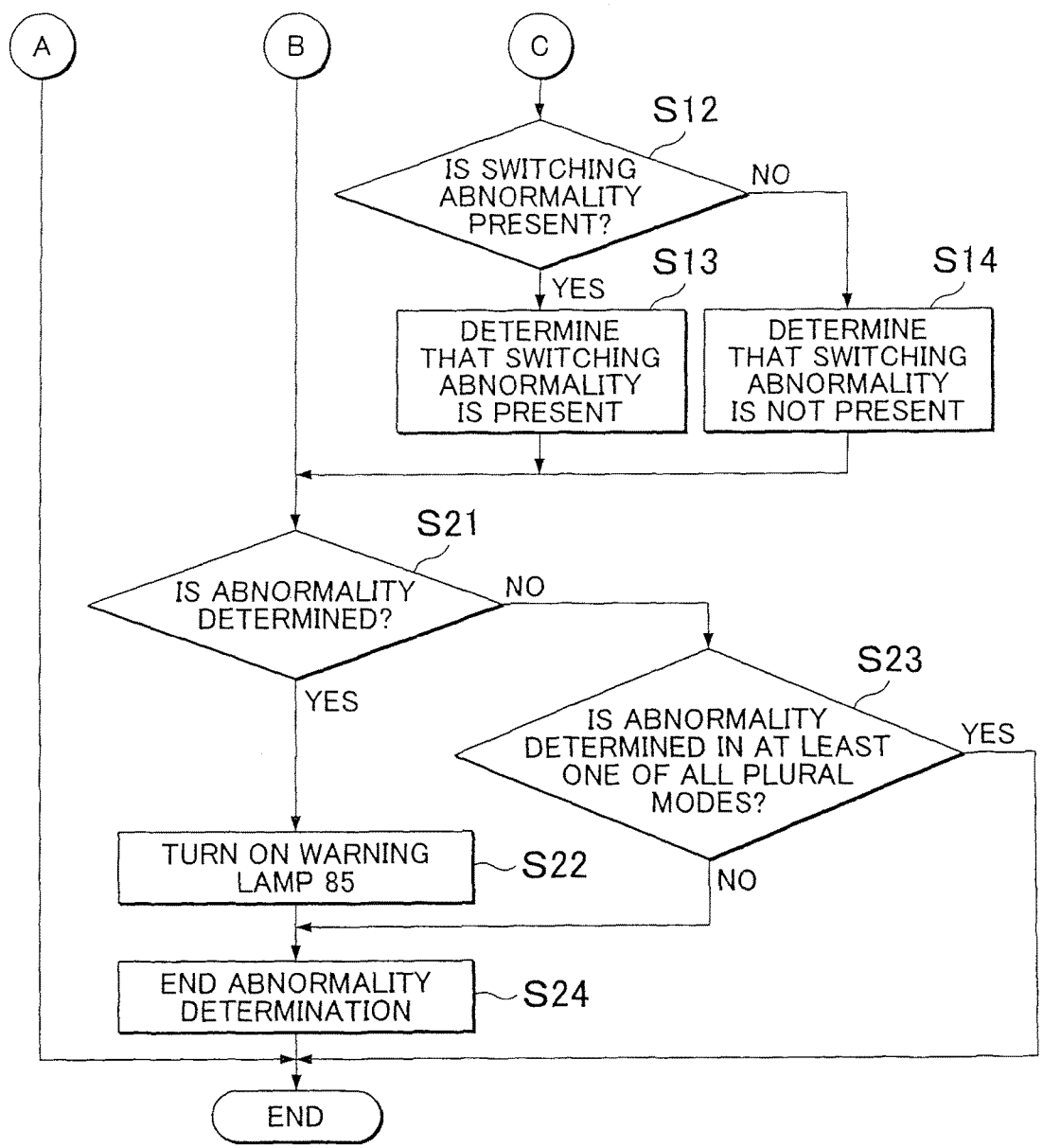

An example of an overall control of the abnormality determination of determining whether the switching abnormality is present will be described below with reference to the flowchart illustrated in FIG. 11A and FIG. 11B. This flowchart can be performed, for example, whenever the internal combustion engine 50 is started. The ECU 70 determines whether the abnormality determination of determining whether the switching abnormality is present is completed (step S1). In step S1, it is specifically determined whether the presence or absence of the switching abnormality is determined in all of the plural modes. When the determination result of step S1 is positive, the flowchart ends.

When the determination result of step S1 is negative, the ECU 70 determines whether the switching of the use cam is performed (step S2). Whether the switching of the use cam is performed can be determined, for example, depending on whether a performance condition of the switching of the use cam is established and whether the switching of the use cam is completed. Whether the switching of the use cam is completed can be determined, for example, depending on whether a predetermined time elapses after the performance condition of the switching of the use cam is established. When the determination result of step S2 is negative, the flowchart temporarily ends.

When the determination result of step S2 is positive, the ECU 70 specifies the cam switching mode of the switching of the use cam in performance (step S3). The cam switching mode can be specified, for example, on the basis of the established performance condition of the switching of the use cam. Subsequently, the ECU 70 determines whether the abnormality determination is uncompleted in the specified mode (step S4). When the determination result is negative, the flowchart temporarily ends. When the determination result is positive, the ECU 70 determines whether it is in the predetermined period K (step S5). When the determination result is positive, the ECU 70 calculates the in-cylinder pressure changing rate $dPc/d\theta$ (step S6).

Subsequently to step S6, the ECU 70 determines whether the abnormality determination is present (whether it is determined that the switching abnormality is present) (step S21). In step S21, specifically, it is determined whether the switching abnormality is present in any of the plural modes. When the determination result of step S21 is negative, the ECU 70 determines whether the abnormality determination is present in at least one of the plural modes (step S23). When the determination result is positive, the flowchart temporarily ends.

When the flowchart temporarily ends through the positive determination of step S23 after the determination result of step S5 is positive, the in-cylinder pressure changing rate $dPc/d\theta$ is calculated in step S6 whenever the determination result of step S5 in the subsequent routine is positive. As a result, the locus M in the predetermined period K is obtained. On the other hand, when the determination result of step S5 in the subsequent routine is negative, the ECU 70 calculates an inflection point (step S11) and determines whether the switching abnormality is present on the basis of a predetermined item of the locus M (step S12). An example of the specific determination that can be performed in step S12 will be described later.

When the determination result of step S12 is positive, the ECU 70 determines that the switching abnormality is present in the specified mode (step S13). In step S13, the ECU 70 can specifically set a flag indicating that it is determined that the switching abnormality is present to ON. In this case, through the positive determination of step S21 subsequent thereto, the ECU 70 turns on the warning lamp 85 (step S22).

When the determination result of step S12 is negative, the ECU 70 determines that the switching abnormality is not present in the specified mode (step S14). In step S14, the ECU 70 can specifically set a flag indicating that it is determined that the switching abnormality is not present in the specified mode to ON. In this case, the determination result of step S21 subsequent thereto is negative. When it is determined in step S14 that the switching abnormality is not present in the plural modes, the determination result of step S23 is negative.

Subsequently to step S22 or the negative determination of step S23, the ECU 70 completes the abnormality determination (step S24). In step S24, the ECU 70 can specifically set a flag indicating that it is completely determined whether the switching abnormality is present to ON. After step S24, the flowchart ends. When the flowchart ends through the negative determination of step S23 and step S24, for example, the abnormality determination in the respective modes is reset to an incomplete state and then the flowchart may be restarted.

The mechanical failure in the first mode, the mechanical failure in the second mode, the mechanical failure in the third mode, the first responsiveness failure, and the second responsiveness failure will be sequentially described below individually and specifically.

Figure 12A:
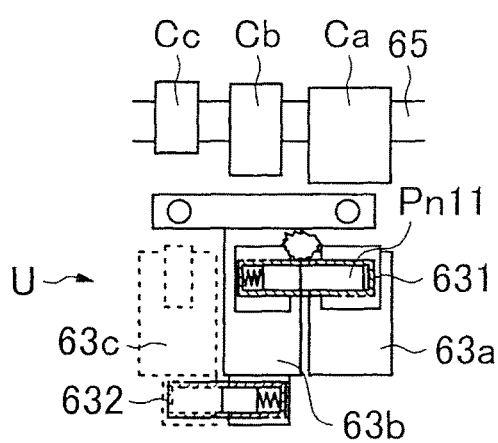
Figure 12B:
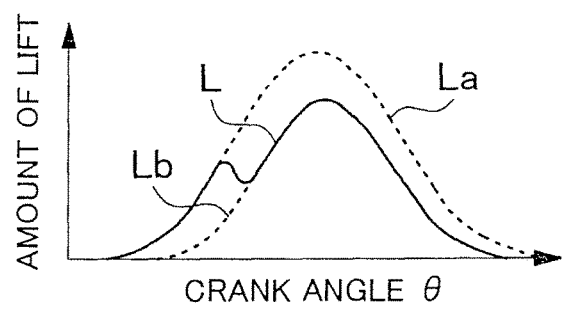
Figure 12C:
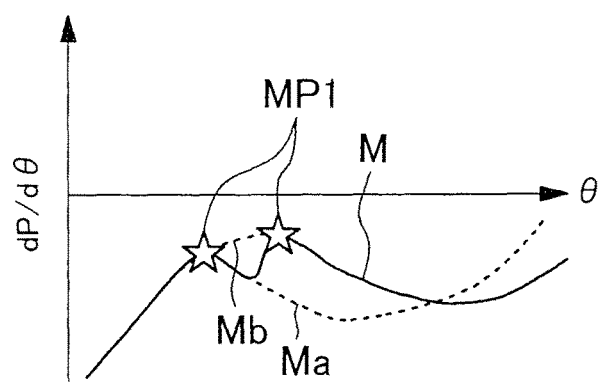

FIGS. 12A to 12F are diagrams illustrating the first mechanical failure in the first mode. FIGS. 12A to 12F illustrate an example where the mechanical failure is the bounce of the pin Pn11. FIG. 12A is a diagram illustrating the state of the unit U based on the mechanical failure. FIG. 12B is a diagram illustrating an amount of lift of the exhaust valve 55 with respect to the crank angle $\theta$. FIG. 12C is a diagram illustrating a variation of the in-cylinder pressure changing rate $dPc/d\theta$ with respect to the crank angle $\theta$. FIG. 12D is a diagram illustrating a variation of the in-cylinder pressure Pc with respect to the crank angle $\theta$. FIG. 12E is an enlarged view of a part of FIG. 12D in the scale of the vertical axis. FIG. 12F is a diagram illustrating a variation of the in-cylinder pressure changing rate $dPc/d\theta$ corresponding to FIGS. 12D and 12E. The scale of the horizontal axis in FIGS. 12D, 12E, and 12F is the same, but the scale of the horizontal axis in FIGS. 12B and 12C is not the same.

As illustrated in FIG. 12A, when the bounce of the pin Pn11 occurs in the first mode in which the fluctuation portions 63a, 63b are coupled, the exhaust valve 55 to be driven with the cam Ca is driven with the cam Cb on the way. As a result, as illustrated in FIG. 12B, the lift curve L of the exhaust valve 55 describes a curve transitioning from the lift curve La to the lift curve Lb. As illustrated in FIG. 12B, in other words, the cam profiles of the cams Ca, Cb are set so that the lift curve Lb is included in the lift curve La.

As illustrated in FIG. 12C, in this case, the locus M describes the following locus. That is, the locus describes a locus transitioning from a locus Ma, which is the locus M obtained when the exhaust valve 55 is driven in accordance with the cam profile of the cam Ca, to a locus Mb, which is the locus M obtained when the exhaust valve 55 is driven in accordance with the cam profile of the cam Cb. As a result, two inflection points MP1 as the first inflection point appear in the locus M.

The inflection points MP1 are inflection points obtained with the operation of the exhaust valve 55 based on at least one of the cams Ca, Cb in the locus M. Specifically, the inflection point MP1 is an inflection point appearing due to a variation of the in-cylinder pressure Pc with the operation of the exhaust valve 55 based on at least one of the cams Ca, Cb in the locus M.

Specifically, the two inflection points MP1 appear due to the variation of the in-cylinder pressure Pc to be described later. That is, in this case, the in-cylinder pressure Pc varies with the opening of the exhaust valve 55 and also varies with the transition of the lift curve L from the lift curve La to the lift curve Lb (the variation of the opening operation of the exhaust valve 55). As a result, as illustrated in FIGS. 12D and 12E, a step based on the opening of the exhaust valve 55 and a step based on the transition of the lift curve L appear in the curve of the in-cylinder pressure Pc. Accordingly, in this case, the inflection points MP1 appear due to the steps as illustrated in FIG. 12F.

Therefore, the determination unit determines that the switching abnormality is present when the cam switching mode is the first mode and plural inflection points MP1 appear in the locus M. The determination unit also determines that the abnormality form is the bounce of the pin Pn11. When it is duly determined that the abnormality form is the bounce of the pin Pn11, the second control unit can perform, for example, the limiting of the maximum rotation speed of the internal combustion engine 50 and the limiting of the amount of fuel injected. The second control unit may perform the limiting of the maximum vehicle speed instead of the limiting of the maximum rotation speed or in addition to the limiting of the maximum rotation speed.

FIGS. 13A to 13F are diagrams illustrating the second mechanical failure in the first mode. FIGS. 13A to 13F illustrate an example where the mechanical failure is the oblique insertion of the pin Pn11. FIGS. 13A to 13F are the same diagrams as FIGS. 12A to 12F.

Figure 13A:
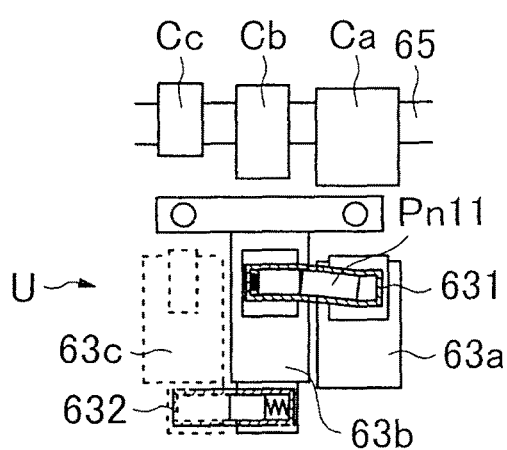
FIGS. 13A to 13F are diagrams illustrating second mechanical failure in the first mode.
Figure 13B:
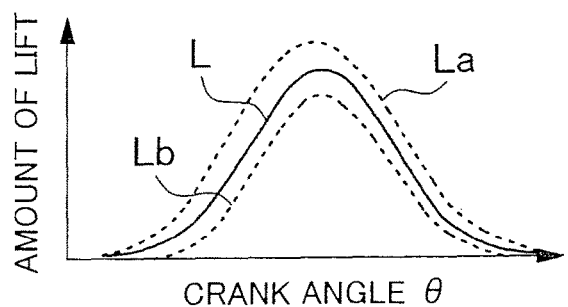
Figure 13C:
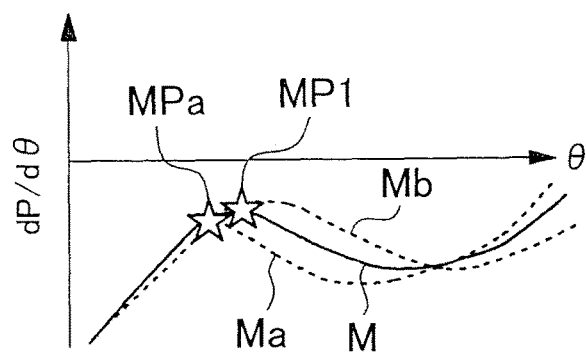

As illustrated in FIG. 13A, when the oblique insertion of the pin Pn11 occurs in the first mode, the exhaust valve 55 is driven with the cam Ca while generating lift loss. As a result, as illustrated in FIG. 13B, the lift curve L of the exhaust valve 55 describes a curve located between the lift curves La, Lb. Accordingly, the locus M describes a locus other than the loci Ma, Mb as illustrated in FIG. 13C. As a result, the inflection point MP1 appears in a phase different from that of the inflection point MPa. The inflection point MPa is a first predetermined inflection point and is an inflection point obtained with the operation of the exhaust valve 55 based on the cam Ca when the exhaust valve 55 is driven in accordance with the camp profile of the cam Ca in the locus M. Accordingly, the inflection point MPa is present on the locus Ma.

Figure 13D:
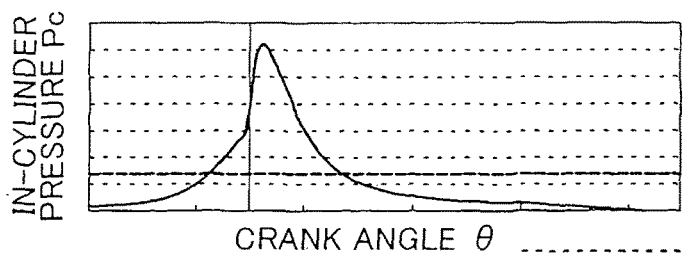
Figure 13E:
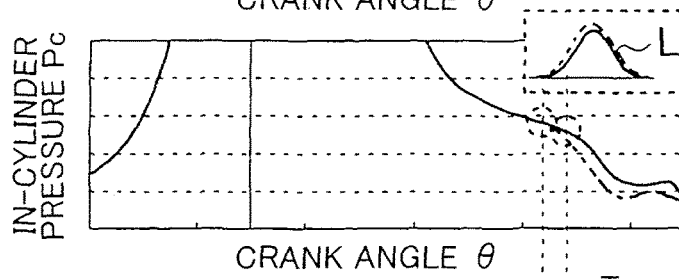
Figure 13F:
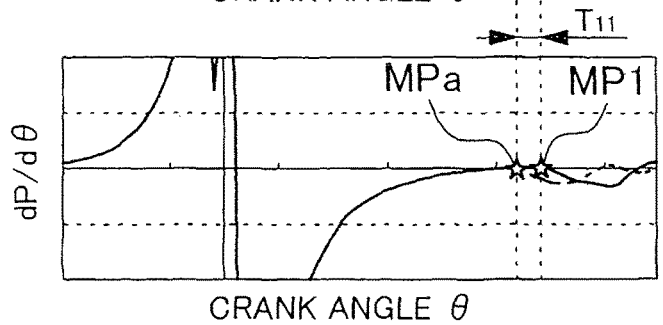

Specifically, the inflection point MP1 appears as described above with the variation of the in-cylinder pressure Pc to be described below. That is, as illustrated in FIGS. 13D and 13E, in this case, the delay of the opening timing of the exhaust valve 55 due to the lift loss delays the variation of the in-cylinder pressure Pc generated with the opening of the exhaust valve 55. Accordingly, in this case, the inflection point MP1 appears in a phase different by a deviation $T_{11}$ from that of the inflection point MPa as illustrated in FIG. 13F. The deviation $T_{11}$ is a deviation (a first deviation herein) with respect to the inflection point MP1 and represents the magnitude of a phase difference between the inflection points MP1, MPa. An inflection point set in advance can be used as the inflection point MPa. The inflection point MPa may be set depending on a parameter affecting the inflection point MPa. This is true of inflection points MPb, MPc to be described later.

Therefore, when the cam switching mode is the first mode, one inflection point MP1 appears in the locus M, and the inflection point MP1 is an inflection point of which the deviation $T_{11}$ is greater than a predetermined value α (greater than or equal to the predetermined value α herein), the determination unit determines that the switching abnormality is present. The determination unit also determines that the abnormality form is the oblique insertion of the pin Pn11. When it is duly determined that the abnormality form is the oblique insertion of the pin Pn11, the second control unit can perform, for example, at least the limiting of the maximum rotation speed of the limiting of the maximum rotation speed of the internal combustion engine 50 and the limiting of the amount of fuel injected.

FIGS. 14A to 14F are diagrams illustrating the third mechanical failure in the first mode. FIGS. 14A to 14F illustrate an example where the mechanical failure is the fixation of the pin Pn11. FIGS. 14A to 14F are the same diagrams as FIGS. 12A to 12F.

Figure 14A:
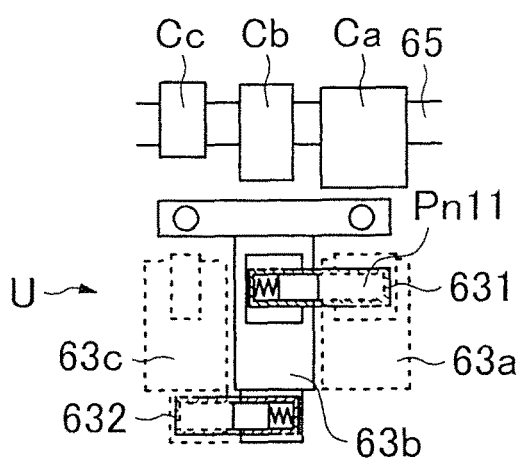
Figure 14B:
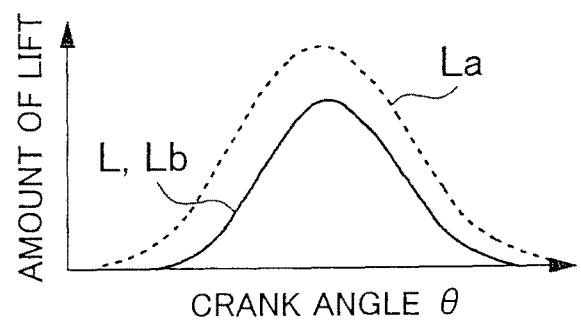
Figure 14C:
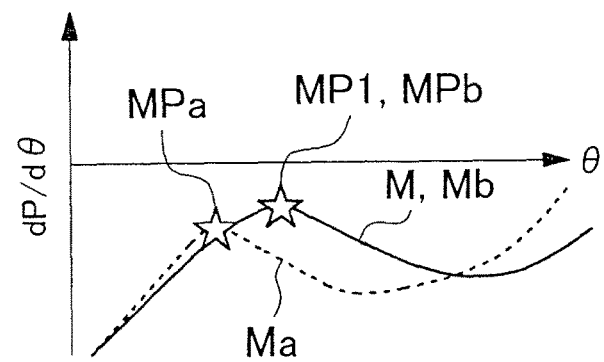
Figure 15:
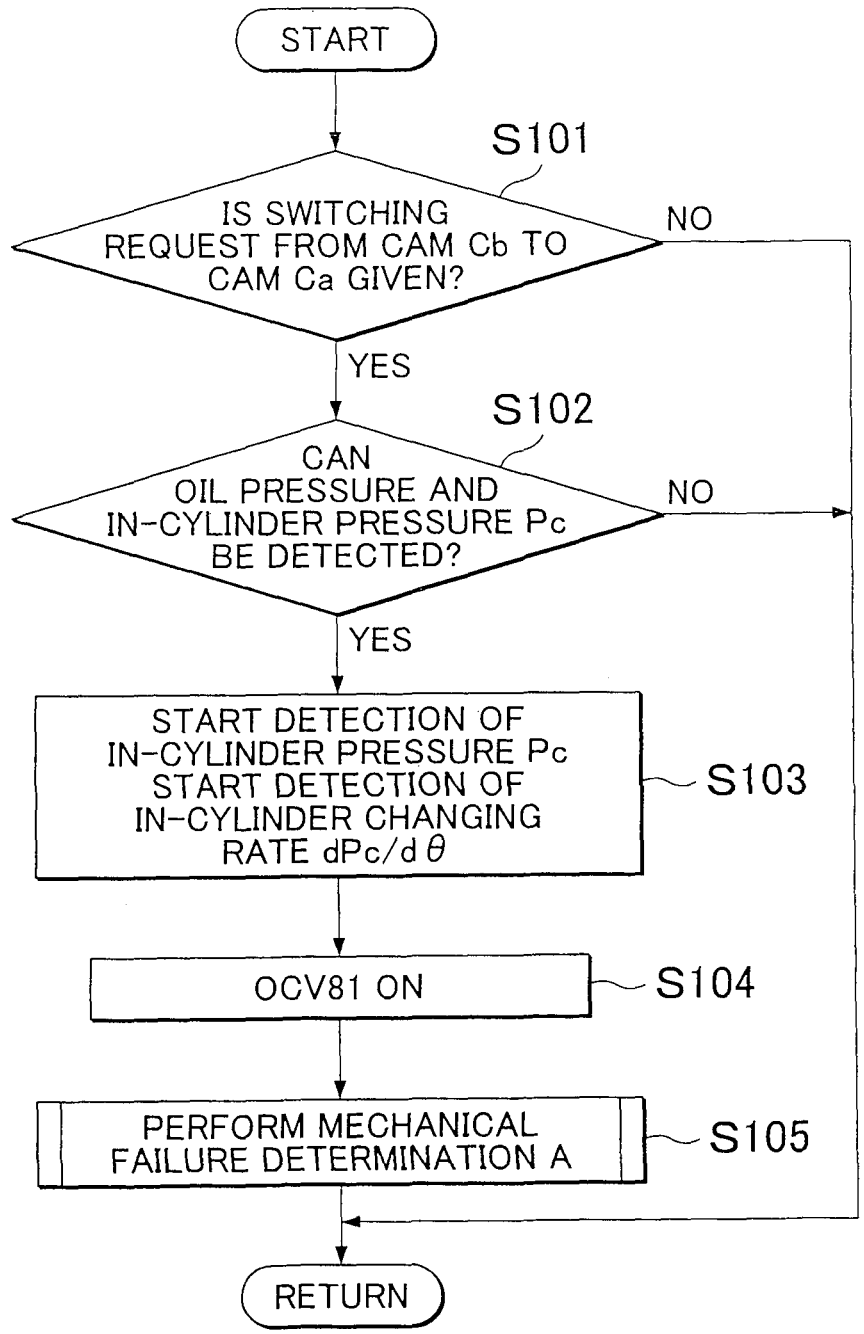
FIG. 15 is a first flowchart illustrating a first control example.

As illustrated in FIG. 14A, when the fixation of the pin Pn11 occurs in the first mode, the exhaust valve 55 is driven with the cam Cb. Accordingly, as illustrated in FIG. 14B, the lift curve L of the exhaust valve 55 is the same as the lift curve Lb. In this case, the locus M is the same as the locus Mb as illustrated in FIG. 14C. As a result, the inflection point MP1 is the same as the inflection point MPb. That is, the inflection point MP1 is immovable. The inflection point MPb is an inflection point of the locus Mb. In this case, as illustrated in FIGS. 14D and 14E, the variation of the in-cylinder pressure Pc is maintained in the variation based on the cam Cb. Accordingly, as illustrated in FIG. 14F, the inflection point MP1 is immovable.

Therefore, when the cam switching mode is the first mode, one inflection point MP1 appears in the locus M, and the inflection point MP1 is immovable before and after the switching of the use cam based on the first mode, the determination unit determines that the switching abnormality is present. The determination unit determines that the abnormality form is the fixation of the pin Pn11. When it is duly determined that the abnormality form is the fixation of the pin Pn11, the second control unit can perform, for example, the limiting of the maximum rotation speed of the internal combustion engine 50 and the limiting of the amount of fuel injected. Specifically, whether the inflection point MP1 is immovable can be determined on the basis of a deviation $T_{12}$ to be described later.

The determination unit, which determines the abnormality form as described above when the cam switching mode is the first mode, determines the abnormality form on the basis of the cam switching mode and the inflection point MP1 when the cam switching mode is the first mode.

A first control example will be described below with reference to the flowcharts illustrated in FIGS. 15 to 18. The first control example is an example of an individual control operation of causing the ECU 70 to perform an operation of switching the use cam based on the first mode and to determine whether the switching abnormality due to the mechanical failure is present in the switching operation. In the first control example, it is determined whether the switching abnormality is present in any of the plural cylinders 51a. Whether the switching abnormality is present may be determined in each of the plural cylinders 51a.

The ECU 70 determines whether a switching request for switching the use cam from the cam Cb to the cam Ca is given (step S101). When it is duly determined that the switching request for the use cam is given, or when it is duly determined that the switching abnormality due to the mechanical failure is not present, the switching request for the use cam can be stopped. When the determination result is positive, the ECU 70 determines whether an oil pressure and the in-cylinder pressure Pc can be detected (step S102). In step S102, it is specifically determined whether the variable valve mechanism 60 can be operated and whether presence or absence of the switching abnormality can be determined.

When the determination results of steps S101, S102 are negative, the control process flow returns to step S101. When the determination result of step S102 is positive, the ECU 70 starts detection of the in-cylinder pressure Pc with respect to the crank angle θ and starts calculation of the in-cylinder pressure changing rate dPc/dθ (step S103). The detection of the in-cylinder pressure Pc and the calculation of the in-cylinder pressure changing rate dPc/dθ can be stopped when the sub-routine of mechanical failure determination A described in step S105 ends.

The detection of the in-cylinder pressure Pc and the calculation of the in-cylinder pressure changing rate dPc/dθ may be performed, for example, independently. The calculated in-cylinder pressure changing rate dPc/dθ may be subjected to a noise removing process necessary for calculating an appropriate inflection point from the locus M, or the like. Subsequently to step S103, the ECU 70 turns on the OCV 81 (step S104). Accordingly, the operation of switching the use cam based on the first mode is performed. Subsequently, the ECU 70 performs mechanical failure determination A (step S105).

Figure 16:
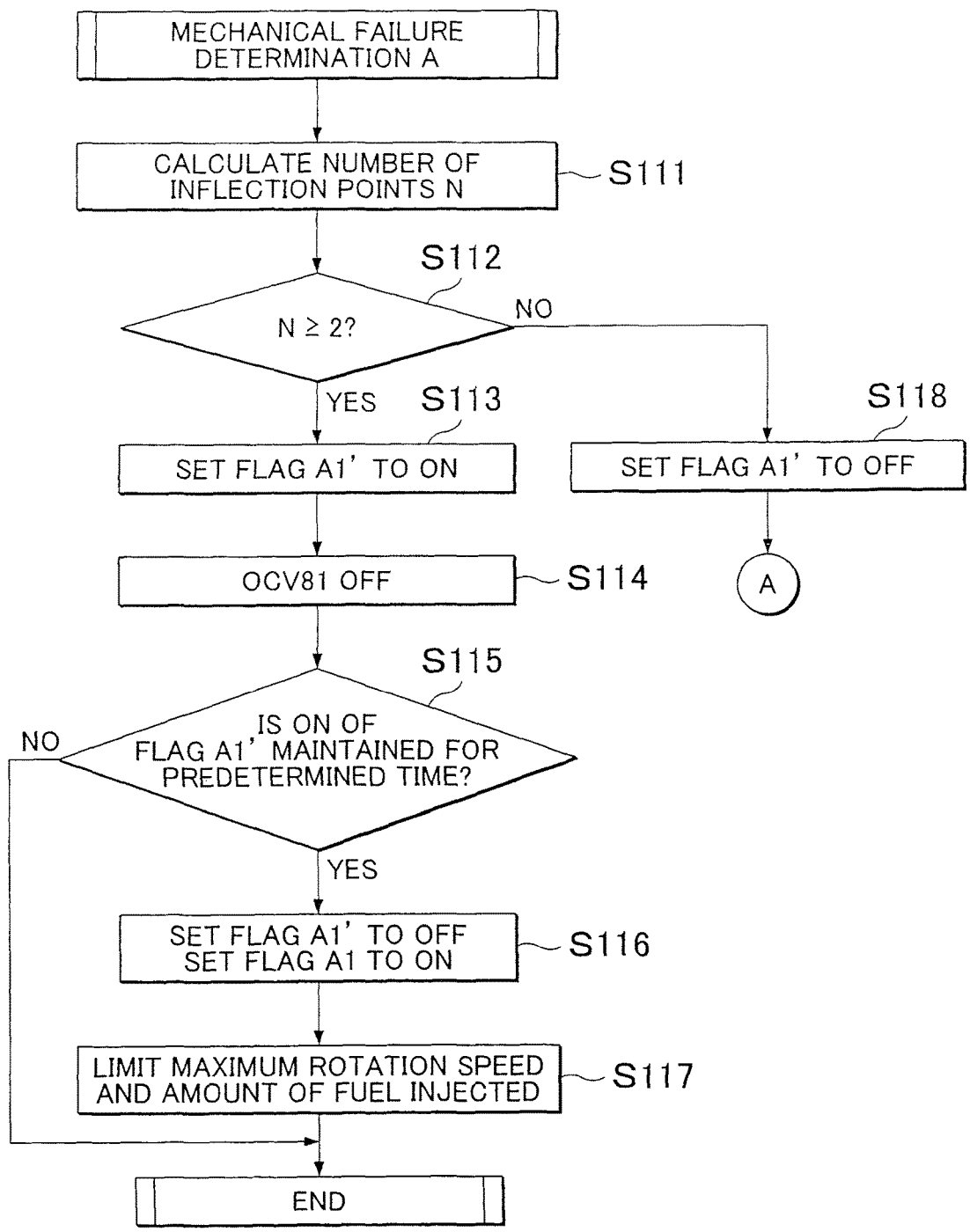
FIG. 16 is a second flowchart illustrating the first control example.
Figure 17:
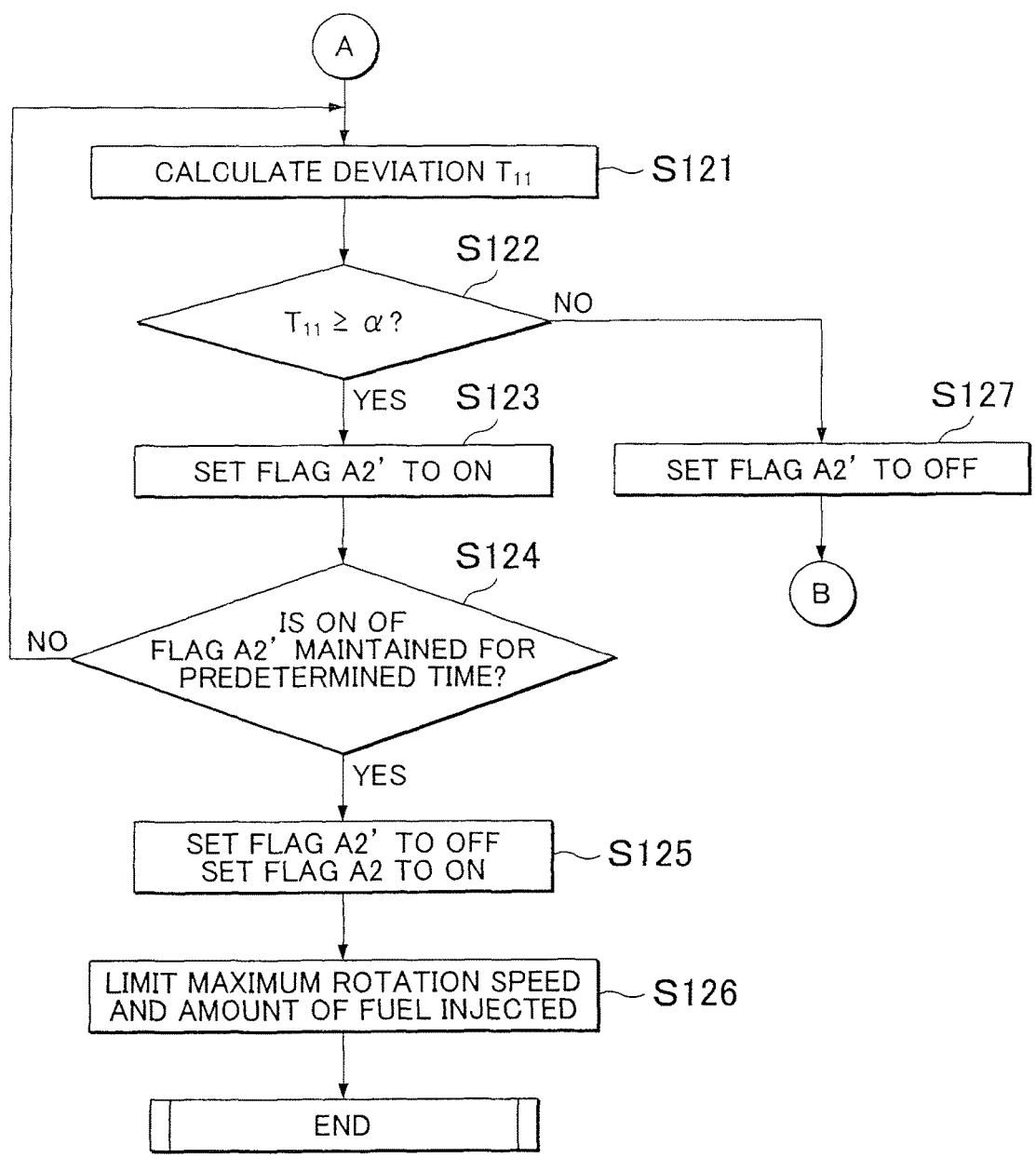
FIG. 17 is a third flowchart illustrating the first control example.
Figure 18:
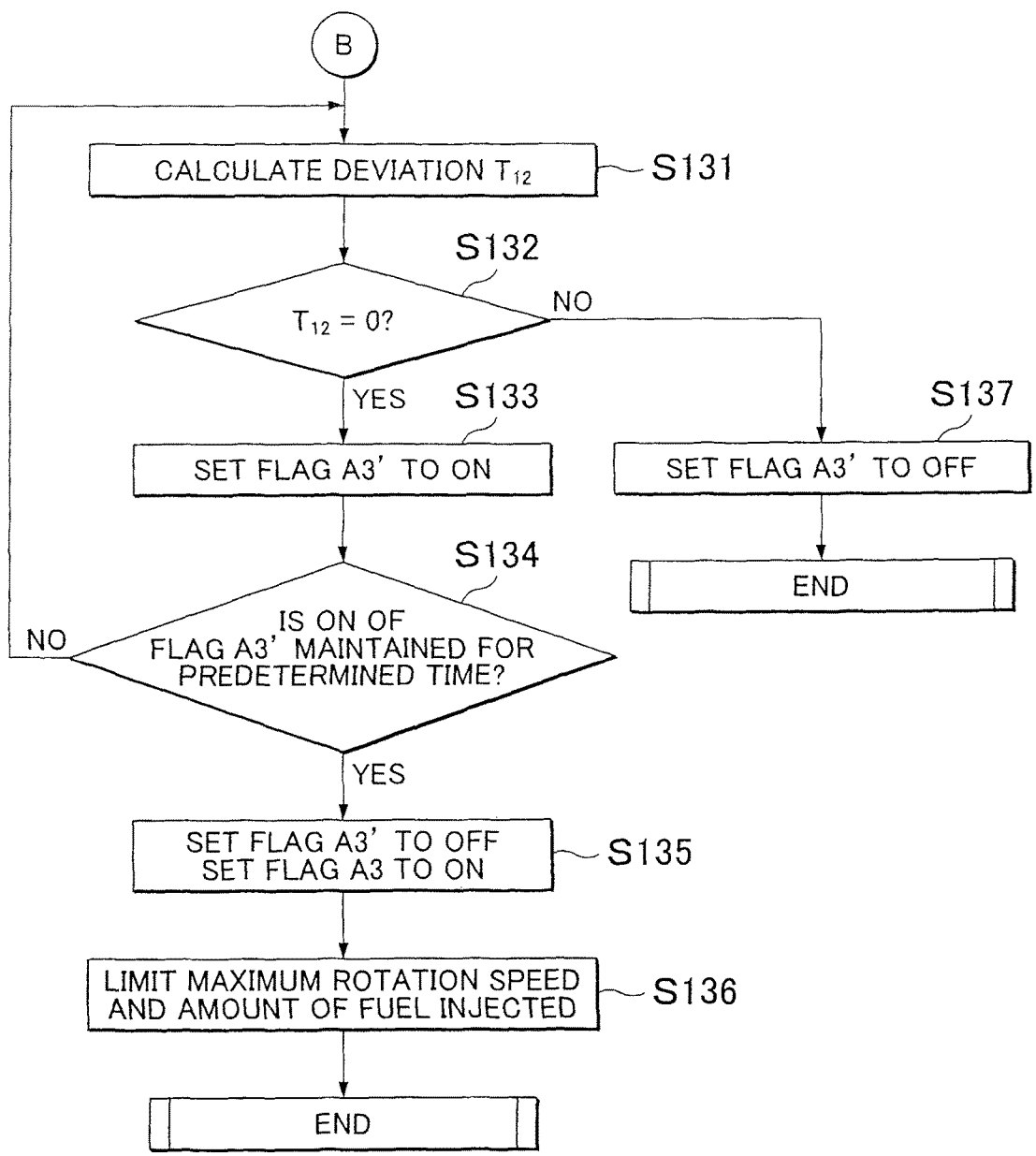
FIG. 18 is a fourth flowchart illustrating the first control example.

Mechanical failure determination A is illustrated as a sub-routine in the flowchart illustrated in FIGS. 16 to 18. In FIGS. 16 to 18, it is determined whether the switching abnormality is present using plural (three herein) determination methods different depending on the abnormality forms (the bounce, the oblique insertion, and the fixation of the pin Pn11 herein) of the switching abnormality.

In the sub-routine of mechanical failure determination A, the ECU 70 calculates the number of inflection points N (step S111). The number of inflection points N can be calculated by calculating the inflection point MP1. Subsequently, the ECU 70 determines whether the calculated number of inflection points N is greater than or equal to two (step S112). In step S112, it is determined whether the switching abnormality is present and whether the abnormality form is the bounce of the pin Pn11. Accordingly, when the determination result of step S112 is positive, the ECU 70 sets a flag A1' to ON (step S113). The flag A1' is a temporary abnormality flag indicating that it is provisionally determined that the switching abnormality is present and it is determined that the abnormality form is the bounce of the pin Pn11.

Subsequently to step S113, the ECU 70 turns off the OCV 81 (step S114) and determines whether the state where the flag A1' is in the ON state is maintained for a predetermined time (step S115). At the time of the determination, the time in which the state where the predetermined flag (flag A1' herein) is in the ON state is maintained can be set to, for example, the time corresponding to the number of combustion cycles from the combustion cycle in which the predetermined flag is first set to the ON state. The predetermined time may not be constant in the abnormal forms. When the determination result of step S115 is negative, the sub-routine of mechanical failure determination A ends. In this case, the control process flow returns to the flowchart illustrated in FIG. 15. Thereafter, when the determination result of step S112 is positive and the determination result of step S115 is negative, the flag A1' is maintained in the ON state and it is provisionally determined that the switching abnormality is present. In the meantime, the re-switching of the use cam is performed.

When the determination result of step S115 is positive, the ECU 70 sets the flag A1' to OFF and sets a flag A1 to ON (step S116). The flag A1 is a due abnormality flag indicating that it is duly determined that the switching abnormality is present and it is determined that the abnormality form is the bounce of the pin Pn11.

In this case, the ECU 70 limits the maximum rotation speed of the internal combustion engine 50 and limits the amount of fuel injected (step S117). The limiting of the amount of fuel injected can be performed for each of the plural cylinders 51a. The limiting of the amount of fuel injected may be performed, for example, on a cylinder in which it is duly determined that the switching abnormality is present out of the plural cylinders 51a. After step S117, the sub-routine of mechanical failure determination A ends.

When the determination result of step S112 is negative, the ECU 70 sets the flag A1' to OFF (step S118). Accordingly, it is duly determined that the switching abnormality of which the abnormality form is the bounce of the pin Pn11 is not present. Here, the determination of the ECU 70 for the switching abnormality is expressed by ON and OFF of the flag, but this determination may not be necessarily expressed by a flag.

Subsequently to step S118, the ECU 70 calculates the deviation $T_{11}$ (step S121) and determines whether the calculated deviation $T_{11}$ is greater than or equal to a predetermined value α (step S122). In step S122, it is determined whether the switching abnormality is present and whether the abnormality form is the oblique insertion of the pin Pn11. Accordingly, when the determination result of step S122 is positive, the ECU 70 sets a flag A2' to ON (step S123). The flag A2' is a flag indicating that it is provisionally determined that the switching abnormality is present and it is determined that the abnormality form is the oblique insertion of the pin Pn11.

Subsequently to step S123, the ECU 70 determines whether the state where the flag A2' is in the ON state is maintained for a predetermined time (step S124). When the determination result is negative, the control process flow returns to step S121. In this case, the deviation $T_{11}$ in a combustion cycle next to the combustion cycle in which the deviation $T_{11}$ is previously calculated is calculated in step S121. When the determination result of step S124 is positive, the ECU 70 sets the flag A2' to OFF and sets a flag A2 to ON (step S125).

The flag A2 is a due abnormality flag indicating that it is duly determined that the switching abnormality is present and it is determined that the abnormality form is the oblique insertion of the pin Pn11. In this case, the ECU 70 limits the maximum rotation speed of the internal combustion engine 50 and limits the amount of fuel injected (step S126). In step S126, the ECU 70 can perform, for example, the limiting of the maximum rotation speed or the limiting of the amount of fuel injected having a degree different from that in step S117. After step S126, the sub-routine of mechanical failure determination A ends.

When the determination result of step S122 is negative, the ECU 70 sets the flag A2' to OFF (step S127). Accordingly, it is duly determined that the switching abnormality of which the abnormality form is the oblique insertion of the pin Pn11 is not present.

Subsequently to step S127, the ECU 70 calculates the deviation $T_{12}$ (step S131) and determines whether the calculated deviation $T_{12}$ is zero (step S132). The deviation $T_{12}$ is a second deviation with respect to the inflection point MP1 and represents the magnitude of a phase difference between the inflection points MP1 in the loci M obtained before and after the use cam is switched in the first mode. Accordingly, it is determined in step S132 whether the inflection points MP1 are immovable and it is thus determined whether the switching abnormality is present and whether the abnormality form is the fixation of the pin Pn11. Whether the inflection points MP1 are immovable may be determined, for example, depending on whether the deviation $T_{12}$ is smaller than a predetermined value.

When the determination result of step S132 is positive, the ECU 70 sets a flag A3' to ON (step S133). The flag A3' is a temporary abnormality flag indicating that it is provisionally determined that the switching abnormality is present and it is determined that the abnormality form is the fixation of the pin Pn11. Subsequently to step S133, the ECU 70 determines whether the state where the flag A3' is in the ON state is maintained for a predetermined time (step S134). When the determination result is negative, the control process flow returns to step S131. In this case, in step S131, the deviation $T_{12}$ is calculated on the basis of the inflection point MP1 in a combustion cycle next to the combustion cycle in which the deviation $T_{12}$ is previously calculated as the inflection point MP1 obtained after the switching of the use cam is performed.

When the determination result of step S134 is positive, the ECU 70 sets the flag A3' to OFF and sets a flag A3 to ON (step S135). The flag A3 is a due abnormality flag indicating that it is duly determined that the switching abnormality is present and it is determined that the abnormality form is the fixation of the pin Pn11. In this case, the ECU 70 limits the maximum rotation speed of the internal combustion engine 50 and limits the amount of fuel injected (step S136). After step S136, the sub-routine of mechanical failure determination A ends.

When the determination result of step S132 is negative, the ECU 70 sets the flag A3' to OFF (step S137). Accordingly, it is duly determined that the switching abnormality of which the abnormality form is the fixation of the pin Pn11 is not present. In this case, since the determination results of steps S112, S122, and S132 are negative, it is duly determined that the switching abnormality based on the mechanical failure is not present. After step S137, the sub-routine of mechanical failure determination A ends.

FIGS. 19A to 19F are diagrams illustrating the first mechanical failure in the second mode. FIGS. 19A to 19F illustrate an example where the mechanical failure is the bounce of the pint Pn21. FIGS. 19A to 19F are the same diagrams as FIGS. 12A to 12F.

Figure 19A:
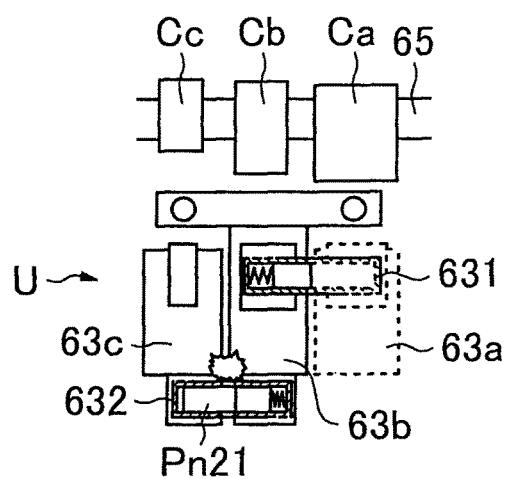
FIGS. 19A to 19F are diagrams illustrating first mechanical failure in a second mode.
Figure 19B:
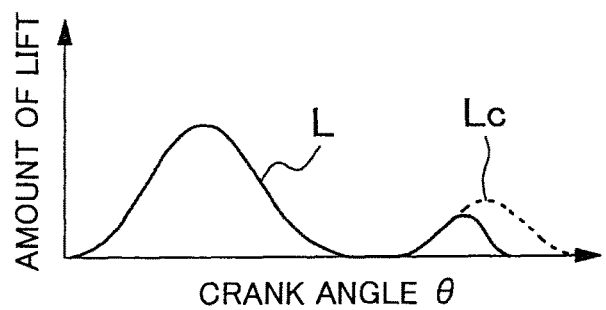
Figure 19C:
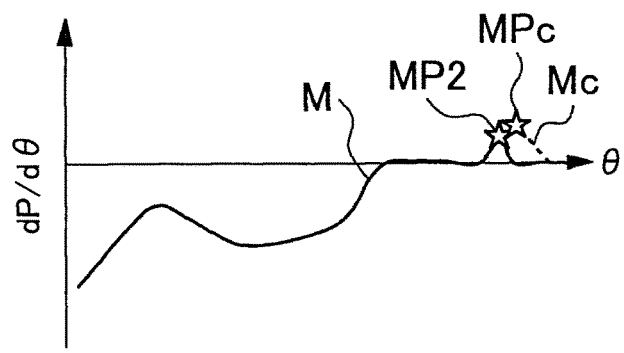

As illustrated in FIG. 19A, when the bounce of the pin Pn21 occurs in the second mode in which the fluctuation portions 63b, 63c are coupled, the opening operation of the exhaust valve 55 to be driven with the cam Ca is stopped. As a result, as illustrated in FIG. 19B, the lift curve L of the exhaust valve 55 describes a curve departing and falling from the lift curve Lc in the way. As illustrated in FIG. 19C, in this case, the locus M describes the following locus. That is, the locus describes a locus departing and falling from the locus Mc, which is the locus M obtained when the exhaust valve 55 is driven in accordance with the cam profile of the cam Cc, in the middle way. As a result, an inflection points MP2 as the second inflection point appears in a phase different from that of the inflection point MPc.

The inflection point MP2 is an inflection point obtained with the operation of the exhaust valve 55 based on the cam Cc in the locus M. Specifically, the inflection point MP2 is an inflection point appearing due to the variation of the in-cylinder pressure Pc with the operation of the exhaust valve 55 based on the cam Cc in the locus M. The inflection point MPc is a second predetermined inflection point and is an inflection point obtained with the operation of the exhaust valve 55 based on the cam Cc when the exhaust valve 55 is driven in accordance with the profile of the cam Cc in the locus M. Accordingly, the inflection point MPc is present on the locus Mc.

Figure 19D:
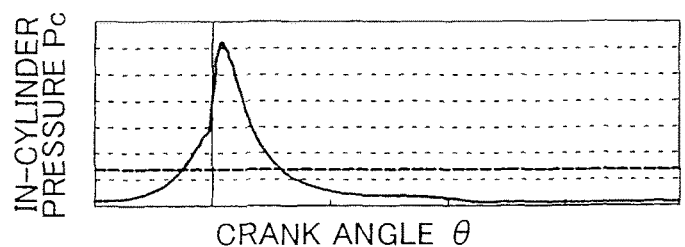
Figure 19E:
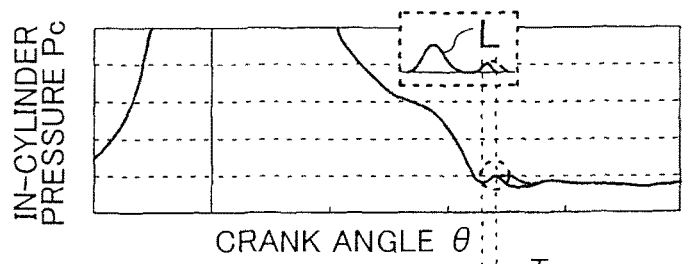
Figure 19F:
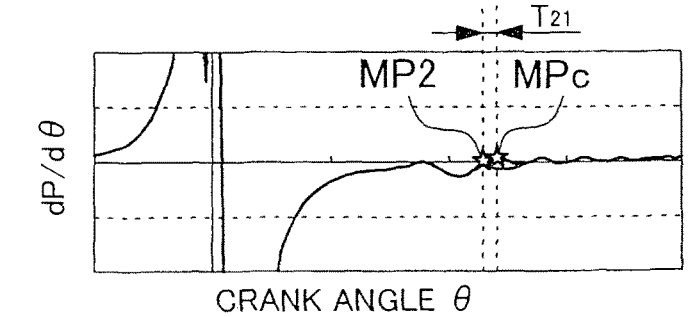

Specifically, the inflection point MP2 appears as described above due to the variation in the in-cylinder pressure Pc to be described below. That is, as illustrated in FIGS. 19D and 19E, in this case, the in-cylinder pressure Pc varies with the stopping of the opening operation of the exhaust valve 55. Accordingly, in this case, the inflection point MP2 appears in a phase different by a deviation $T_{21}$ from that of the inflection point MPc as illustrated in FIG. 19F. The deviation $T_{21}$ is a first deviation with respect to the inflection point MP2 and represents the magnitude of a phase difference between the inflection points MP2, MPc.

Therefore, when the cam switching mode is the second mode the inflection point MP2 appears in the locus M, and the inflection point MP2 is an inflection point at which the deviation $T_{21}$ is greater than a predetermined value $\beta_T$ (greater than or equal to the predetermined value $\beta_T$ herein), the determination unit determines that the switching abnormality is present. The determination unit determines that the abnormality form is the bounce of the pin Pn21. When it is duly determined that the abnormality form is the bounce of the pin Pn21, the second control unit can perform, for example, the limiting of the maximum rotation speed of the internal combustion engine 50 and the limiting of the amount of fuel injected.

FIGS. 20A to 20F are diagrams illustrating the second mechanical failure in the second mode. FIGS. 20A to 20F illustrate an example where the mechanical failure is the oblique insertion of the pint Pn21. FIGS. 20A to 20F are the same diagrams as FIGS. 12A to 12F.

Figure 20A:
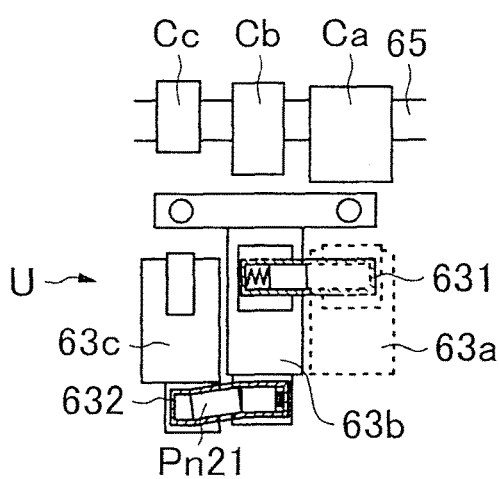
Figure 20B:
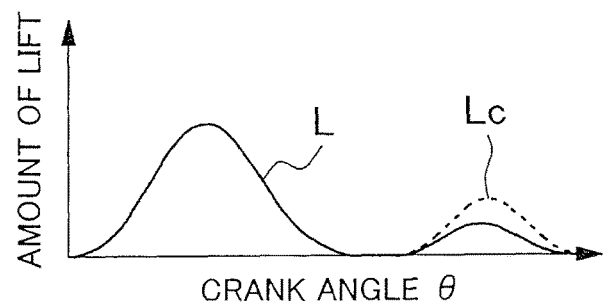
Figure 20C:
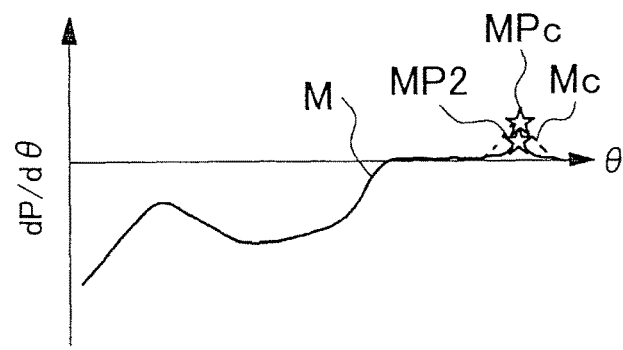

As illustrated in FIG. 20A, when the oblique insertion of the pin Pn21 occurs in the second mode, the exhaust valve 55 is driven with the cam Cc while generating lift loss. As a result, as illustrated in FIG. 20B, the lift curve L of the exhaust valve 55 describes a curve of which the amount of lift is smaller than that of the lift curve Lc as a whole. As illustrated in FIG. 20C, in this case, the phase is equivalent between the inflection points MP2, MPc, but the value (the in-cylinder pressure changing rate dPc/dθ) thereof differs between the inflection points MP2, MPc. Specifically, the inflection point MP2 appears with the variation of the in-cylinder pressure Pc to be described below.

That is, as illustrated in FIGS. 20D and 20E, in this case, the in-cylinder pressure Pc falls due to the lift loss. Accordingly, in this case, the value differs by a deviation $P_{21}$ between the inflection points MP2, MPc as illustrated in FIG. 20F. The deviation $P_{21}$ is a second deviation with respect to the inflection point MP2 and represents the magnitude of a difference between the value of the inflection point MP2 and the value of the inflection point MPc.

Therefore, when the cam switching mode is the second mode, the inflection point MP2 appears in the locus M, and the inflection point MP2 is an inflection point at which the deviation $T_{21}$ is smaller than a predetermined value $\beta_T$ and the deviation $P_{21}$ is greater than a predetermined value $\beta_P$ (greater than or equal to the predetermined value $\beta_P$ herein), the determination unit determines that the switching abnormality is present. The determination unit also determines that the abnormality form is the oblique insertion of the pin Pn21. When it is duly determined that the abnormality form is the oblique insertion of the pin Pn21, the second control unit can perform, for example, the limiting of the maximum rotation speed of the internal combustion engine 50 and the limiting of the amount of fuel injected. The third control unit can perform the decreasing of the EGR ratio.

FIGS. 21A to 21F are diagrams illustrating the third mechanical failure in the second mode. FIGS. 21A to 21F illustrate an example where the mechanical failure is the fixation of the pint Pn21. FIGS. 21A to 21F are the same diagrams as FIGS. 12A to 12F.

Figure 21A:
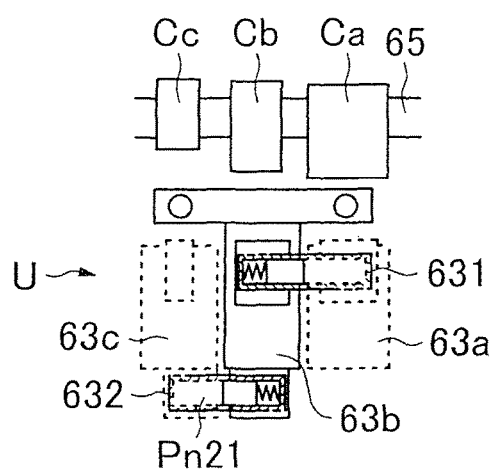
FIGS. 21A to 21F are diagrams illustrating third mechanical failure in the second mode.
Figure 21B:
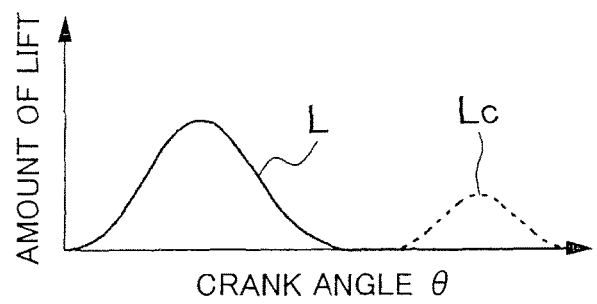
Figure 21C:
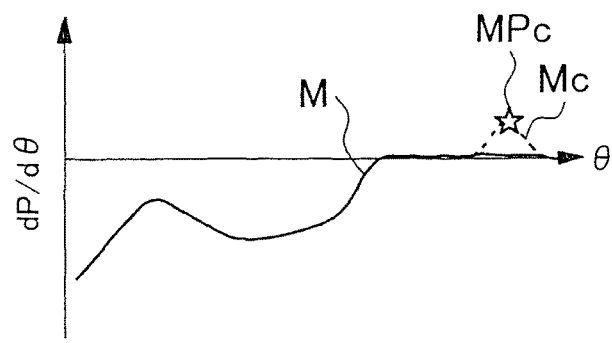
Figure 21D:
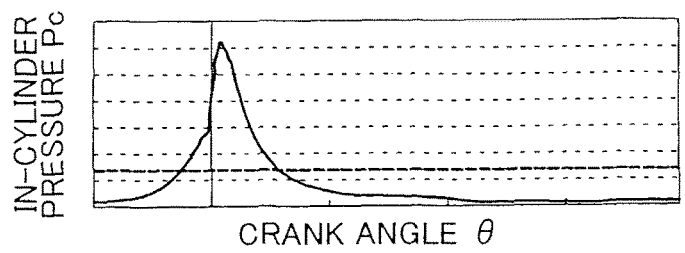
Figure 21E:
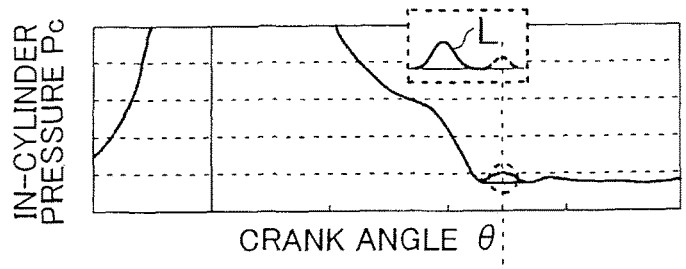
Figure 21F:
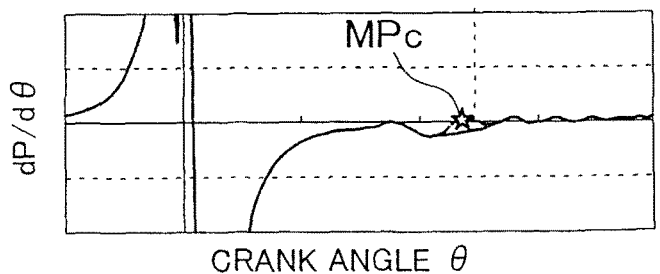
Figure 22:
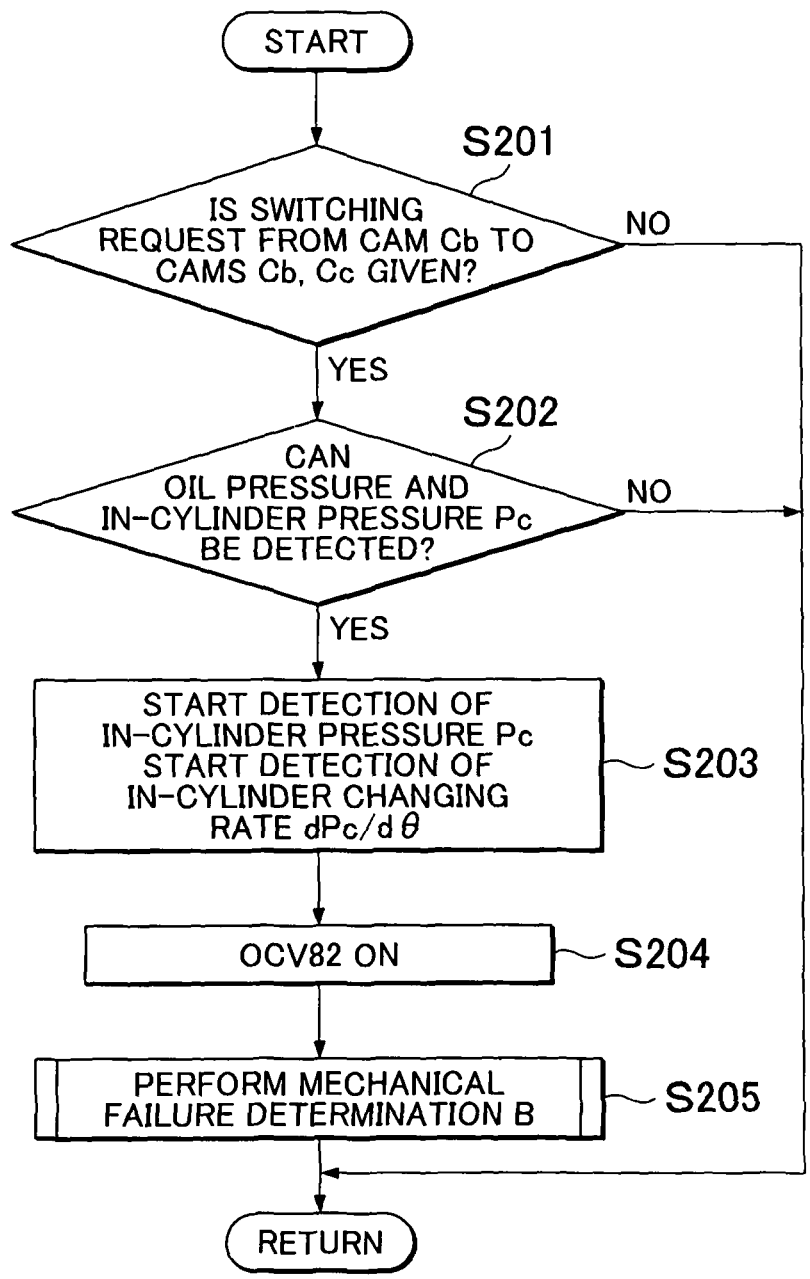
FIG. 22 is a first flowchart illustrating a second control example.
Figure 23:
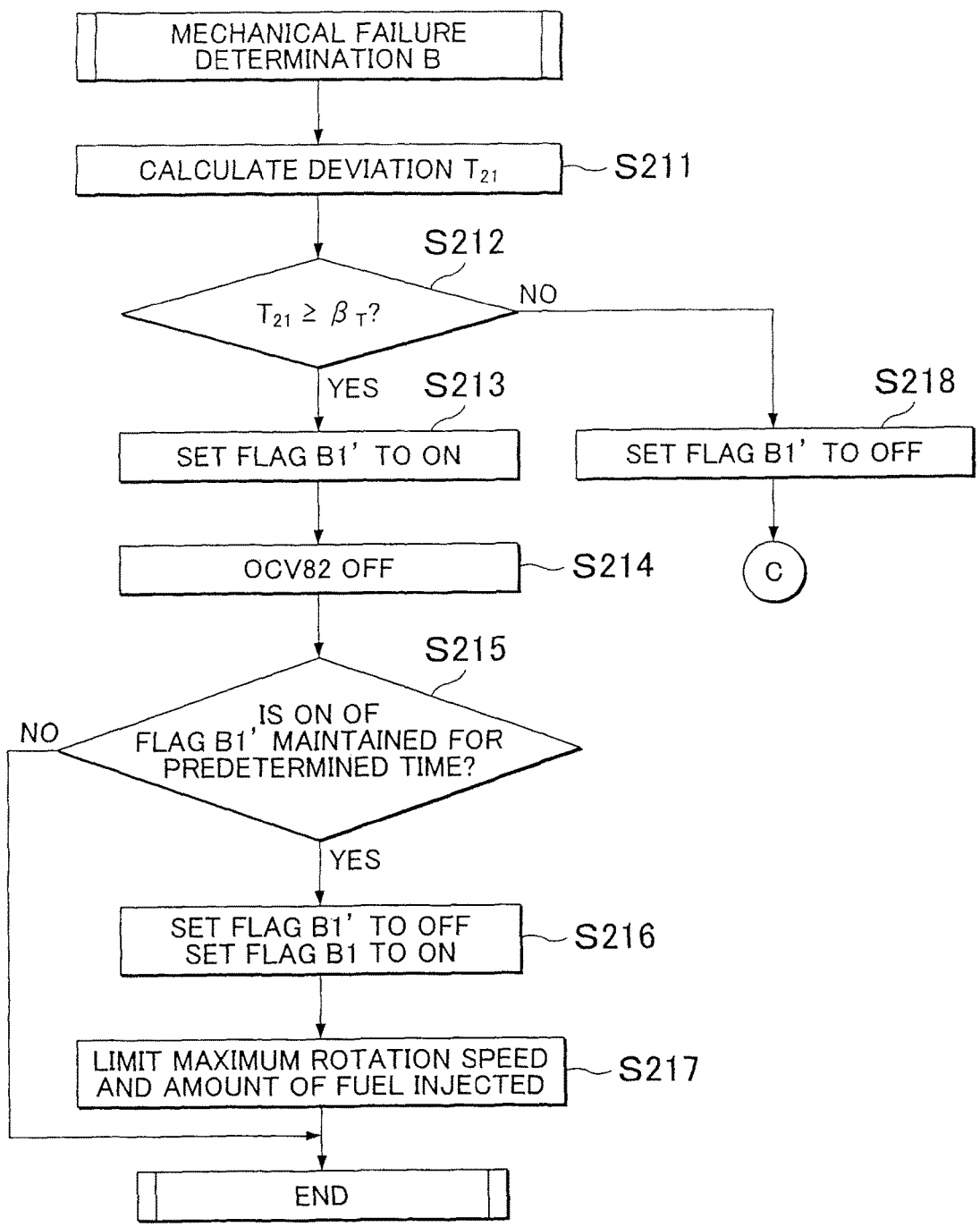
FIG. 23 is a second flowchart illustrating the second control example.
Figure 24:
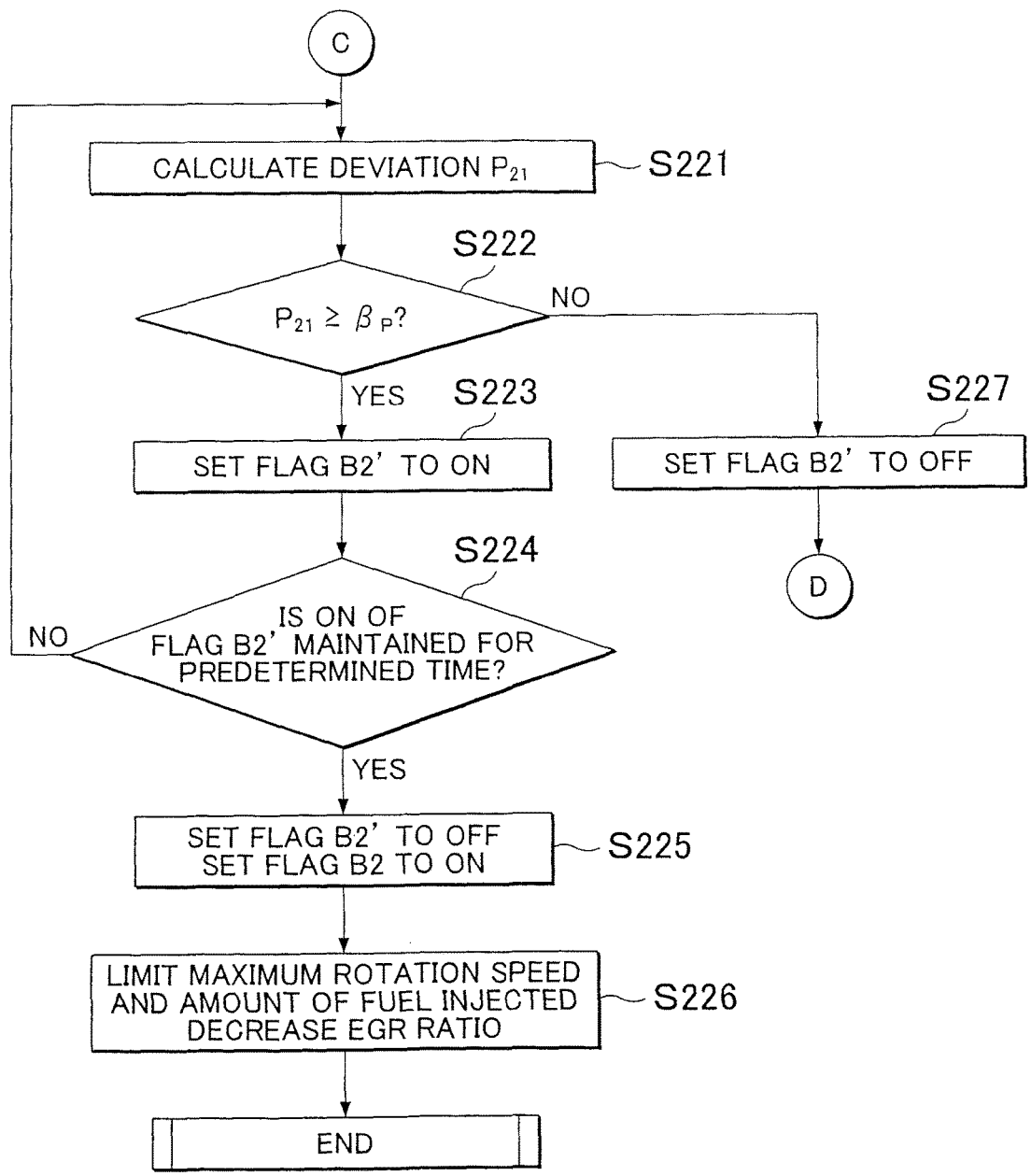
FIG. 24 is a third flowchart illustrating the second control example.
Figure 25:
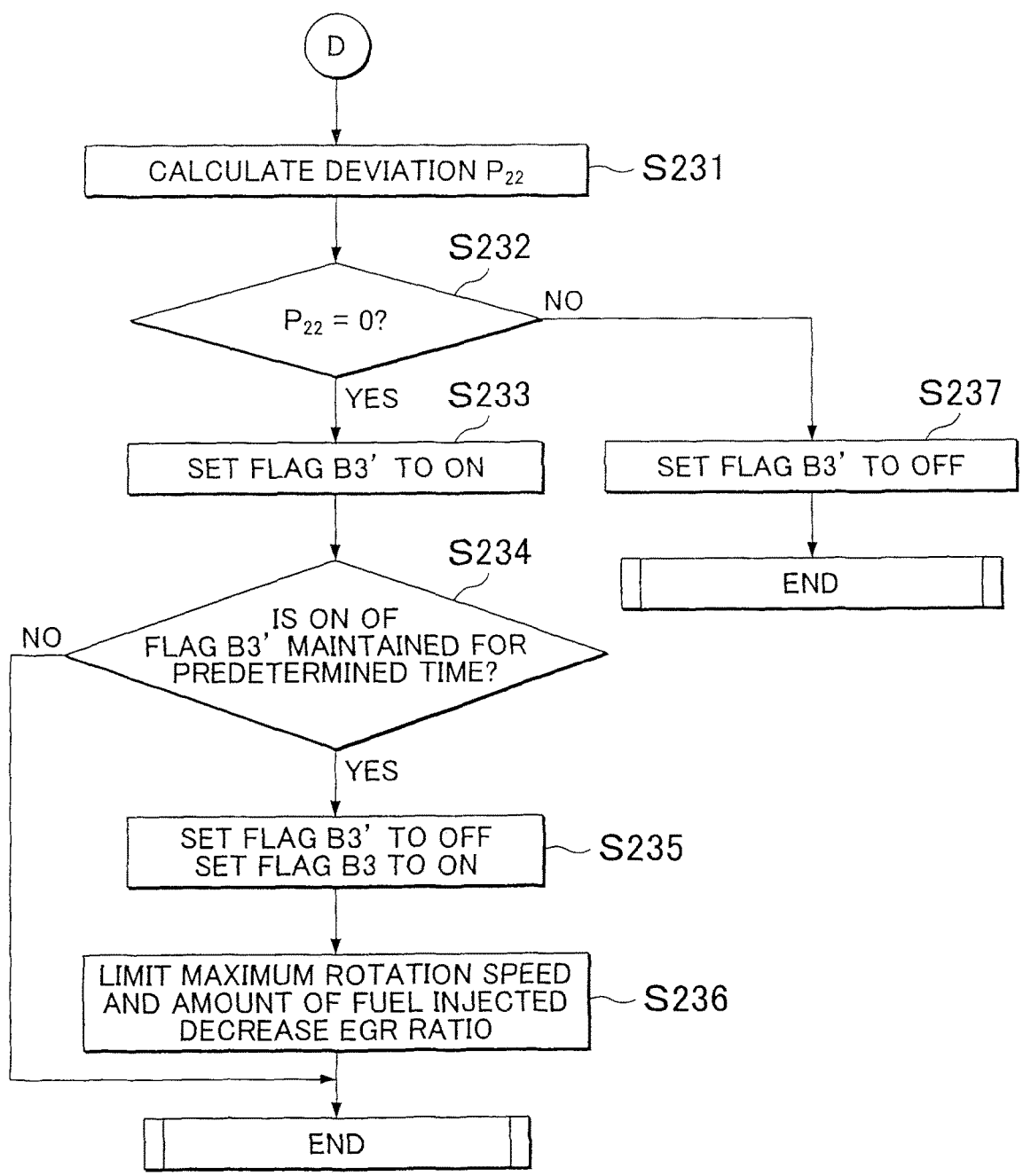
FIG. 25 is a fourth flowchart illustrating the second control example.

As illustrated in FIG. 21A, when the fixation of the pin Pn21 occurs in the second mode, the exhaust valve 55 is not driven with the cam Cc. Accordingly, as illustrated in FIG. 21B, the lift curve L of the exhaust valve 55 does not vary with the cam Cc. In this case, the locus M does not vary with the cam Cc as illustrated in FIG. 21C. As a result, the inflection point MP2 does not appear. In this case, the in-cylinder pressure Pc does not vary with the cam Cc as illustrated in FIGS. 21D and 21F. As a result, the inflection point MP2 does not appear as illustrated in FIG. 21F.

Therefore, when the cam switching mode is the second mode and the inflection point MP2 does not appear in the locus M, the determination unit determines that the switching abnormality is present. The determination unit determines that the abnormality form is the fixation of the pin Pn21. When it is duly determined that the abnormality form is the fixation of the pin Pn21, the second control unit can perform, for example, the limiting of the maximum rotation speed of the internal combustion engine 50 and the limiting of the amount of fuel injected. The third control unit can perform the decreasing of the EGR ratio.

The determination unit, which determines the abnormality form as described above when the cam switching mode is the second mode, determines the abnormality form on the basis of the cam switching mode and the inflection point MP2 when the cam switching mode is the second mode. The determination of the determination unit of the abnormality form on the basis of the inflection point MP2 includes the determination of the determination unit of the abnormality form on the basis of the presence or absence of the inflection point MP2.

A second control example will be described below with reference to the flowcharts illustrated in FIGS. 22 to 25. The second control example is an example of an individual control operation of causing the ECU 70 to perform an operation of switching the use cam based on the second mode and to determine whether the switching abnormality due to the mechanical failure is present in the switching operation. Whether the switching abnormality is present may be determined in each of the plural cylinders 51a as in the first control example. In the following description, description of the same control operations as the above-mentioned control operations will not be appropriately repeated.

The ECU 70 determines whether a switching request for switching the use cam from the cam Cb to the cams Ca, Cc is given (step S201). When the determination result is positive, the ECU 70 turns on the OCV 82 through the determination result of step S202 and step S203 (step S204). Accordingly, the operation of switching the use cam in the second mode is performed. Subsequently, the ECU 70 performs mechanical failure determination B (step S205). Mechanical failure determination B is illustrated as a sub-routine in the flowcharts illustrated in FIGS. 23 to 25.

In the sub-routine of mechanical failure determination B, the ECU 70 calculates a deviation $T_{21}$ (step S211) and determines whether the calculated deviation $T_{21}$ is greater than or equal to a predetermined value $\beta_T$ (step S212). In step S212, it is determined whether the switching abnormality is present and whether the abnormality form thereof is the bounce of the pin Pn21. The determination result of step S212 is negative when the inflection point MP2 does not appear and the deviation $T_{21}$ cannot be calculated.

When the determination result of step S212 is positive, the ECU 70 sets a flag B1' to ON (step S213). The flag B1' is a temporary abnormality flag indicating that it is provisionally determined that the switching abnormality is present and it is determined that the abnormality form is the bounce of the pin Pn21.

Subsequently to step S213, the ECU 70 turns off the OCV 82 (step S214) and determines whether the state where the flag B1' is in the ON state is maintained for a predetermined time (step S215). When the determination result is negative, the sub-routine of mechanical failure determination B ends. In this case, the re-switching of the use cam is performed. When the determination result of step S215 is positive, the ECU 70 sets the flag B1' to OFF and sets a flag B1 to ON (step S216).

The flag B1 is a due abnormality flag indicating that it is duly determined that the switching abnormality is present and it is determined that the abnormality form is the bounce of the pin Pn21. In this case, the ECU 70 limits the maximum rotation speed of the internal combustion engine 50 and limits the amount of fuel injected (step S217). After step S217, the sub-routine of mechanical failure determination B ends.

When the determination result of step S212 is negative, the ECU 70 sets the flag B1' to OFF (step S218). Accordingly, it is duly determined that the switching abnormality of which the abnormality form is the bounce of the pin Pn21 is not present.

Subsequently to step S218, the ECU 70 calculates the deviation $P_{21}$ (step S221) and determines whether the calculated deviation $P_{21}$ is greater than or equal to a predetermined value $\beta_P$ (step S222). In step S222, it is determined whether the switching abnormality is present and whether the abnormality form is the oblique insertion of the pin Pn21. Accordingly, when the determination result of step S222 is positive, the ECU 70 sets a flag B2' to ON (step S223). The flag B2' is a flag indicating that it is provisionally determined that the switching abnormality is present and it is determined that the abnormality form is the oblique insertion of the pin Pn21.

Subsequently to step S223, the ECU 70 determines whether the state where the flag B2' is in the ON state is maintained for a predetermined time (step S224). When the determination result is negative, the control process flow returns to step S221. In step S221, as the value of the inflection point MP2 obtained after the switching operation of the use cam, the deviation $P_{21}$ is calculated on the basis of the inflection point MP2 in a combustion cycle next to the combustion cycle in which the deviation $P_{21}$ is previously calculated.

When the determination result of step S224 is positive, the ECU 70 sets the flag B2' to OFF and sets a flag B2 to ON (step S225). The flag B2 is a due abnormality flag indicating that it is duly determined that the switching abnormality is present and it is determined that the abnormality form is the oblique insertion of the pin Pn21. In this case, the ECU 70 limits the maximum rotation speed and the amount of fuel injected of the internal combustion engine 50 and decreases the EGR ratio (step S226). After step S226, the sub-routine of mechanical failure determination B ends.

When the determination result of step S222 is negative, the ECU 70 sets the flag B2' to OFF (step S227). Accordingly, it is duly determined that the switching abnormality of which the abnormality form is the oblique insertion of the pin Pn21 is not present. In step S222, the determination result is negative even when the inflection point MP2 does not appear and the deviation $P_{21}$ cannot be calculated.

Subsequently to step S227, the ECU 70 calculates the deviation $P_{22}$ (step S231) and determines whether the calculated deviation $P_{22}$ is zero (step S232). The deviation $P_{22}$ is a third deviation with respect to the inflection point MP2 and represents the magnitude of a difference between the in-cylinder pressure changing rates dPc/dθ obtained from the phase of the inflection point MPc in the loci M obtained before and after the use cam is switched in the third mode. In step S232, it is determined whether the inflection point MP2 appears, and it is determined that the inflection point MP2 does not appear when the deviation $P_{22}$ is zero. Whether the inflection point MP2 appears may be determined, for example, depending on whether the deviation $P_{22}$ is smaller than a predetermined value.

Specifically, it is determined in step S232 whether the switching abnormality is present and whether the abnormality form is the fixation of the pin Pn21. Accordingly, when the determination result of step S232 is positive, the ECU 70 sets a flag B3' to ON (step S233). The flag B3' is a temporary abnormality flag indicating that it is provisionally determined that the switching abnormality is present and it is determined that the abnormality form is the fixation of the pin Pn21. Subsequently to step S233, the ECU 70 determines whether the state where the flag B3' is in the ON state is maintained for a predetermined time (step S234). When the determination result is negative, the sub-routine of mechanical failure determination B ends.

When the determination result of step S234 is positive, the ECU 70 sets the flag B3' to OFF and sets a flag B3 to ON (step S235). The flag B3 is a due abnormality flag indicating that it is duly determined that the switching abnormality is present and it is determined that the abnormality form is the fixation of the pin Pn21. In this case, the ECU 70 limits the maximum rotation speed and the amount of fuel injected of the internal combustion engine 50 and decreases the EGR ratio (step S236). After step S236, the sub-routine of mechanical failure determination B ends.

When the determination result of step S232 is negative, the ECU 70 sets the flag B3' to OFF (step S237). Accordingly, it is duly determined that the switching abnormality of which the abnormality form is the fixation of the pin Pn21 is not present. In this case, since the determination results of steps S212, S222, and S232 are negative, it is duly determined that the switching abnormality based on the mechanical failure is not present. After step S237, the sub-routine of mechanical failure determination B ends.

FIGS. 26A to 26I are diagrams illustrating the mechanical failure in the third mode. In the third mode, the mechanical failure may occur in the respective coupling mechanisms 631, 632. The mechanical failure occurring in the coupling mechanism 631 is the same as the mechanical failure in the first mode. Accordingly, the description of the mechanical failure occurring in the coupling mechanism 631 will not be repeated.

Figure 26A:
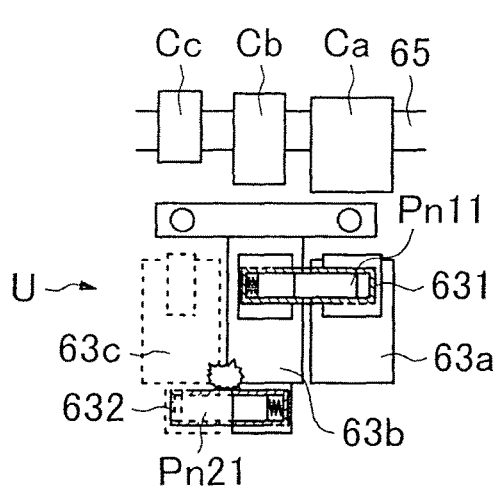
FIGS. 26A to 26I are diagrams illustrating mechanical failure in a third mode.
Figure 26B:
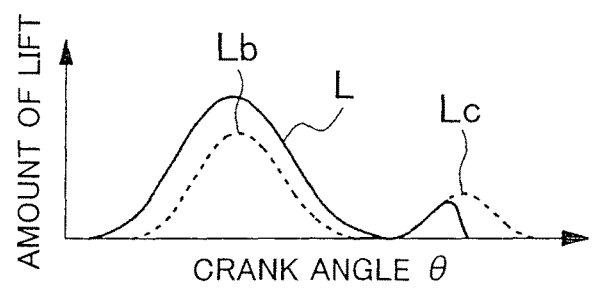
Figure 26C:
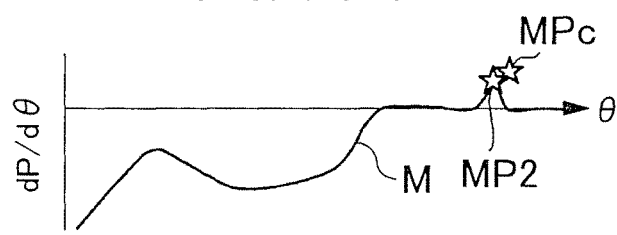
Figure 26D:
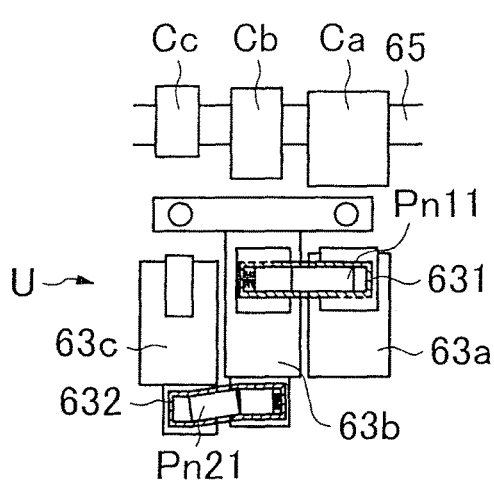
Figure 26E:
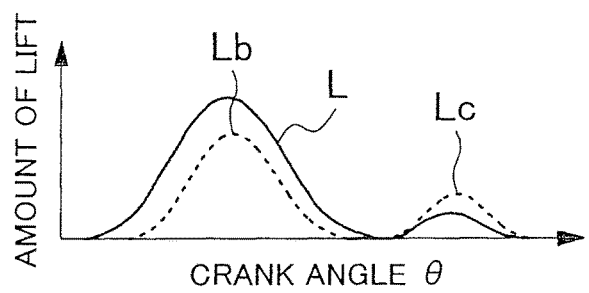
Figure 26F:
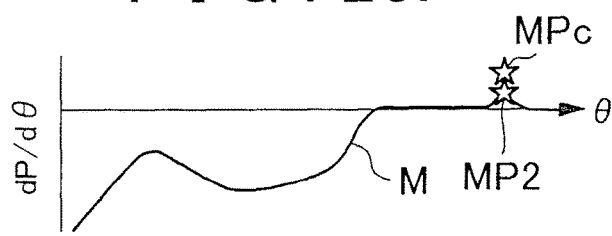
Figure 26G:
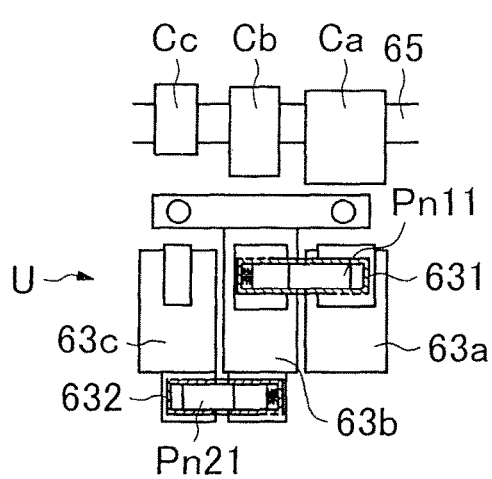
Figure 26H:
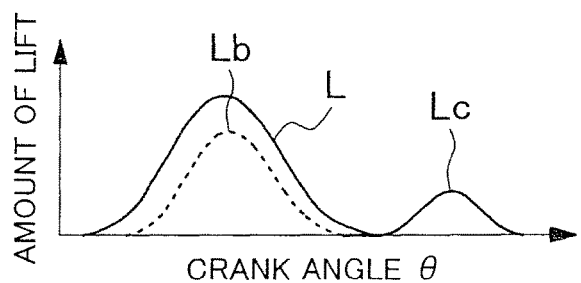
Figure 26I:
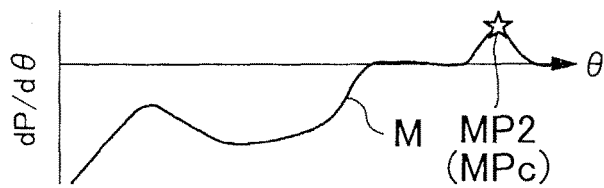

FIGS. 26A to 26C illustrate a case where the mechanical failure is the bounce of the pin Pn21. FIGS. 26D to 26F illustrate a case where the mechanical failure is the incomplete detachment of the pin Pn21 and FIGS. 26G to 26I illustrate a case where the mechanical failure is the fixation of the pin Pn21. FIGS. 26A, 26D, and 26G are the same diagrams as FIG. 12A. FIGS. 26B, 26E, and 26H are the same diagrams as FIG. 12B. FIGS. 26C, 26F, and 26I are the same diagrams as FIG. 12C.

As illustrated in FIGS. 26A and 26B, when the bounce of the pin Pn21 occurs in the third mode in which the fluctuation portions 63b, 63c are decoupled, the exhaust valve 55 is temporarily driven with the cam Cc. in this case, the inflection point MP2 that does not appear at the time of normality appears as illustrated in FIG. 26C. In this case, the inflection point MP2 appears in a phase different from that of the inflection point MPc.

Therefore, when the cam switching mode is the third mode, the inflection point MP2 appears in the locus M, and the inflection point MP2 is an inflection point at which the deviation $T_{21}$ is greater than a predetermined value $\beta_T$, the determination unit determines that the switching abnormality of the variable valve mechanism 60 is present. The determination unit determines that the abnormality form is the bounce of the pin Pn21. When it is duly determined that the abnormality form is the bounce of the pin Pn21, the second control unit can perform, for example, the limiting of the maximum rotation speed of the internal combustion engine 50 and the limiting of the amount of fuel injected.

As illustrated in FIGS. 26D and 26E, when the incomplete detachment of the pin Pn21 occurs in the third mode, the exhaust valve 55 is driven with the cam Cc while generating lift loss. In this case, the inflection point MP2 that does not appear at the time of normality appears as illustrated in FIG. 26F. In this case, the phase is equivalent between the inflection points MP2, MPc, but the value thereof differs between the inflection points MP2, MPc.

Therefore, when the cam switching mode is the third mode, the inflection point MP2 appears in the locus M, and the inflection point MP2 is an inflection point at which the deviation $T_{21}$ is smaller than a predetermined value $\beta_T$ and the deviation $P_{21}$ is greater than a predetermined value $\beta_P$, the determination unit determines that the switching abnormality is present. The determination unit also determines that the abnormality form is the incomplete detachment of the pin Pn21. When it is duly determined that the abnormality form is the incomplete detachment of the pin Pn21, the second control unit can perform, for example, the limiting of the maximum rotation speed of the internal combustion engine 50 and the limiting of the amount of fuel injected. The third control unit can perform the decreasing of the EGR ratio.

As illustrated in FIGS. 26G and 26H, when the fixation of the pin Pn21 occurs in the third mode, the exhaust valve 55 is driven with the cam Cc. As a result, the inflection point MP2 that does not appear at the time of normality appears as illustrated in FIG. 26I. In this case, the inflection point MP2 is immovable before and after the cam switching operation.

Therefore, when the cam switching mode is the third mode, the inflection point MP2 appears in the locus M, and the inflection point MP2 is immovable before and after the use cam is switched in the third mode, the determination unit determines that the switching abnormality is present. The determination unit determines that the abnormality form is the fixation of the pin Pn21. When it is duly determined that the abnormality form is the fixation of the pin Pn21, the second control unit can perform, for example, the limiting of the maximum rotation speed of the internal combustion engine 50 and the limiting of the amount of fuel injected. The third control unit can perform the decreasing of the EGR ratio. Whether the inflection point MP2 is immovable can be determined, for example, depending on whether the deviation $P_{22}$ is smaller than a predetermined value.

The determination unit, which determines the abnormality form as described above when the cam switching mode is the third mode, determines the abnormality form on the basis of the cam switching mode and the inflection point MP1 and determines the abnormality form on the basis of the cam switching mode and the inflection point MP2 when the cam switching mode is the third mode.

The ECU 70 can determine whether the switching abnormality due to the mechanical failure in the third mode is present by determining whether the switching abnormality due to the mechanical failure is present, for example, in the same way as in the first control example or the second control example in the third mode. Accordingly, the flowchart illustrating the control operation example of the ECU 70 is not illustrated.

Figure 27A:
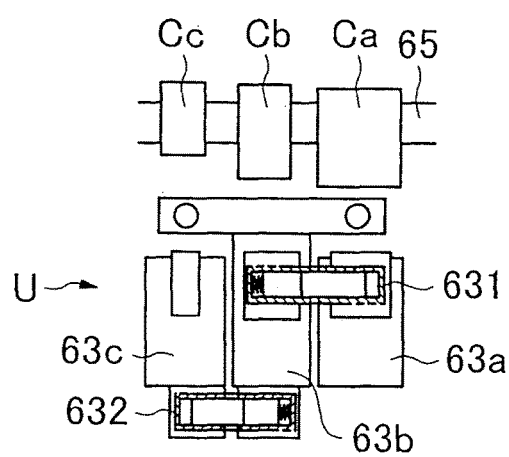
FIGS. 27A to 27C are diagrams illustrating first responsiveness failure.
Figure 27B:
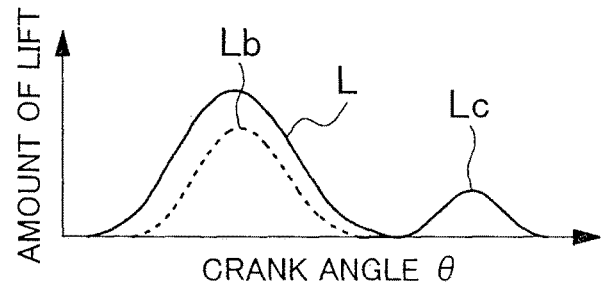
Figure 27C:
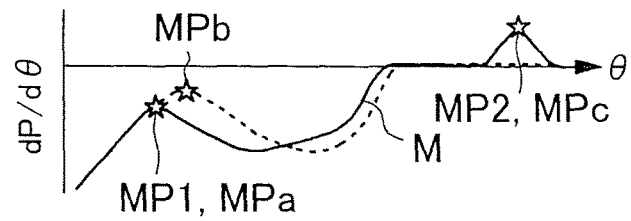
Figure 28A:
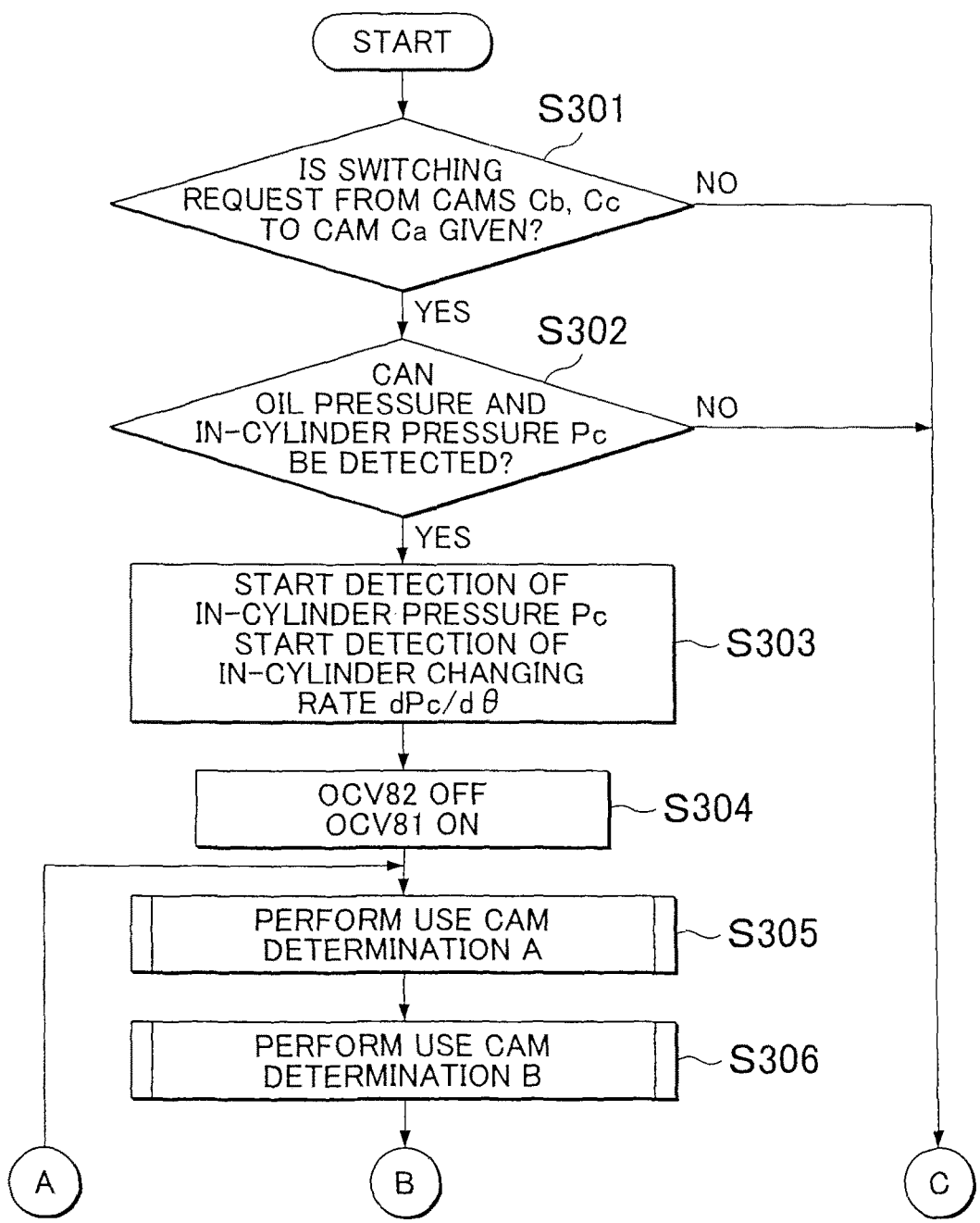
FIG. 28A and FIG. 28B are a first flowchart illustrating a third control example.
Figure 28B:
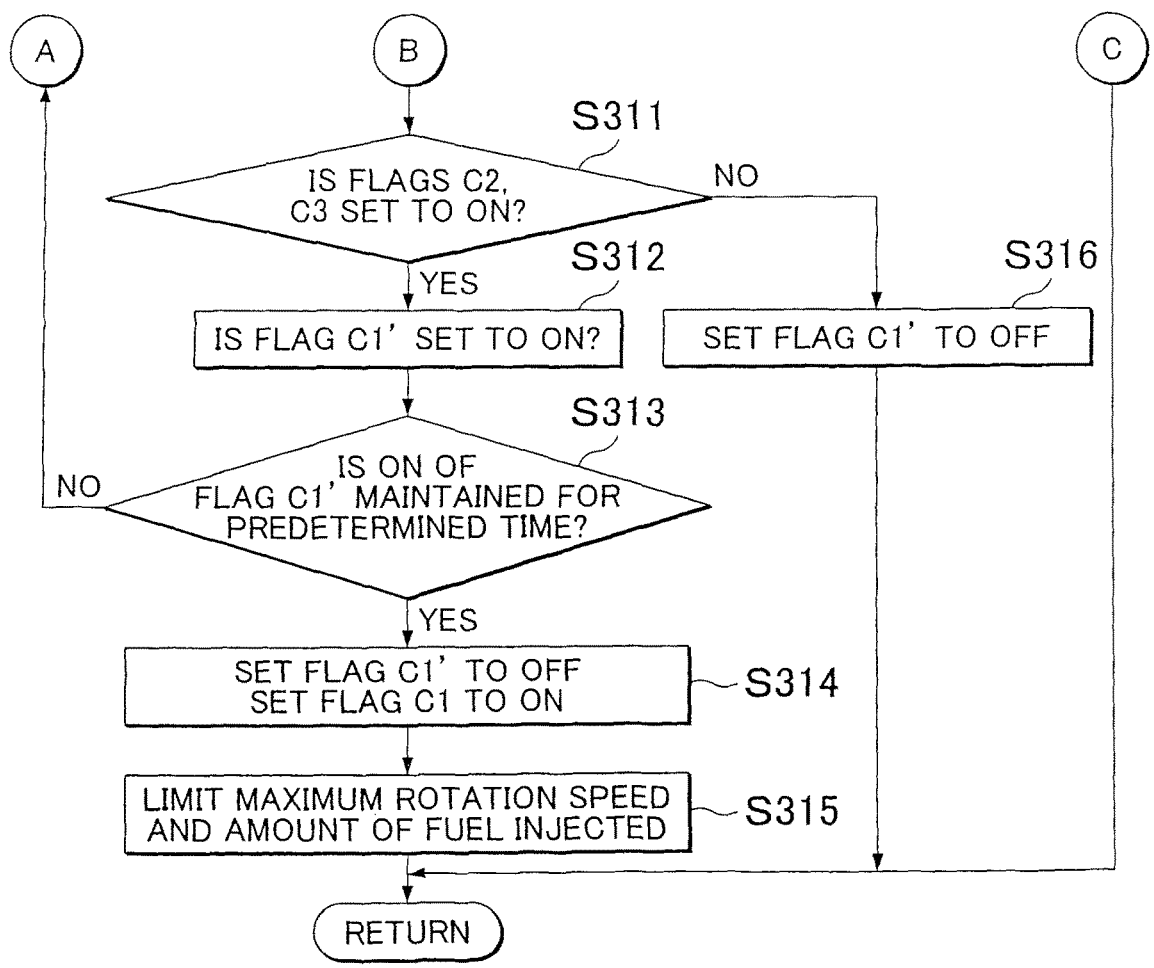
Figure 29:
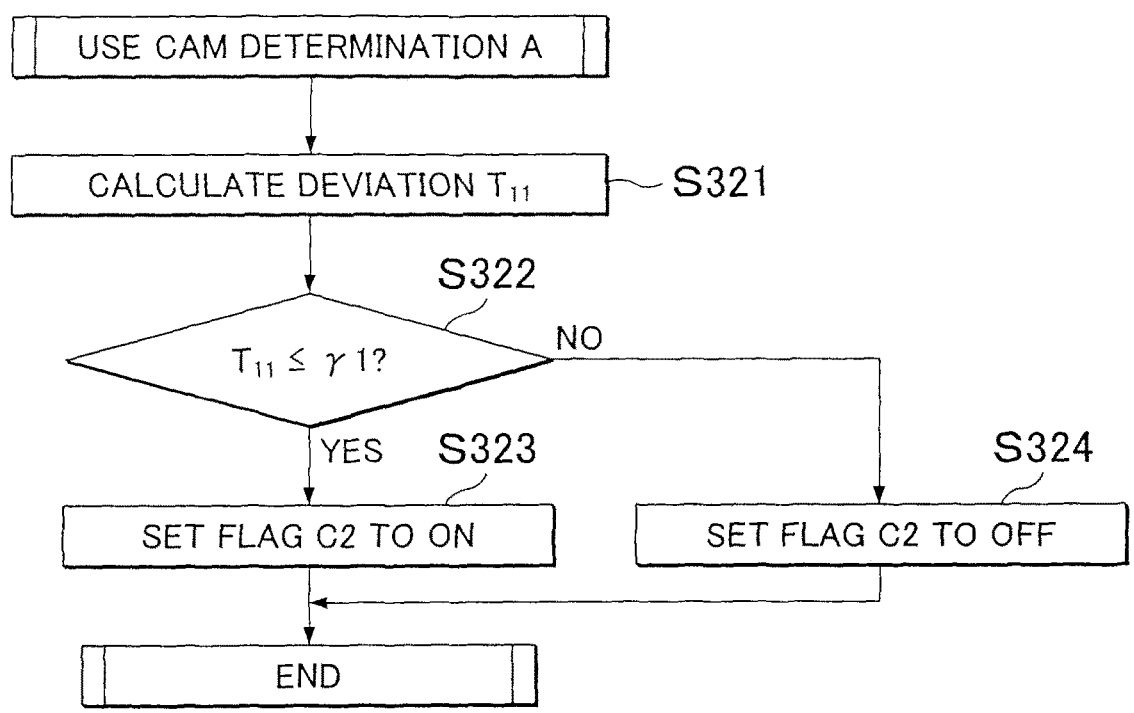
FIG. 29 is a second flowchart illustrating the third control example.
Figure 30:
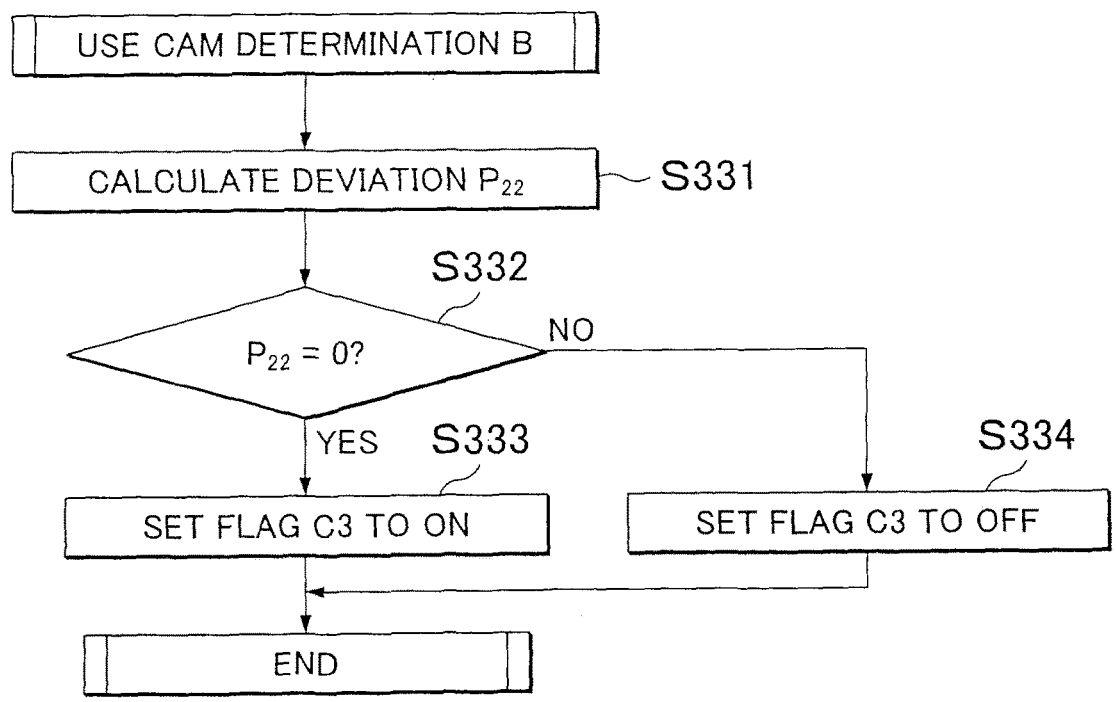
FIG. 30 is a third flowchart illustrating the third control example.

FIGS. 27A to 27C are diagrams illustrating first responsiveness failure. The first responsiveness failure is a response delay of the switching timing of the use cam occurring between the coupling mechanisms 631, 632 (the moving timing between the pins Pn11, Pn21) in the unit U and can occur in the third mode. FIG. 27A is the same diagram as FIG. 12A and illustrates the first responsiveness failure. FIG. 27B is the same diagram as FIG. 12B and illustrates the first responsiveness failure. FIG. 27C is the same diagram as FIG. 12C and illustrates the first responsiveness failure.

Here, in the third mode in which the fluctuation portions 63a, 63b are coupled to each other and the fluctuation portions 63b, 63c are decoupled from each other, the switching of the use cam in normality is performed as follows. That is, by first causing the pint Pn21 to decouple the fluctuation portions 63b, 63c from each other, the use cam is set to the cam Cb. Then, by causing the pin Pn11 to couple the fluctuation portions 63a, 63b to each other, the use cam is set to the cam Ca.

On the other hand, since the response delay occurs in movement of the pin Pn21 as the first responsiveness failure in the third mode, a situation in which the pin Pn21 moves later than the pin Pn11. In this case, by first causing the pin Pn11 to couple the fluctuation portions 63b, 63c to each other, three fluctuation portions of the fluctuation portion 63a to the fluctuation portion 63c are coupled to each other as illustrated in FIG. 27A. As a result, the use cam is set to the cams Ca, Cc. By causing the pin Pn21 to decouple the fluctuation portions 63b, 63c, the use cam is set to the cam Ca.

Therefore, when the first responsiveness failure occurs, the use cam is temporarily set to the cams Ca, Cc. Whether the cam Ca is set as the use cam can be determined depending on whether the inflection point MP1 at which the deviation $T_{11}$ is smaller than a predetermined value γ1 (smaller than or equal to the predetermined value γ1 herein) appears. Whether the cam Cc is set as the use cam can be determined depending on whether the inflection point MP2 appears.

Accordingly, when the cam switching mode is the third mode, the inflection points MP1, MP2 appear in the locus M, and the inflection point MP1 is an inflection point at which the deviation $T_{11}$ is smaller than the predetermined value γ1, the determination unit determines that the switching abnormality is present. The determination unit also determines that the abnormality form is the first responsiveness failure. When it is duly determined that the abnormality form is the first responsiveness failure, the second control unit can perform, for example, the limiting of the maximum rotation speed of the internal combustion engine 50 and the limiting of the amount of fuel injected.

A third control example will be described below with reference to the flowcharts illustrated in FIGS. 28A to 30. The third control example is an example of an individual control operation of causing the ECU 70 to perform an operation of switching the use cam based on the third mode and to determine whether the switching abnormality due to the first responsiveness failure is present in the switching operation. In the third control example, a part of determining whether the switching abnormality due to the first responsiveness failure is present is extracted and described out of the control operation of determining whether the switching abnormality in the third mode is present. In the following description, description of the same control operation as the above-mentioned control operation will not be appropriately repeated.

The ECU 70 determines whether a switching request for switching the use cam from the cams Cb, Cc to the cam Ca is given (step S301). When the determination result is positive, the ECU 70 turns off the OCV 82 and turns on the OCV 81 through the positive determination of step S302 and step S303 (step S304). Accordingly, the operation of switching the use cam based on the third mode is performed. Subsequently, the ECU 70 performs use cam determinations A and B (steps S305 and S306).

Use cam determination A is determination of whether the cam Ca is set as the use cam. Use cam determination B is determination of whether the cam Cc is set as the use cam. Use cam determination A is illustrated as a sub-routine in the flowchart illustrated in FIG. 29 and use cam determination B is illustrated as a sub-routine in the flowchart illustrated in FIG. 30.

In use cam determination A, the ECU 70 calculates the deviation $T_{11}$ (step S321) and determines whether the calculated deviation $T_{11}$ is smaller than or equal to a predetermined value γ1 (step S322). When the determination result is positive, a flag C2 is set to ON (step S323). When the determination result is negative, the flag C2 is set to OFF (step S324). The flag C2 is a flag indicating that the cam Ca is set as the use cam. After steps S323 and S324, the sub-routine of use cam determination A ends.

In use cam determination B, the ECU 70 calculates the deviation P22 (step S331) and determines whether the calculated deviation $P_{22}$ is zero (step S332). When the determination result is positive, a flag C3 is set to ON (step S333). When the determination result is negative, the flag C3 is set to OFF (step S334). The flag C3 is a flag indicating that the cam Cc is set as the use cam. After steps S333 and S334, the sub-routine of use cam determination B ends.

After the sub-routine of use cam determination B ends, the ECU 70 determines whether both the flags C2, C3 are in the ON state (step S311). When the determination result is positive, the ECU 70 sets a flag C1' to ON (step S312). The flag C1' is a temporary abnormality flag indicating that it is provisionally determined that the switching abnormality is present and it is determined that the abnormality form thereof is the first responsiveness failure.

Subsequently, the ECU 70 determines whether the state where the flag C1' is in the ON state is maintained for a predetermined time (step S313). When the determination result is negative, the control process flow returns to step S305. When the determination result is positive, the flag C1' is set to OFF and a flag C1 is set to ON (step S314). The flag C1 is a due abnormality flag indicating that it is duly determined that the switching abnormality is present and it is determined that the abnormality form thereof is the first responsiveness failure. In this case, the ECU 70 limits the maximum rotation speed of the internal combustion engine 50 and limits the amount of fuel injected (step S315).

When the determination result of step S311 is negative, the ECU 70 sets the flag C1' to OFF (step S316). Accordingly, it is duly determined that the switching abnormality of which the abnormality form is the first responsiveness failure is not present. After steps S315 and S316, the control process flow returns to step S311.

When determining whether the switching abnormality due to the responsiveness failure (the first responsiveness failure herein) is present, the ECU 70 may perform the determination, for example, as follows. That is, when it is duly determined that the switching abnormality due to the mechanical failure is not present, it may be determined whether the switching abnormality due to the responsiveness failure is present. In this case, for example, when determining whether the switching abnormality due to the mechanical failure is present, the ECU 70 can determine whether the switching abnormality due to the responsiveness failure is present on the basis of the previously-calculated in-cylinder pressure changing rate dPc/dθ.

The ECU 70 may determine whether the switching abnormality due to the responsiveness failure is present, for example, as follows. That is, it may be determined whether the switching abnormality due to the responsiveness failure is present by alternately determining whether the switching abnormality due to the mechanical failure is present for each of the same type of switching requests in which the cam switching mode is identical (the third mode herein). In this case, the ECU 70 can determine whether the switching abnormality due to the responsiveness failure is present, when it is duly determined that the switching abnormality due to the mechanical failure is not present at the time of the same type of switching request previously given.

Figure 31:
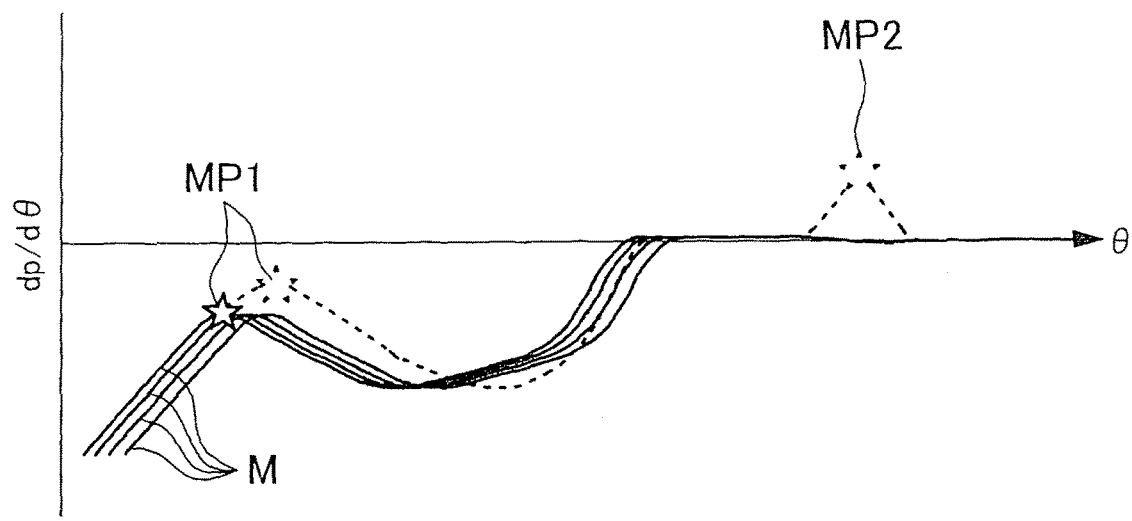
FIG. 31 is a diagram illustrating second responsiveness failure.

FIG. 31 is a diagram illustrating second responsiveness failure. The second responsiveness failure is a response delay of the switching timing of the use cam that occurs between the plural cylinders 51*a*. FIG. 31 is the same diagram s FIG. 12C and illustrates the second responsiveness failure. In FIG. 31, the phases of the loci M are presumed to slide so as to illustrate the loci M in the cylinders 51*a*, but the phases of the loci M are the same.

When the second responsiveness failure occurs, for example, one of the value and phase of the inflection point MP1 is much more different than a predetermined degree between the loci M having the same engine cycle in one cylinder and the other cylinder out of the plural cylinders 51*a* at the time of switching the use cam. For example, a difference in the presence of the inflection point MP2 is present therebetween.

Accordingly, when the cam switching mode is the first mode and the one of value and phase of the inflection point MP1 is much more different than a predetermined degree between the loci M in which the cam switching mode is the first mode and which have the same engine cycle in one cylinder and the other cylinder out of the plural cylinders 51*a*, the determination unit determines that the switching abnormality is present.

When the cam switching mode is the second mode and the presence or absence of the inflection point MP2 is different between the loci M in which the cam switching mode is the second mode and which have the same engine cycle in one cylinder and the other cylinder out of the plural cylinders 51*a*, the determination unit determines that the switching abnormality is present. When the cam switching mode is the third mode and one of when one of the value and the phase of the inflection point MP1 is different more than a predetermined degree and when the presence or absence of the inflection point MP2 is different between the loci M in which the cam switching mode is the third mode and which have the same engine cycle in one cylinder and the other cylinder out of the plural cylinders 51*a*, the determination unit determines that the switching abnormality is present.

In this case, the determination unit determines that the abnormality form is the second responsiveness failure. When it is duly determined that the abnormality form is the second responsiveness failure, the second control unit can perform, for example, the limiting of the maximum engine speed of the internal combustion engine 50 and the limiting of the amount of fuel injected.

Figure 32:
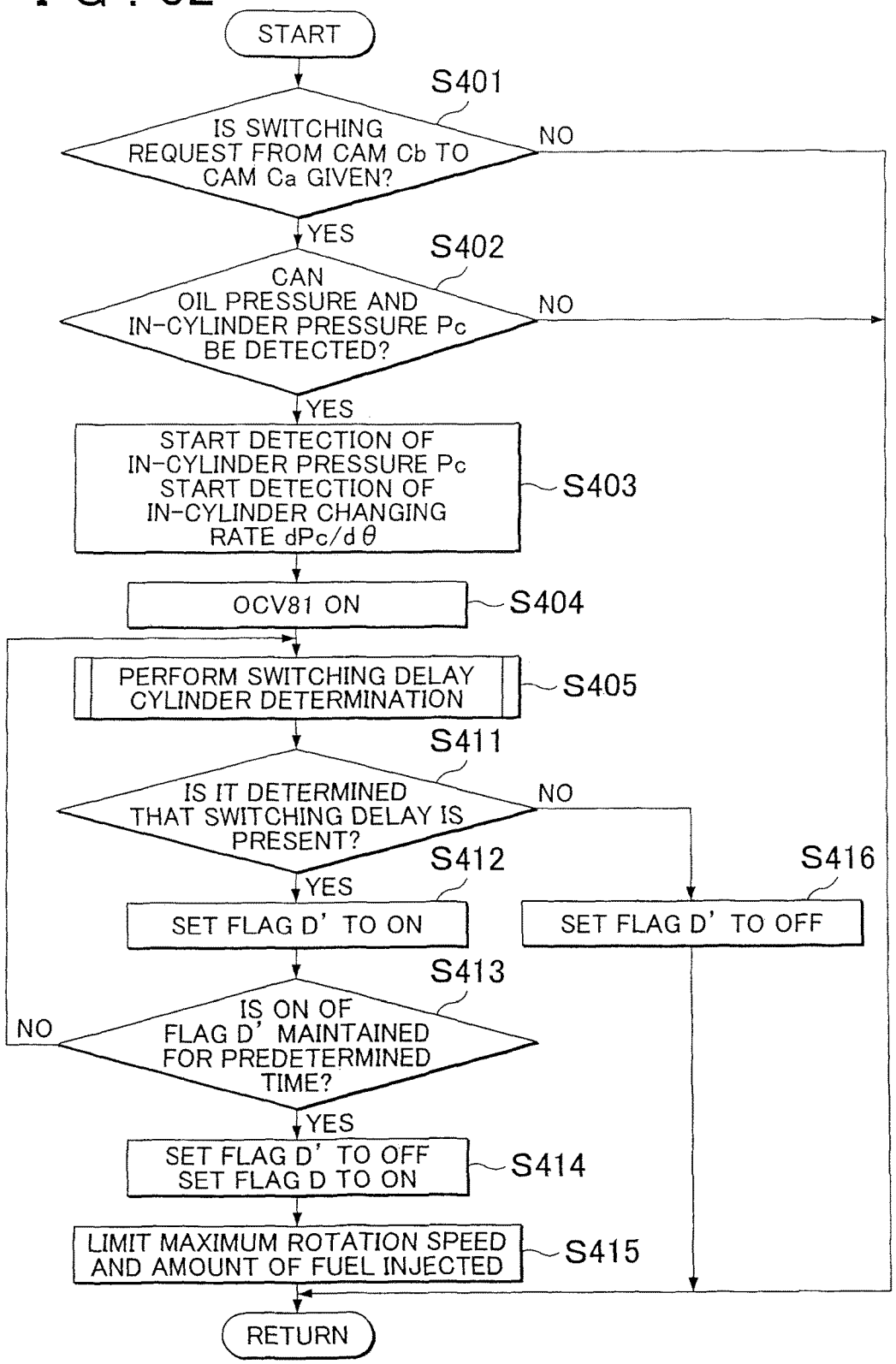
FIG. 32 is a first flowchart illustrating a fourth control example.
Figure 33:
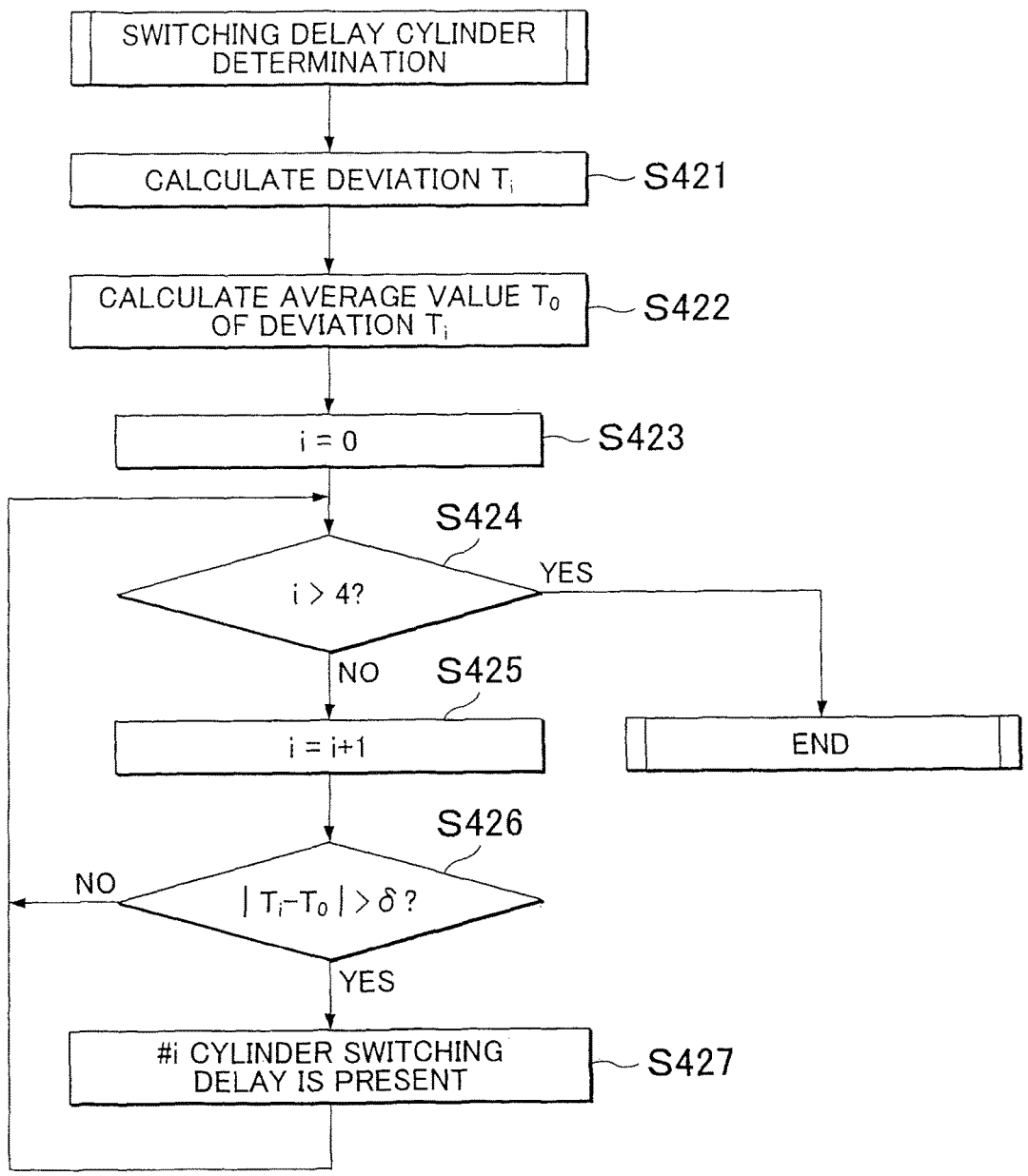
FIG. 33 is a second flowchart illustrating the fourth control example.

A fourth control example will be described below with reference to the flowcharts illustrated in FIGS. 32 and 33. The fourth control example is an example of an individual control operation of causing the ECU 70 to determine whether the switching abnormality due to the second responsiveness failure is present in the operation of switching the use cam. In the fourth control example, the cam switching mode is the first mode. In the following description, description of the same control operation as the above-mentioned control operation will not be appropriately repeated.

The ECU 70 determines whether a switching request for switching the use cam from the cam Cb to the cam Ca is given (step S401). When the determination result is positive, the ECU 70 turns on the OCV 81 through the positive determination of step S402 and step S403 (step S404). Accordingly, the operation of switching the use cam based on the first mode is performed. Subsequently, the ECU 70 performs switching delay cylinder determination (step S405).

The switching delay cylinder determination is determination of whether the second responsiveness failure is present. The switching delay cylinder determination is illustrated as a sub-routine in the flowchart illustrated in FIG. 33. In the switching delay cylinder determination, the ECU 70 calculates a deviation $T_i$ (step S421). The deviation $T_i$ is a deviation $T_{11}$ for each cylinder 51*a* (#i cylinder) and a deviation $T_{11}$ in each of the loci M having the same engine cycle. Subsequently, the ECU 70 calculates the average value $T_0$ of the deviations $T_i$ (step S422) and sets a cylinder number i to zero (step S423).

Subsequently, the ECU 70 determines whether the cylinder number i is greater than 4 (step S424). When the determination result is negative, the ECU 70 adds 1 to the cylinder number i (step S425) and determines whether the magnitude of the difference between the deviation $T_i$ and the average value $T_0$ is greater than a predetermined value δ (step S426). When the determination result is positive, the ECU 70 determines whether a switching delay is present in the cylinder of #i (step S427). After the negative determination of step S426 or after step S427, the control process flow returns to step S424. When the determination result of step S424 is positive, the sub-routine of the switching delay cylinder determination ends. Whether a switching delay is present in the cylinder of #i may be determined using other methods.

Subsequently, the ECU 70 determines in which of the plural cylinders 51*a* it is determined that the switching delay is present (step S411). When the determination result is positive, a flag D' is set to ON (step S412). The flag D' is a temporary abnormality flag indicating that it is duly determined that the switching abnormality is present and it is determined that the abnormality form is the second responsiveness failure.

Subsequently to step S412, the ECU 70 determines whether the state where the flag D' is in the ON state is maintained for a predetermined time (step S413). When the determination result is negative, the control process flow returns to step S405. When the determination result of step S413 is positive, the ECU 70 sets the flag D' to OFF and sets a flag D to ON (step S414). The flag D is a due abnormality flag indicating that it is duly determined that the switching abnormality is present and it is determined that the abnormality form is the second responsiveness failure. In this case, the ECU 70 limits the maximum rotation speed of the internal combustion engine 50 and limits the amount of fuel injected (step S415).

When the determination result of step S411 is negative, the ECU 70 sets the flag D' to OFF (step S416). Accordingly, it is duly determined that the switching abnormality of which the abnormality form is the second responsiveness failure is not present. After steps S415 and S416, the control process flow returns to step S411. In step S415, specifically, the ECU 70 limits the amount of fuel injected for each cylinder 51*a*. For example, the ECU 70 may limit the amount of fuel injected or the EGR ratio in the cylinder 51*a* in which it is determined in step S427 that the switching delay is present while the flag D' is in the ON state.

Principal operational advantages of the internal combustion engine 50 will be described below. As described above, an effect of the mechanical failure or the responsiveness failure is reflected in the locus M. Such an effect is reflected in the locus M in a predetermined period K. Accordingly, the internal combustion engine 50 including the ECU 70 as an abnormality determining device that determines whether the switching abnormality is present on the basis of the locus M in the predetermined period K can determine whether the switching abnormality is present.

Specifically, when the switching of the use cam is normally performed, the effect of the mechanical failure or the responsiveness failure is reflects in the locus M obtained in at least one period of a period in which the exhaust valve 55 is opened with the switching of the use cam and a period in which the exhaust valve 55 is not opened with the switching of the use cam. Accordingly, the internal combustion engine 50 has a specific configuration in which the ECU 70 further determines whether the switching abnormality is present with the predetermined period K as the period on the basis of the cam switching mode, and thus can determine whether the switching abnormality is present.

Specifically, the effect of the mechanical failure or the responsiveness failure is reflected in the predetermined item of the locus M. Accordingly, the internal combustion engine 50 has a specific configuration in which the ECU 70 determines whether the switching abnormality is present on the basis of the predetermined item of the locus M when determining whether the switching abnormality is present on the basis of the locus M, and thus can determine whether the switching abnormality is present.

Specifically, the effect of the mechanical failure or the responsiveness failure is reflected in the locus M obtained in the predetermined period K after the switching of the use cam has started. Accordingly, the internal combustion engine 50 has a specific configuration in which the predetermined period K is a period after the switching of the use cam has started, and thus can determine whether the switching abnormality is present.

The internal combustion engine 50 has a specific configuration in which the ECU 70 as the abnormality determining device determines that the variable valve mechanism 60 is abnormal when it is determined that the switching abnormality is present in at least one of the plural modes and determines that the variable valve mechanism 60 is normal when it is determined that the switching abnormality is not present in all of the plural modes, and thus can appropriately determine whether the abnormality of the variable valve mechanism 60 is present on the basis of whether the switching abnormality is present.

The internal combustion engine 50 has a specific configuration in which the variable valve mechanism 60 selects a cam to be used to drive the exhaust valve 55 out of three or more cams (the cams Ca, Cb, and Cc herein) as the plural cams and includes plural fluctuation portions (fluctuation portions 63*a*, 63*b*, and 63*c* herein) individually fluctuating in accordance with the cam profiles of the plural cams and relaying the dynamic power from the cam shaft 65 to the exhaust valve 55 and plural coupling mechanisms (the coupling mechanisms 631, 632) performing coupling or decoupling between two fluctuation portions of the plural fluctuation portions.

In this case, for example, in the third mode, the mechanical failure may occur in the respective coupling mechanisms 631, 632. For example, the first responsiveness failure or the second responsiveness failure may occur. That is, the switching abnormality may occur in various forms. In this case, since it is preferably determined that the switching abnormality is present, the internal combustion engine 50 is specifically suitable for this configuration.

In the internal combustion engine 50, the plural cams include the cams Ca, Cb, and Cc, the plural fluctuation portions include the fluctuation portions 63*a*, 63*b*, and 63*c*, and the plural coupling mechanisms include the coupling mechanism 631 having the pin Pn11 and the coupling mechanism 632 having the pint Pn21. The valve driving portion 62 is disposed in the second fluctuation portion 63*b*, the valve opening period of the exhaust valve 55 based on the cam Cb is included in the valve opening period of the exhaust valve 55 based on the cam Ca, and the cam profiles of the cams Ca, Cb are set so that the amount of lift of the exhaust valve 55 is greater with the cam Ca than with the cam Cb. In addition, the cam profile of the cam Cc is set so as to drive the exhaust valve 55 at a timing different from that of the cam Ca or the cam Cb and the plural modes include total six modes (hereinafter, referred to as a first configuration). That is, the internal combustion engine 50 can determine whether the switching abnormality is present, for example, in the first configuration.

The internal combustion engine 50 has a specific configuration (hereinafter, referred to as a second configuration) in which the ECU 70 determines whether the abnormality of the coupling or decoupling performed by at least one of the pins Pn11, Pn21 is present when determining whether the switching abnormality is present, and thus can determine whether the switching abnormality is present.

The mechanical failure or the responsiveness failure can be identified on the basis of the locus M in the predetermined period K for each cam switching mode. Accordingly, the internal combustion engine 50 has a specific configuration in which the ECU 70 as the abnormality determining device further determines the abnormality form of the switching abnormality on the basis of the cam switching mode and the locus M in the predetermined period K, and thus can cope with situations when the switching of the use cam is not normally performed.

In the internal combustion engine 50 having the first configuration or the second configuration, it is possible to distinguish the first responsiveness failure, which may occur when the internal combustion engine 50 has the first configuration or the second configuration, from other failure and to cope with the situation. Accordingly, it is possible to cope with a large degree of disorder such as destruction of the valve system that may occur by the valve bounce, for example, in a state where three portions are coupled occurs.

The internal combustion engine 50 has a specific configuration in which the ECU 70 determines the abnormality form on the basis of the cam switching mode and the inflection point MP1 when the cam switching mode is the first mode. Accordingly, the internal combustion engine 50 can determine the abnormality form of the mechanical failure occurring in the coupling mechanism 631 at the time of switching the use cam based on the first mode. In this case, the internal combustion engine 50 can determine which of the bounce of the pin Pn11, the oblique insertion of the pin Pn11, and the fixation of the pin Pn11 the abnormality form is.

The internal combustion engine 50 has a specific configuration in which the ECU 70 determines the abnormality form on the basis of the cam switching mode and the inflection point MP2 when the cam switching mode is the second mode. Accordingly, the internal combustion engine 50 can determine the abnormality form of the mechanical failure occurring in the coupling mechanism 632 at the time of switching the use cam based on the second mode. In this case, the internal combustion engine 50 can determine which of the bounce of the pin Pn21, the oblique insertion of the pin Pn21, and the fixation of the pin Pn21 the abnormality form is.

The internal combustion engine 50 has a specific configuration in which the ECU 70 determines the abnormality form on the basis of the cam switching mode and the inflection point MP1 and determines the abnormality form on the basis of the cam switching mode and the inflection point MP2 when the cam switching mode is the third mode. Accordingly, the internal combustion engine 50 can determine the abnormality form of the mechanical failure occurring in the coupling mechanisms 631, 632 at the time of switching the use cam based on the third mode. In this case, the internal combustion engine 50 can determine which of the bounce of the pin Pn11, the oblique insertion of the pin Pn11, and the fixation of the pin Pn11 the abnormality form is. The internal combustion engine can also determine which of the bounce of the pin Pn21, the incomplete detachment of the pin Pn21, and the fixation of the pin Pn21 the abnormality form is.

The internal combustion engine 50 has a specific configuration in which the ECU 70 determines that the abnormality form is the first responsiveness failure, when the cam switching mode is the third mode, the inflection points MP1, MP2 appear in the locus M, and the inflection point MP1 is an inflection point at which the deviation $T_{11}$ is smaller than a predetermined value γ1. Accordingly, the internal combustion engine 50 may determine that the abnormality form is the first responsiveness failure at the time of switching the use cam based on the third mode.

The internal combustion engine 50 has a specific configuration in which the exhaust valve 55, the cams Ca, Cb, and Cc, the fluctuation portions 63*a*, 63*b*, and 63*c*, and the coupling mechanisms 631, 632 are disposed for each cylinder 51*a*, and the ECU 70 determines that the abnormality form is the second responsiveness failure as described above. Accordingly, the internal combustion engine 50 may determine the second responsiveness failure at the time of switching the use cam based on the first to third modes.

The internal combustion engine 50 has a specific configuration in which the ECU 70 repeatedly determines whether the switching abnormality is present when determining whether the switching abnormality is present, and the ECU 70 duly determines that the switching abnormality is present when it is repeatedly determined for a predetermined time that the switching abnormality is present. The ECU 70 is configured to duly determine that the switching abnormality is not present when it is determined that the switching abnormality is not present before it is repeatedly determined for a predetermined time that the switching abnormality is present. Accordingly, the internal combustion engine 50 may further identify a case where the switching of the use cam is not temporarily normally performed and then may cope with the situations.

The internal combustion engine 50 has a specific configuration in which it further includes the ECU 70 as a control device performing the fail-safe control depending on the abnormality form determined by the ECU 70 as the abnormality determining device and in which the fail-safe control includes at least one of the limiting of the maximum vehicle speed, the limiting of the maximum rotation speed, and the limiting of the amount of fuel injected. That is, the internal combustion engine 50 has such a specific configuration and thus can actually cope with the situations when the switching of the use cam in the variable valve mechanism 60 is not normally performed. By coping with the situations, specifically, the internal combustion engine 50 can prevent or suppress generation of abnormal noise or generation of vibration or can prevent destruction of the same valve system.

The internal combustion engine 50 has a specific configuration in which it further includes the ECU 70 as a warning device giving a warning when the ECU 70 determines that the switching abnormality is present, and thus can promote a countermeasure suitable for this case.

The internal combustion engine 50 has a specific configuration in which it further includes the ECU 70 as an EGR ratio limiting device limiting the EGR ratio depending on the abnormality form determined by the ECU 70 as the abnormality determining device, and thus may prevent or suppress degradation of exhaust emission or degradation of output power when the switching of the use cam in the variable valve mechanism 60 is not normally performed.

The internal combustion engine 50 has a specific configuration in which the ECU 70 as a control device performs the fail-safe control when the ECU 70 as the abnormality determining device duly determines that the switching abnormality is present. That is, the internal combustion engine 50 further identifying a case where the switching of the use cam is not temporarily normally performed and then enabling coping with the situations can suitably perform the fail-safe control as follows.

The internal combustion engine 50 has a configuration in which it further includes the ECU 70 as a re-switching device re-switching the use cam when the ECU 70 as the abnormality determining device provisionally determines that the switching abnormality is present and determines that the abnormality form is the bounce of the pin Pn11 or the pin Pn21. The internal combustion engine 50 having this configuration can cope with the case by re-switching the use cam when the abnormality form is the bounce of the pin Pn11 or the pin Pn21.

The internal combustion engine 50 has a specific configuration in which the ECU 70 as a control device performs the fail-safe controls having different degrees in the abnormality forms in which the same type of fail-safe controls are performed out of the abnormality forms determined by the ECU 70 as the abnormality determining device, and the internal combustion engine 50 may more appropriately cope with the situations.

The embodiments of the present invention have been described above in detail. The present invention is not limited to the specific embodiments but can be modified and changed in various forms without departing from the gist of the present invention described in the appended claims.

For example, the internal combustion engine may be a single-cylinder internal combustion engine or a spark-ignition internal combustion engine. For example, in an internal combustion engine having plural cylinders, the plural cams may be used to drive the exhaust valve 55 in at least one of the plural cylinders or the variable valve mechanism may select the use cam to be used to drive the exhaust valve out of the plural cams in at least one of the plural cylinders.

The invention claimed is:

1. An internal combustion engine comprising:
a variable valve mechanism including a plurality of cams used to drive an exhaust valve; and
an electronic control unit configured to:
(a) select a use cam, which is a cam used to drive the exhaust valve, out of the plurality of cams, and
(b) determine whether switching abnormality of the use cam is present on the basis of a locus of an in-cylinder pressure changing rate in a predetermined period, the predetermined period being a period in which the exhaust valve is opened,
wherein:
the variable valve mechanism is configured to switch the cams such that a plurality of modes are performed,
the electronic control unit is configured to set the predetermined period to at least one period of a period in which the exhaust valve is opened by switching of the use cam and a period in which the exhaust valve is not opened by the switching of the use cam, when the switching of the use cam is normally performed depending on the modes, and
the electronic control unit is configured to determine whether the switching abnormality is present on the basis of a predetermined item of the locus, and the predetermined item includes at least one of:
(i) presence of an inflection point obtained by operating of the exhaust valve,
(ii) absence of the inflection point,
(iii) value of the inflection point, and
(iv) generating timing of the inflection point.

2. The internal combustion engine according to claim 1, wherein
the predetermined period is a period after the switching to the use cam has started.

3. The internal combustion engine according to claim 1, wherein
the electronic control unit is configured to determine that the variable valve mechanism is abnormal when the electronic control unit determines that the switching abnormality is present in at least one of the plurality of modes, and
the electronic control unit is configured to determine that the variable valve mechanism is normal when the electronic control unit determines that the switching abnormality is not present in all of the plurality of modes.

4. The internal combustion engine according to claim 1, wherein
the variable valve mechanism individually fluctuates depending on cam profiles of the plurality of cams, the variable valve mechanism includes a plurality of fluctuation portions configured to relay dynamic power transmitted from a cam shaft to the exhaust valve, the cam shaft is provided with the plurality of cams, and a plurality of coupling mechanisms configured to connect and disconnect two fluctuation portions out of the plurality of fluctuation portions, and the electronic control unit is configured to select the cam used to drive the exhaust valve out of at least three cams as the plurality of cams.

5. The internal combustion engine according to claim 4, wherein
the plurality of cams includes a first cam, a second cam, and a third cam,
the plurality of fluctuation portions include a first fluctuation portion configured to fluctuate using the first cam, a second fluctuation portion configured to fluctuate using the second cam, and a third fluctuation portion configured to fluctuate using the third cam,
the plurality of coupling mechanisms includes a first coupling mechanism and a second coupling mechanism, the first coupling mechanism includes a first lock member that connects and disconnects the first fluctuation portion and the second fluctuation portion, the second coupling mechanism includes a second lock member that connects and disconnects the second fluctuation portion and the third fluctuation portion, the second fluctuation portion is provided with a valve driving portion configured to transmit dynamic power to the exhaust valve,
a valve opening period of the exhaust valve using the first cam includes a valve opening period of the exhaust valve using the second cam,
the cam profile of the first cam and the cam profile of the second cam are set so that an amount of lift of the exhaust valve using the first cam is greater than an amount of lift of the exhaust valve using the second cam,
the cam profile of the third cam is set so as to drive the exhaust valve at timing different from one of the cam profile of the first cam and the cam profile of the second cam, and
the total number of modes is six.

6. The internal combustion engine according to claim 5, wherein
the electronic control unit is configured to determine whether abnormality of coupling or decoupling performed by at least one of the first lock member and the second lock member is present.

7. The internal combustion engine according to claim 1, wherein
the electronic control unit is configured to determine an abnormality form of the switching abnormality of the use cam on the basis of the mode and the locus in the predetermined period.

8. The internal combustion engine according to claim 5, wherein
the electronic control unit is configured to determine an abnormality form of the switching abnormality of the use cam in the variable valve mechanism on the basis of the mode and the locus in the predetermined period,
the modes include a first mode, the first mode is a mode in which a switching form of the use cam is switching from the second cam to the first cam, and
the electronic control unit is configured to determine the abnormality form on the basis of the mode and a first inflection point when the mode is the first mode, and the first inflection point is an inflection point obtained with the operation of the exhaust valve using at least one of the first cam and the second cam in the locus.

9. The internal combustion engine according to claim 8, wherein the modes include a second mode, the second mode is a mode in which the switching form of the use cam switches from the second cam to the first and third cams, and the electronic control unit is configured to determine the abnormality form on the basis of the mode and a second inflection point when the mode is the second mode, and the second inflection point is an inflection point obtained with the operation of the exhaust valve using the third cam in the locus.

10. The internal combustion engine according to claim 9, wherein the modes include a third mode, the third mode is a mode in which the switching form of the use cam switches from the second and third cams to the first cam, and when the mode is the third mode, the electronic control unit is configured to (A) determine the abnormality form on the basis of the mode and the first inflection point, and (B) determine the abnormality form on the basis of the mode and the second inflection point.

11. The internal combustion engine according to claim 10, wherein a first predetermined inflection point is an inflection point obtained with the operation of the exhaust valve using the first cam when the exhaust valve is driven along the cam profile of the first cam in the locus, a deviation is a magnitude of a phase difference between the first inflection point and the first predetermined inflection point, the electronic control unit is configured to determine that the abnormality form is a response delay of switching timing of the use cam generated between the first coupling mechanism and the second coupling mechanism when the mode is the third mode, the first inflection point and the second inflection point are present in the locus, and the deviation is less than a predetermined value.

12. The internal combustion engine according to claim 11, wherein the exhaust valve, the plurality of cams, the plurality of fluctuation portions, and the plurality of coupling mechanisms are provided to each of a plurality of cylinders, the electronic control unit is configured to determine that the abnormality form is a response delay of a switching timing of the use cam caused between the plurality of cylinders, when the mode is the first mode and one of a value and a phase of the first inflection point is different more than a predetermined degree between one cylinder and another cylinder of the plurality of cylinders, the electronic control unit is configured to determine that the abnormality form is a response delay of a switching timing of the use cam caused between the plurality of cylinders, when the mode is the second mode and the presence or absence of the second inflection point is different between one cylinder and another cylinder of the plurality of cylinders, and the electronic control unit is configured to determine that the abnormality form is a response delay of a switching timing of the use cam caused between the plurality of cylinders, when the mode is the third mode and one of following conditions is satisfied;

(I) one of the value and the phase of the first inflection point is different more than a predetermined degree between one cylinder and another cylinder of the plurality of cylinders, and (II) the presence or absence of the second inflection point is different between one cylinder and another cylinder of the plurality of cylinders.

13. The internal combustion engine according to claim 1, wherein the electronic control unit is configured to repeatedly determine whether the switching abnormality is present when determining whether the switching abnormality is present, the electronic control unit is configured to determine that the switching abnormality is present when the electronic control unit repeatedly determines for a predetermined time that the switching abnormality is present, and the electronic control unit is configured to determine that the switching abnormality is not present when the electronic control unit determines that the switching abnormality is not present before repeatedly determining that the switching abnormality is present for the predetermined time.

14. The internal combustion engine according to claim 8, wherein the electronic control unit is configured to control a fail-safe control on the basis of the determined abnormality form, and the fail-safe control includes at least one of limiting of a maximum vehicle speed, limiting of a maximum rotation speed, and limiting of an amount of fuel injected.

15. The internal combustion engine according to claim 1, wherein the mode differs depending on a switching form of the use cam, and the switching form is a form of switching from one use pattern to the other use pattern between two use patterns of a plurality of use patterns of the use cam.

16. The internal combustion engine according to claim 1, wherein the electronic control unit is configured to give a warning when the electronic control unit determines that the switching abnormality is present.

* * * * *